United States Patent
Kim

(10) Patent No.: US 10,621,379 B1
(45) Date of Patent: *Apr. 14, 2020

(54) METHOD FOR TRAINING AND TESTING ADAPTION NETWORK CORRESPONDING TO OBFUSCATION NETWORK CAPABLE OF PROCESSING DATA TO BE CONCEALED FOR PRIVACY, AND TRAINING DEVICE AND TESTING DEVICE USING THE SAME

(71) Applicant: Deeping Source Inc., Seoul (KR)

(72) Inventor: Tae Hoon Kim, Seoul (KR)

(73) Assignee: DEEPING SOURCE INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/663,132

(22) Filed: Oct. 24, 2019

(51) Int. Cl.
  *G06F 21/62* (2013.01)
  *G06N 20/00* (2019.01)
  *G06F 21/14* (2013.01)
  *G06N 3/04* (2006.01)
  *G06N 3/08* (2006.01)
  *G06K 9/62* (2006.01)

(52) U.S. Cl.
  CPC .......... *G06F 21/6254* (2013.01); *G06F 21/14* (2013.01); *G06N 3/04* (2013.01); *G06N 3/0454* (2013.01); *G06N 3/08* (2013.01); *G06N 20/00* (2019.01); *G06F 2221/0748* (2013.01); *G06K 9/6256* (2013.01)

(58) Field of Classification Search
  CPC ............... G06F 21/6252; G06F 21/14; G06F 2221/0748; G06N 20/00; G06N 20/10; G06N 20/20; G06N 3/04; G06N 3/0454; G06N 3/08; G06K 9/6256
  USPC ..................................................... 706/12, 20
  See application file for complete search history.

(56) References Cited

U.S. PATENT DOCUMENTS

2018/0005626 A1* 1/2018 Betley ................. G10L 15/02
2019/0095629 A1* 3/2019 Lee ..................... G06Q 10/06

OTHER PUBLICATIONS

Zhang et al., Privacy-preserving Machine Learning through Data Obfuscation, Jul. 13, 2018, pp. 1-12 (Year: 2018).*

* cited by examiner

*Primary Examiner* — Shane D Woolwine
(74) *Attorney, Agent, or Firm* — Xsensus LLP

(57) ABSTRACT

A method for learning an adaption network corresponding to an obfuscation network used for concealing original data is provided. The method includes steps of: (a) on condition that a 1-st learning device has performed or is performing processes of (i) instructing the obfuscation network to obfuscate the training data to generate obfuscated training data, (ii) inputting the obfuscated training data into a learning network to generate 1-st characteristic information for training and inputting the training data into the learning network to generate 2-nd characteristic information for training, and (iii) learning the obfuscation network, a 2-nd learning device performing one of inputting the training data into the adaption network to generate 1-st feature adapted data and inputting test data into the adaption network to generate 2-nd feature adapted data and one of (i) acquiring a 1-st adaption ground truth and learning the adaption network and (ii) learning the adaption network.

22 Claims, 6 Drawing Sheets

METHOD FOR TRAINING AND TESTING ADAPTION NETWORK CORRESPONDING TO OBFUSCATION NETWORK CAPABLE OF PROCESSING DATA TO BE CONCEALED FOR PRIVACY, AND TRAINING DEVICE AND TESTING DEVICE USING THE SAME

FIELD OF THE DISCLOSURE

The present disclosure relates to a learning method of an adaption network; and more particularly, to the method of the adaption network corresponding to the obfuscation network for concealing the original data for personal information protection and a learning device using the same, and to a testing method of the learned adaption network and a testing device using the same.

BACKGROUND OF THE DISCLOSURE

Big data refers to data including all of unstructured data and semi-structured data not utilized so far, like e-commerce data, metadata, web log data, radio frequency identification (RFID) data, sensor network data, social network data, data of Internet text and documents, Internet search indexing data, as well as all of structured data used by conventional enterprises or public institutions. Data as such is referred to as big data in the sense that common software tools and computer systems cannot easily handle such a huge volume of data.

And, although such big data may be insignificant by itself, it can be useful for generation of new data, judgment, or prediction in various fields through machine learning on patterns and the like.

Recently, due to the strengthening of a personal information protection act, it is required to delete information that can be used for identifying individuals from the data or to acquire consent of the individuals in order to trade or share such big data. However, it is not easy to check if a large amount of big data includes information that can be used for identifying the individuals, and it is impossible to obtain the consent of the individuals. Therefore, various techniques for such purposes are emerging.

As an example of a related prior art, a technique is disclosed in Korean Patent Registration No. 10-1861520. According to this technique, a face-concealing method is provided which includes a detection step of detecting a facial region of a person in an input image to be transformed, a first concealing step of transforming the detected facial region into a distorted first image that does not have a facial shape of the person so that the person in the input image is prevented from being identified, and a second concealing step of generating a second image having a predetermined facial shape based on the first image, transforming the first image into the second image, in the input image, where the second image is generated to have a facial shape different from that of the facial region detected in the detection step.

However, according to conventional techniques as well as the technique described above, whether identification information such as faces, text, etc. is included in the data is determined, and at least one portion corresponding to the identification information is masked or blurred, thus machine learning cannot utilize such information due to damage to original data, and in some cases, the data even contains unexpected identification information and the unexpected identification information cannot be concealed, e.g., anonymized. In particular, a conventional security camera performs an anonymizing process by blurring all pixels having a change between frames in a video image, and when the anonymizing process is performed in this manner, critical information such as facial expression of an anonymized face becomes different from information contained in an original video image, and the personal identification information missing during face detection may remain on the original video image. Also, the blurred video image may be reverted to the original image using one of conventional video deblurring techniques.

Accordingly, the inventor of the present disclosure proposes a technique for generating obfuscated data such that the obfuscated data is different from the original data while each of output results of inputting the original data and the obfuscated data respectively into a learning model is same or similar to each other, and a technique for providing a learned model for such a purpose.

SUMMARY OF THE DISCLOSURE

It is an object of the present disclosure to solve all the aforementioned problems.

It is another object of the present disclosure to perform anonymization in a simple and accurate way, since processes of finding personal identification information in data are eliminated.

It is still another object of the present disclosure to protect privacy and security of original data by generating irreversibly obfuscated and anonymized data from the original data.

It is still yet another object of the present disclosure to generate data recognized as similar or same by a computer, but recognized as different by a human.

It is still yet another object of the present disclosure to stimulate a big data trade market.

It is still yet another object of the present disclosure to provide a learning model which is learned to anonymize the original data.

In order to accomplish the objects above, distinctive structures of the present disclosure are described as follows.

In accordance with one aspect of the present disclosure, there is provided a method for learning an adaption network corresponding to an obfuscation network used for concealing original data to protect personal information, including steps of: (a) on condition that a 1-st learning device has performed or is performing processes of (i) if training data is inputted into the obfuscation network, instructing the obfuscation network to obfuscate the training data, to thereby generate obfuscated training data, (ii) (ii-1) inputting the obfuscated training data into a learning network having its own one or more learned parameters, to thereby allow the learning network to generate 1-st characteristic information for training by applying a learning operation to the obfuscated training data using the learned parameters, and (ii-2) inputting the training data into the learning network, to thereby allow the learning network to generate 2-nd characteristic information for training by applying the learning operation to the training data using the learned parameters, and (iii) learning the obfuscation network such that a 1-st error is minimized which is calculated by referring to the 1-st characteristic information for training and the 2-nd characteristic information for training, and such that a 2-nd error is maximized which is calculated by referring to the training data and the obfuscated training data, a 2-nd learning device performing one of a process of inputting the training data into the adaption network, to thereby allow the adaption network to adapt the training data and thus to generate 1-st feature adapted data, and a process of inputting test data into the adaption network, to thereby allow the adaption network to adapt the test data and thus to generate 2-nd feature adapted data; and (b) the 2-nd learning device performing one of (i) a process of acquiring a 1-st adaption ground truth corresponding to the obfuscated training data generated by the obfuscation network, and learning the adaption network such that a 1-st adaption error is minimized which is calculated by referring to (1) a 1-st adaption reference corresponding to the 1-st feature adapted data and (2) the 1-st adaption ground truth, and (ii) a process of learning the adaption network such that a 2-nd adaption error is minimized which is calculated by referring to a 2-nd adaption ground truth corresponding to obfuscated test data generated by inputting the test data into the learned obfuscation network and further referring to a 2-nd adaption reference corresponding to the 2-nd feature adapted data.

As one example, the 2-nd learning device performs one of (i) a process of (i-1) inputting the 1-st feature adapted data into the learning network, to thereby allow the learning network to output 1-st adaption characteristic information corresponding to the 1-st feature adapted data as the 1-st adaption reference by applying the learning operation to the 1-st feature adapted data using the learned parameters, and (i-2) acquiring the 1-st adaption error by referring to one of a difference between the 1-st characteristic information for training and the 1-st adaption characteristic information and a difference between the 2-nd characteristic information for training and the 1-st adaption characteristic information, and (ii) a process of (ii-1) inputting the 2-nd feature adapted data into the learning network, to thereby allow the learning network to output 2-nd adaption characteristic information corresponding to the 2-nd feature adapted data as the 2-nd adaption reference by applying the learning operation to the 2-nd feature adapted data using the learned parameters, and (ii-2) acquiring the 2-nd adaption error by referring to one of (ii-2a) a difference between 1-st characteristic information for testing, generated by inputting the obfuscated test data into the learning network, and the 2-nd adaption characteristic information and (ii-2b) a difference between 2-nd characteristic information for testing, generated by inputting the test data into the learning network, and the 2-nd adaption characteristic information.

As one example, the 1-st error is calculated by using an obfuscation loss acquired by referring to (i) a task specific output for training, on the obfuscated training data created by using the 1-st characteristic information for training and (ii) a training data GT corresponding to the training data, wherein the 1-st adaption error is calculated by using a 1-st adaption loss acquired by referring to (i) a 1-st adaption task specific output on the 1-st feature adapted data created by using the 1-st adaption characteristic information, and (ii) the training data GT, and wherein the 2-nd adaption error is calculated by using a 2-nd adaption loss acquired by referring to (i) a 2-nd adaption task specific output on the 2-nd feature adapted data created by using the 2-nd adaption characteristic information, and (ii) a test data GT corresponding to the test data.

As one example, wherein the 1-st error is calculated by referring to (i) a difference between the 1-st characteristic information for training and the 2-nd characteristic information for training, and (ii) an obfuscation loss acquired by referring to (ii-1) a task specific output for training, on the obfuscated training data created by using the 1-st characteristic information for training and (ii-2) a training data GT corresponding to the training data, wherein the 1-st adaption error is calculated by referring to (i) a difference between the 1-st characteristic information for training and the 1-st adaption characteristic information or a difference between the 2-nd characteristic information for training and the 1-st adaption characteristic information, and (ii) a 1-st adaption loss acquired by referring to (ii-1) a 1-st adaption task specific output on the 1-st feature adapted data created by using the 1-st adaption characteristic information and (ii-2) the training data GT, and wherein the 2-nd adaption error is calculated by referring to (i) a difference between the 1-st characteristic information for testing and the 2-nd adaption characteristic information or a difference between the 2-nd characteristic information for testing and the 2-nd adaption characteristic information, and (ii) a 2-nd adaption loss acquired by referring to (ii-1) a 2-nd adaption task specific output on the 2-nd feature adapted data created by using the 2-nd adaption characteristic information and (ii-2) a test data GT corresponding to test data.

As one example, the learning network includes a 1-st learning network to an n-th learning network respectively having one or more 1-st learned parameters to one or more n-th learned parameters wherein n is an integer greater than 0, on condition that the 1-st learning device has performed or is performing processes of (i) inputting the obfuscated training data into each of the 1-st learning network to the n-th learning network, to thereby allow each of the 1-st learning network to the n-th learning network to generate (1_1)-st characteristic information for training to (1_n)-th characteristic information for training by applying the learning operation to the obfuscated training data using the 1-st learned parameters to the n-th learned parameters, (ii) inputting the training data into each of the 1-st learning network to the n-th learning network, to thereby allow each of the 1-st learning network to the n-th learning network to generate (2_1)-st characteristic information for training to (2_n)-th characteristic information for training by applying the learning operation to the training data using the 1-st learned parameters to the n-th learned parameters, (iii) generating the 1-st error which is a weighted sum of a (1_1)-st error to a (1_n)-th error wherein the (1_1)-st error is calculated by referring to the (1_1)-st characteristic information for training and the (2_1)-st characteristic information for training and wherein the (1_n)-th error is calculated by referring to the (1_n)-th characteristic information for training and the (2_n)-th characteristic information for training, and (iv) learning the obfuscation network such that the 1st error is minimized and the 2-nd error is maximized, the 2-nd learning device performs processes of (i) (i-1) inputting the 1-st feature adapted data into each of the 1-st learning network to the n-th learning network, to thereby allow each of the 1-st learning network to the n-th learning network to generate (1_1)-st adaption characteristic information to (1_n)-th adaption characteristic information by applying the learning operation to the 1-st feature adapted data using the 1-st learned parameters to the n-th learned parameters, and (i-2) acquiring the 1-st adaption error by performing weighted summation of a difference between the (1_1)-st characteristic information for training and the (1_1)-st adaption characteristic information to a difference between the (1_n)-th characteristic information for training and the (1_n)-th adaption characteristic information, or by performing weighted summation of a difference between the (2_1)-st characteristic information for training and the (1_1)-st adaption characteristic information to a difference between the (2_n)-th characteristic information for training and the (1_n)-th adaption characteristic information, or (ii) (ii-1) inputting the 2-nd feature adapted data into each of the 1-st learning network to the n-th learning network, to thereby allow each of the 1-st learning network to the n-th learning network to generate (2_1)-st adaption characteristic information to (2_n)-th adaption characteristic information by applying the learning operation to the 2-nd feature adapted data using the 1-st learned parameters to the n-th learned parameters, and (ii-2) acquiring the 2-nd adaption error by performing weighted summation of (ii-1) a difference between (1_1)-st characteristic information for testing and the (2_1)-st adaption characteristic information to a difference between (1_n)-th characteristic information for testing and the (2_n)-th adaption characteristic information wherein the (1_1)-st characteristic information for testing to the (1_n)-th characteristic information for testing are respectively created by inputting the obfuscated test data into the 1-st learning network to the n-th learning network, or by performing weighted summation of (ii-2) a difference between the (2_1)-st characteristic information for testing and the (2_1)-st adaption characteristic information to a difference between the (2_n)-th characteristic information for testing and the (2_n)-th adaption characteristic information wherein the (2_1)-st characteristic information for testing to the (2_n)-th characteristic information for testing are respectively created by inputting the test data into the 1-st learning network to the n-th learning network.

As one example, wherein the (1_1)-st error to the (1_n)-th error are calculated respectively by further referring to (i) a 1-st obfuscation loss acquired by referring to (i-1) a 1-st task specific output for training created by using the (1_1)-st characteristic information for training and (i-2) the training data GT to (ii) an n-th obfuscation loss acquired by referring to (ii-1) an n-th task specific output for training created by using the (1_n)-th characteristic information for training and (ii-2) the training data GT, wherein (i) each of a difference between the (1_1)-st characteristic information for training and the (1_1)-st adaption characteristic information to a difference between the (1_n)-th characteristic information for training and the (1_n)-th adaption characteristic information is determined respectively by further referring to each of a (1_1)-st adaption loss which is calculated by referring to a (1_1)-st adaption task specific output created using the (1_1)-st adaption characteristic information and by further referring to the training data GT to a (1_n)-th adaption loss which is calculated by referring to a (1_n)-th adaption task specific output created using the (1_n)-th adaption characteristic information and by further referring to the training data GT, or wherein (ii) each of a difference between the (2_1)-st characteristic information for training and the (1_1)-st adaption characteristic information to a difference between the (2_n)-th characteristic information for training and the (1_n)-th adaption information is determined respectively by further referring to each of the (1_1)-st adaption loss which is calculated by referring to the (1_1)-st adaption task specific output created using the (1_1)-st adaption characteristic information and by further referring to the training data GT to the (1_n)-th adaption loss which is calculated by referring to the (1_n)-th adaption task specific output created using the (1_n)-th adaption characteristic information and by further referring to the training data GT, and wherein (i) each of a difference between the (1_1)-st characteristic information for testing and the (2_1)-st adaption characteristic information to a difference between the (1_n)-th characteristic information for testing and the (2_n)-th adaption characteristic information is determined respectively by further referring to each of a (2_1)-st adaption loss which is calculated by referring to a (2_1)-st adaption task specific output created using the (2_1)-st adaption characteristic information and by further referring to the test data GT to a (2_n)-th adaption loss which is calculated by referring to a (2_n)-th adaption task specific output created using the (2_n)-th adaption characteristic information and by further referring to the test data GT, or wherein (ii) each of a difference between the (2_1)-st characteristic information for testing and the (2_1)-st adaption characteristic information to a difference between the (2_n)-th characteristic information for testing and the (2_n)-th adaption characteristic information is determined respectively by further referring to each of the (2_1)-st adaption loss which is calculated by referring to the (2_1)-st adaption task specific output created using the (2_1)-st adaption characteristic information and by further referring to the test data GT to a (2_n)-th adaption loss which is calculated by referring to the (2_n)-th adaption task specific output created using the (2_n)-th adaption characteristic information and by further referring to the test data GT.

As one example, the learning network includes a 1-st learning network to an n-th learning network respectively having one or more 1-st learned parameters to one or more n-th learned parameters wherein n is an integer greater than 0, on condition that the 1-st learning device has performed or is performing processes of (i) inputting the obfuscated training data into each of the 1-st learning network to the n-th learning network, to thereby allow each of the 1-st learning network to the n-th learning network to generate (1_1)-st characteristic information for training to (1_n)-th characteristic information for training by applying the learning operation to the obfuscated training data using the 1-st learned parameters to the n-th learned parameters, (ii) inputting the training data into each of the 1-st learning network to the n-th learning network, to thereby allow each of the 1-st learning network to the n-th learning network to generate (2_1)-st characteristic information for training to (2_n)-th characteristic information for training by applying the learning operation to the training data using the 1-st learned parameters to the n-th learned parameters, (iii) generating the 1-st error which is a weighted sum of a 1-st obfuscation loss to an n-th obfuscation loss wherein the 1-st obfuscation loss is calculated by referring to a 1-st task specific output for training created by using the (1_1)-st characteristic information for training and by referring to the training data GT and the n-th obfuscation loss is calculated by referring to an n-th task specific output for training created by using the (1_n)-th characteristic information for training and by referring to the training data GT, and (iv) learning the obfuscation network such that the 1st error is minimized and the 2-nd error is maximized, the 2-nd learning device performs processes of (i) (i-1) inputting the 1-st feature adapted data into each of the 1-st learning network to the n-th learning network, to thereby allow each of the 1-st learning network to the n-th learning network to generate (1_1)-st adaption characteristic information to (1_n)-th adaption characteristic information by applying the learning operation to the 1-st feature adapted data using the 1-st learned parameters to the n-th learned parameters, and (i-2) acquiring the 1-st adaption error by performing weighted summation of a (1_1)-st adaption loss to a (1_n)-th adaption loss wherein the (1_1)-st adaption loss is calculated by referring to a (1_1)-st adaption task specific output created by using the (1_1)-st adaption characteristic information and by referring to the training data GT, and the (1_n)-th adaption loss is calculated by referring to a (1_n)-th adaption task specific output created by using the (1_n)-th adaption characteristic information and by referring to the training data GT, or (ii) (ii-1) inputting the 2-nd feature adapted data into each of the 1-st learning network to the n-th learning network, to thereby allow each of the 1-st learning network to the n-th learning network to generate (2_1)-st adaption characteristic information to (2_n)-th adaption characteristic information by applying the learning operation to the 2-nd feature adapted data using the 1-st learned parameters to the n-th learned parameters, and (ii-2) acquiring the 2-nd adaption error by performing weighted summation of (ii-1) a (2_1)-st adaption loss to a (2_n)-th adaption loss wherein the (2_1)-st adaption loss is calculated by referring to a (2_1)-st adaption task specific output created by using the (2_1)-st adaption characteristic information and by referring to the test data GT and the (2_n)-th adaption loss is calculated by referring to a (2_n)-th adaption task specific output created by using the (2_n)-th adaption characteristic information and by referring to the test data GT.

As one example, wherein the learning network includes a 1-st learning network to an n-th learning network respectively having one or more 1-st learned parameters to one or more n-th learned parameters wherein n is an integer greater than 0, on condition that the 1-st learning device has performed or is performing processes of (i) (i-1) inputting the 1-st obfuscated training data, which is the obfuscated training data, into the 1-st learning network, to thereby allow the 1-st learning network to generate (1_1)-st characteristic information for training by applying the learning operation to the 1-st obfuscated training data using the 1-st learned parameters, (ii-2) inputting the training data into the 1-st learning network, to thereby allow the 1-st learning network to generate (2_1)-st characteristic information for training by applying the learning operation to the training data using the 1-st learned parameters, and (ii-3) learning the obfuscation network such that a (1_1)-st error is minimized which is calculated by referring to the (1_1)-st characteristic information for training and the (2_1)-st characteristic information for training and such that a (2_1)-st error is maximized which is calculated by referring to the training data and the 1-st obfuscated training data to thereby allow the obfuscation network to be a 1-st learned obfuscation network, and (ii) while increasing an integer k from 2 to n, (ii-1) inputting the training data into a (k−1)-th learned obfuscation network, to thereby allow the (k−1)-th learned obfuscation network to generate k-th obfuscated training data, (ii-2) (1) inputting the k-th obfuscated training data into a k-th learning network, to thereby allow the k-th learning network to generate (1_k)-th characteristic information for training by applying the learning operation to the k-th obfuscated training data using k-th learned parameters, and (2) inputting the training data into the k-th learning network, to thereby allow the k-th learning network to generate (2_k)-th characteristic information for training by applying the learning operation to the training data using the k-th learned parameters, and (ii-3) learning the obfuscation network such that a (1_k)-th error is minimized which is calculated by referring to the (1_k)-th characteristic information for training and the (2_k)-th characteristic information for training and such that a (2_k)-th error is maximized which is calculated by referring to the training data and the k-th obfuscated training data, to thereby allow the (k−1)-th learned obfuscation network to be a k-th learned obfuscation network, the 2-nd learning device performs processes of (i) (i-1) inputting (1_1)-st feature adapted data which is the 1-st feature adapted data into the 1-st learning network, to thereby allow the 1-st learning network to generate (1_1)-st adaption characteristic information by applying the learning operation to the (1_1)-st feature adapted data using the 1-st learned parameters, (i-2) learning the adaption network such that a (1_1)-st adaption error is minimized which is calculated by referring to a difference between the (1_1)-st characteristic information for training and the (1_1)-st adaption characteristic information or a difference between the (2_1)-st characteristic information for training and the (1_1)-st adaption characteristic information, to thereby allow the adaption network to be a 1-st learned adaption network, inputting the training data into a (k−1)-th learned adaption network, to thereby allow the (k−1)-th learned adaption network to generate (1_k)-th feature adapted data, inputting the (1_k)-th feature adapted data into the k-th learning network, to thereby allow the k-th learning network to generate (1_k)-th adaption characteristic information by applying the learning operation to the (1_k)-th feature adapted data, and (i-3) learning the (k−1)-th learned adaption network such that a (1_k)-th adaption error is minimized which is calculated by referring to a difference between the (1_k)-th characteristic information for training and the (1_k)-th adaption characteristic information or a difference between the (2_k)-th characteristic information for training and the (1_k)-th adaption characteristic information, to thereby allow the (k−1)-th learned adaption network to be a k-th learned adaption network, or (ii) (ii-1) inputting the obfuscated test data into the 1-st learning network to the n-th learning network, to thereby allow each of the 1-st learning network to the n-th learning network to generate (1_1)-st characteristic information for testing to the (1_n)-th characteristic information for testing by applying the learning operation to the obfuscated test data, or inputting the test data into the 1-st learning network to the n-th learning network, to thereby allow each of the 1-st learning network to the n-th learning network to generate (2_1)-st characteristic information for testing to (2_n)-th characteristic information for testing by applying the learning operation to the test data, (ii-2) inputting (2_1)-st feature adapted data which is the 2-nd feature adapted data into the 1-st learning network, to thereby allow the 1-st learning network to generate (2_1)-st adaption characteristic information by applying the learning operation to the (2_1)-st feature adapted data using the 1-st learned parameters, (ii-3) learning the adaption network such that a (2_1)-st adaption error is minimized which is calculated by referring to a difference between the (1_1)-st characteristic information for testing and the (2_1)-st adaption characteristic information or a difference between the (2_1)-st characteristic information for testing and the (2_1)-st adaption characteristic information, to thereby allow the adaption network to be a 1-st learned adaption network, inputting the test data into the (k−1)-th learned adaption network, to thereby allow the (k−1)-th learned adaption network to generate (2_k)-th feature adapted data, inputting the (2_k)-th feature adapted data into the k-th learning network, to thereby allow the k-th learning network to generate (2_k)-th adaption characteristic information by applying the learning operation to the (2_k)-th feature adapted data, and (ii-4) learning the (k−1)-th learned adaption network such that a (2_k)-th adaption error is minimized which is calculated by referring to a difference between the (1_k)-th characteristic information for testing and the (2_k)-th adaption characteristic information or a difference between the (2_k)-th characteristic information for testing and the (2_k)-th adaption characteristic information, to thereby allow the (k−1)-th learned adaption network to be a k-th learned adaption network.

As one example, the (1_k)-th error is calculated by further referring to a k-th obfuscation loss acquired by referring to (i) a k-th task specific output for training, on the k-th obfuscated training data created by using the (1_k)-th characteristic information for training and (ii) a training data GT corresponding to the training data, wherein (i) each of a difference between the (1_1)-st characteristic information for training and the (1_1)-st adaption characteristic information to a difference between the (1_n)-th characteristic information for training and the (1_n)-th adaption characteristic information is determined respectively by further referring to each of a (1_1)-st adaption loss which is calculated by referring to a (1_1)-st adaption task specific output created using the (1_1)-st adaption characteristic information and by further referring to the training data GT to a (1_n)-th adaption loss which is calculated by referring to a (1_n)-th adaption task specific output created using the (1_n)-th adaption characteristic information and by further referring to the training data GT, or wherein (ii) each of a difference between the (2_1)-st characteristic information for training and the (1_1)-st adaption characteristic information to a difference between the (2_n)-th characteristic information for training and the (1_n)-th adaption characteristic information is determined respectively by further referring to each of a (1_1)-st adaption loss which is calculated by referring to a (1_1)-st adaption task specific output created using the (1_1)-st adaption characteristic information and by further referring to the training data GT to a (1_n)-th adaption loss which is calculated by referring to a (1_n)-th adaption task specific output created using the (1_n)-th adaption characteristic information and by further referring to the training data GT, and wherein (i) each of a difference between the (1_1)-st characteristic information for testing and the (2_1)-st adaption characteristic information to a difference between the (1_n)-th characteristic information for testing and the (2_n)-th adaption characteristic information is determined respectively by further referring to each of a (2_1)-st adaption loss which is calculated by referring to a (2_1)-st adaption task specific output created using the (2_1)-st adaption characteristic information and by further referring to the test data GT to a (2_n)-th adaption loss which is calculated by referring to a (2_n)-th adaption task specific output created using the (2_n)-th adaption characteristic information and by further referring to the test data GT, or wherein (ii) each of a difference between the (2_1)-st characteristic information for testing and the (2_1)-st adaption characteristic information to a difference between the (2_n)-th characteristic information for testing and the (2_n)-th adaption characteristic information is determined respectively by further referring to each of the (2_1)-st adaption loss which is calculated by referring to the (2_1)-st adaption task specific output created using the (2_1)-st adaption characteristic information and by further referring to the test data GT to a (2_n)-th adaption loss which is calculated by referring to the (2_n)-th adaption task specific output created using the (2_n)-th adaption characteristic information and by further referring to the test data GT.

As one example, the learning network includes a 1-st learning network to an n-th learning network respectively having one or more 1-st learned parameters to one or more n-th learned parameters wherein n is an integer greater than 0, on condition that the 1-st learning device has performed or is performing processes of (i) (i-1) inputting the 1-st obfuscated training data, which is the obfuscated training data, into the 1-st learning network, to thereby allow the 1-st learning network to generate (1_1)-st characteristic information for training by applying the learning operation to the 1-st obfuscated training data using the 1-st learned parameters, (ii-2) inputting the training data into the 1-st learning network, to thereby allow the 1-st learning network to generate (2_1)-st characteristic information for training by applying the learning operation to the training data using the 1-st learned parameters, and (ii-3) learning the obfuscation network such that a (1_1)-st error is minimized which is calculated by referring to the (1_1)-st characteristic information for training and the (2_1)-st characteristic information for training and such that a (2_1)-st error is maximized which is calculated by referring to the training data and the 1-st obfuscated training data to thereby allow the obfuscation network to be a 1-st learned obfuscation network, and (ii) while increasing an integer k from 2 to n, (ii-1) inputting the training data into a (k−1)-th learned obfuscation network, to thereby allow the (k−1)-th learned obfuscation network to generate k-th obfuscated training data, (ii-2) (i) inputting the k-th obfuscated training data into a k-th learning network, to thereby allow the k-th learning network to generate (1_k)-th characteristic information for training by applying the learning operation to the k-th obfuscated training data using k-th learned parameters, and (2) inputting the training data into the k-th learning network, to thereby allow the k-th learning network to generate (2_k)-th characteristic information for training by applying the learning operation to the training data using the k-th learned parameters, and (ii-3) learning the obfuscation network such that a (1_k)-th error is minimized which is calculated by referring to the (1_k)-th characteristic information for training and the (2_k)-th characteristic information for training and such that a (2_k)-th error is maximized which is calculated by referring to the training data and the k-th obfuscated training data, to thereby allow the (k−1)-th learned obfuscation network to be a k-th learned obfuscation network, the 2-nd learning device performs processes of (i) (i-1) inputting (1_1)-st feature adapted data which is the 1-st feature adapted data into the 1-st learning network, to thereby allow the 1-st learning network to generate (1_1)-st adaption characteristic information by applying the learning operation to the (1_1)-st feature adapted data using the 1-st learned parameters, (i-2) learning the adaption network such that a (1_1)-st adaption loss is minimized which is calculated by referring to a (1_1)-st adaption task specific output created by using the (1_1)-st adaption characteristic information and by referring to the training data GT, to thereby allow the adaption network to be a 1-st learned adaption network, inputting the training data into a (k−1)-th learned adaption network, to thereby allow the (k−1)-th learned adaption network to generate (1_k)-th feature adapted data, inputting the (1_k)-th feature adapted data into the k-th learning network, to thereby allow the k-th learning network to generate (1_k)-th adaption characteristic information by applying the learning operation to the (1_k)-th feature adapted data, and (i-3) learning a (k−1)-th learned adaption network such that a (1_k)-th adaption loss is minimized which is calculated by referring to a (1_k)-th adaption task specific output created by using the (1_k)-th adaption characteristic information and by referring to the training GT, to thereby allow the (k−1)-th learned adaption network to be a k-th learned adaption network, or (ii) (ii-1) inputting a (2_1)-st feature adapted data which is the 2-nd feature adapted data into the 1-st learning network, to thereby allow the 1-st learning network to generate (2_1)-st adaption characteristic information by applying the learning operation to the (2_1)-st feature adapted data using the 1-st learned parameters, (ii-2) learning the adaption network such that a (2_1)-st adaption loss is minimized which is calculated by referring to a (2_1)-st adaption task specific output created by using the (2_1)-st adaption characteristic information and by referring to the test data GT, to thereby allow the adaption network to be a 1-st learned adaption network, inputting the test data into a (k−1)-th learned adaption network, to thereby allow the (k−1)-th learned adaption network to generate (2_k)-th feature adapted data, inputting the (2_k)-th feature adapted data into the k-th learning network, to thereby allow the k-th learning network to generate (2_k)-th adaption characteristic information by applying the learning operation to the (2_k)-th feature adapted data, and (ii-3) learning a (k−1)-th learned adaption network such that a (2_k)-th adaption loss is minimized which is calculated by referring to a (2_k)-th adaption task specific output created by using the (2_k)-th adaption characteristic information and by referring to the test data GT to thereby allow the (k−1)-th learned adaption network to be a k-th learned adaption network.

In accordance with another aspect of the present disclosure, there is provided a method for testing an adaption network corresponding to an obfuscation network used for concealing original data to protect personal information, including steps of: (a) after a 1-st learning device has performed or while the 1-st learning device is performing processes of (i) instructing the obfuscation network to obfuscate training data inputted into the obfuscation network, to thereby generate obfuscated training data, (ii) (ii-1) inputting the obfuscated training data into a learning network having its own one or more learned parameters, to thereby allow the learning network to generate 1-st characteristic information for training by applying a learning operation to the obfuscated training data using the learned parameters, and (ii-2) inputting the training data into the learning network, to thereby allow the learning network to generate 2-nd characteristic information for training by applying the learning operation to the training data using the learned parameters, and (iii) learning the obfuscation network such that a 1-st error is minimized which is calculated by referring to the 1-st characteristic information for training and the 2-nd characteristic information for training, and such that a 2-nd error is maximized which is calculated by referring to the training data and the obfuscated training data, on condition that a 2-nd learning device has performed (i) one of (i-1) a process of inputting the training data into the adaption network, to thereby allow the adaption network to adapt the training data and thus to generate 1-st feature adapted training data, and (i-2) a process of inputting 1-st test data into the adaption network, to thereby allow the adaption network to adapt the test data and thus to generate 2-nd feature adapted training data; and (ii) one of (ii-1) a process of acquiring a 1-st adaption ground truth corresponding to the obfuscated training data generated by the obfuscation network, and learning the adaption network such that a 1-st adaption error is minimized which is calculated by referring to (1) a 1-st adaption reference corresponding to the 1-st feature adapted training data and (2) the 1-st adaption ground truth, and (ii-2) a process of learning the adaption network such that a 2-nd adaption error is minimized which is calculated by referring to a 2-nd adaption ground truth corresponding to obfuscated test data generated by inputting the test data into the learned obfuscation network and further referring to a 2-nd adaption reference corresponding to the 2-nd feature adapted training data, a testing device acquiring 2-nd test data to be used for concealing; and (b) the testing device inputting the 2-nd test data into the adaption network, to thereby allow the adaption network to generate a feature adapted test data by adapting the 2-nd test data, and acquiring the feature adapted test data as concealed data of the 2-nd test data.

In accordance with still another aspect of the present disclosure, there is provided a 2-nd learning device for learning an adaption network corresponding to an obfuscation network used for concealing original data to protect personal information, including: at least one memory that stores instructions; and at least one processor configured to execute the instructions to perform or support another device to perform processes of: (I) on condition that a 1-st learning device has performed or is performing processes of (i) if training data is inputted into the obfuscation network, instructing the obfuscation network to obfuscate the training data, to thereby generate obfuscated training data, (ii) (ii-1) inputting the obfuscated training data into a learning network having its own one or more learned parameters, to thereby allow the learning network to generate 1-st characteristic information for training by applying a learning operation to the obfuscated training data using the learned parameters, and (ii-2) inputting the training data into the learning network, to thereby allow the learning network to generate 2-nd characteristic information for training by applying the learning operation to the training data using the learned parameters, and (iii) learning the obfuscation network such that a 1-st error is minimized which is calculated by referring to the 1-st characteristic information for training and the 2-nd characteristic information for training, and such that a 2-nd error is maximized which is calculated by referring to the training data and the obfuscated training data, performing one of a process of inputting the training data into the adaption network, to thereby allow the adaption network to adapt the training data and thus to generate 1-st feature adapted data, and a process of inputting test data into the adaption network, to thereby allow the adaption network to adapt the test data and thus to generate 2-nd feature adapted data, and (II) performing one of (i) a process of acquiring a 1-st adaption ground truth corresponding to the obfuscated training data generated by the obfuscation network, and learning the adaption network such that a 1-st adaption error is minimized which is calculated by referring to (1) a 1-st adaption reference corresponding to the 1-st feature adapted data and (2) the 1-st adaption ground truth, and (ii) a process of learning the adaption network such that a 2-nd adaption error is minimized which is calculated by referring to a 2-nd adaption ground truth corresponding to obfuscated test data generated by inputting the test data into the learned obfuscation network and further referring to a 2-nd adaption reference corresponding to the 2-nd feature adapted data.

As one example, the processor performs one of (i) a process of (i-1) inputting the 1-st feature adapted data into the learning network, to thereby allow the learning network to output 1-st adaption characteristic information corresponding to the 1-st feature adapted data as the 1-st adaption reference by applying the learning operation to the 1-st feature adapted data using the learned parameters, and (i-2) acquiring the 1-st adaption error by referring to one of a difference between the 1-st characteristic information for training and the 1-st adaption characteristic information and a difference between the 2-nd characteristic information for training and the 1-st adaption characteristic information, and (ii) a process of (ii-1) inputting the 2-nd feature adapted data into the learning network, to thereby allow the learning network to output 2-nd adaption characteristic information corresponding to the 2-nd feature adapted data as the 2-nd adaption reference by applying the learning operation to the 2-nd feature adapted data using the learned parameters, and (ii-2) acquiring the 2-nd adaption error by referring to one of (ii-2a) a difference between 1-st characteristic information for testing, generated by inputting the obfuscated test data into the learning network, and the 2-nd adaption characteristic information and (ii-2b) a difference between 2-nd characteristic information for testing, generated by inputting the test data into the learning network, and the 2-nd adaption characteristic information.

As one example, the 1-st error is calculated by using an obfuscation loss acquired by referring to (i) a task specific output for training, on the obfuscated training data created by using the 1-st characteristic information for training and (ii) a training data GT corresponding to the training data, wherein the 1-st adaption error is calculated by using a 1-st adaption loss acquired by referring to (i) a 1-st adaption task specific output on the 1-st feature adapted data created by using the 1-st adaption characteristic information, and (ii) the training data GT, and wherein the 2-nd adaption error is calculated by using a 2-nd adaption loss acquired by referring to (i) a 2-nd adaption task specific output on the 2-nd feature adapted data created by using the 2-nd adaption characteristic information, and (ii) a test data GT corresponding to the test data.

As one example, the 1-st error is calculated by referring to (i) a difference between the 1-st characteristic information for training and the 2-nd characteristic information for training, and (ii) an obfuscation loss acquired by referring to (ii-1) a task specific output for training, on the obfuscated training data created by using the 1-st characteristic information for training and (ii-2) a training data GT corresponding to the training data, wherein the 1-st adaption error is calculated by referring to (i) a difference between the 1-st characteristic information for training and the 1-st adaption characteristic information or a difference between the 2-nd characteristic information for training and the 1-st adaption characteristic information, and (ii) a 1-st adaption loss acquired by referring to (ii-1) a 1-st adaption task specific output on the 1-st feature adapted data created by using the 1-st adaption characteristic information and (ii-2) the training data GT, and wherein the 2-nd adaption error is calculated by referring to (i) a difference between the 1-st characteristic information for testing and the 2-nd adaption characteristic information or a difference between the 2-nd characteristic information for testing and the 2-nd adaption characteristic information, and (ii) a 2-nd adaption loss acquired by referring to (ii-1) a 2-nd adaption task specific output on the 2-nd feature adapted data created by using the 2-nd adaption characteristic information and (ii-2) a test data GT corresponding to test data.

As one example, the learning network includes a 1-st learning network to an n-th learning network respectively having one or more 1-st learned parameters to one or more n-th learned parameters wherein n is an integer greater than 0, on condition that the 1-st learning device has performed or is performing processes of (i) inputting the obfuscated training data into each of the 1-st learning network to the n-th learning network, to thereby allow each of the 1-st learning network to the n-th learning network to generate (1_1)-st characteristic information for training to (1_n)-th characteristic information for training by applying the learning operation to the obfuscated training data using the 1-st learned parameters to the n-th learned parameters, (ii) inputting the training data into each of the 1-st learning network to the n-th learning network, to thereby allow each of the 1-st learning network to the n-th learning network to generate (2_1)-st characteristic information for training to (2_n)-th characteristic information for training by applying the learning operation to the training data using the 1-st learned parameters to the n-th learned parameters, (iii) generating the 1-st error which is a weighted sum of a (1_1)-st error to a (1_n)-th error wherein the (1_1)-st error is calculated by referring to the (1_1)-st characteristic information for training and the (2_1)-st characteristic information for training and wherein the (1_n)-th error is calculated by referring to the (1_n)-th characteristic information for training and the (2_n)-th characteristic information for training, and (iv) learning the obfuscation network such that the 1st error is minimized and the 2-nd error is maximized, the processor performs processes of (i) (i-1) inputting the 1-st feature adapted data into each of the 1-st learning network to the n-th learning network, to thereby allow each of the 1-st learning network to the n-th learning network to generate (1_1)-st adaption characteristic information to (1_n)-th adaption characteristic information by applying the learning operation to the 1-st feature adapted data using the 1-st learned parameters to the n-th learned parameters, and (i-2) acquiring the 1-st adaption error by performing weighted summation of a difference between the (1_1)-st characteristic information for training and the (1_1)-st adaption characteristic information to a difference between the (1_n)-th characteristic information for training and the (1_n)-th adaption characteristic information, or by performing weighted summation of a difference between the (2_1)-st characteristic information for training and the (1_1)-st adaption characteristic information to a difference between the (2_n)-th characteristic information for training and the (1_n)-th adaption characteristic information, or (ii) (ii-1) inputting the 2-nd feature adapted data into each of the 1-st learning network to the n-th learning network, to thereby allow each of the 1-st learning network to the n-th learning network to generate (2_1)-st adaption characteristic information to (2_n)-th adaption characteristic information by applying the learning operation to the 2-nd feature adapted data using the 1-st learned parameters to the n-th learned parameters, and (ii-2) acquiring the 2-nd adaption error by performing weighted summation of (ii-1) a difference between (1_1)-st characteristic information for testing and the (2_1)-st adaption characteristic information to a difference between (1_n)-th characteristic information for testing and the (2_n)-th adaption characteristic information wherein the (1_1)-st characteristic information for testing to the (1_n)-th characteristic information for testing are respectively created by inputting the obfuscated test data into the 1-st learning network to the n-th learning network, or by performing weighted summation of (ii-2) a difference between the (2_1)-st characteristic information for testing and the (2_1)-st adaption characteristic information to a difference between the (2_n)-th characteristic information for testing and the (2_n)-th adaption characteristic information wherein the (2_1)-st characteristic information for testing to the (2_n)-th characteristic information for testing are respectively created by inputting the test data into the 1-st learning network to the n-th learning network.

As one example, the (1_1)-st error to the (1_n)-th error are calculated respectively by further referring to (i) a 1-st obfuscation loss acquired by referring to (i-1) a 1-st task specific output for training created by using the (1_1)-st characteristic information for training and (i-2) the training data GT to (ii) an n-th obfuscation loss acquired by referring to (ii-1) an n-th task specific output for training created by using the (1_n)-th characteristic information for training and (ii-2) the training data GT, wherein (i) each of a difference between the (1_1)-st characteristic information for training and the (1_1)-st adaption characteristic information to a difference between the (1_n)-th characteristic information for training and the (1_n)-th adaption characteristic information is determined respectively by further referring to each of a (1_1)-st adaption loss which is calculated by referring to a (1_1)-st adaption task specific output created using the (1_1)-st adaption characteristic information and by further referring to the training data GT to a (1_n)-th adaption loss which is calculated by referring to a (1_n)-th adaption task specific output created using the (1_n)-th adaption characteristic information and by further referring to the training data GT, or wherein (ii) each of a difference between the (2_1)-st characteristic information for training and the (1_1)-st adaption characteristic information to a difference between the (2_n)-th characteristic information for training and the (1_n)-th adaption characteristic information is determined respectively by further referring to each of the (1_1)-st adaption loss which is calculated by referring to the (1_1)-st adaption task specific output created using the (1_1)-st adaption characteristic information and by further referring to the training data GT to the (1_n)-th adaption loss which is calculated by referring to the (1_n)-th adaption task specific output created using the (1_n)-th adaption characteristic information and by further referring to the training data GT, and wherein (i) each of a difference between the (1_1)-st characteristic information for testing and the (2_1)-st adaption characteristic information to a difference between the (1_n)-th characteristic information for testing and the (2_n)-th adaption characteristic information is determined respectively by further referring to each of a (2_1)-st adaption loss which is calculated by referring to a (2_1)-st adaption task specific output created using the (2_1)-st adaption characteristic information and by further referring to the test data GT to a (2_n)-th adaption loss which is calculated by referring to a (2_n)-th adaption task specific output created using the (2_n)-th adaption characteristic information and by further referring to the test data GT, or wherein (ii) each of a difference between the (2_1)-st characteristic information for testing and the (2_1)-st adaption characteristic information to a difference between the (2_n)-th characteristic information for testing and the (2_n)-th adaption characteristic information is determined respectively by further referring to each of the (2_1)-st adaption loss which is calculated by referring to the (2_1)-st adaption task specific output created using the (2_1)-st adaption characteristic information and by further referring to the test data GT to a (2_n)-th adaption loss which is calculated by referring to the (2_n)-th adaption task specific output created using the (2_n)-th adaption characteristic information and by further referring to the test data GT.

As one example, the learning network includes a 1-st learning network to an n-th learning network respectively having one or more 1-st learned parameters to one or more n-th learned parameters wherein n is an integer greater than 0, on condition that the 1-st learning device has performed or is performing processes of (i) inputting the obfuscated training data into each of the 1-st learning network to the n-th learning network, to thereby allow each of the 1-st learning network to the n-th learning network to generate (1_1)-st characteristic information for training to (1_n)-th characteristic information for training by applying the learning operation to the obfuscated training data using the 1-st learned parameters to the n-th learned parameters, (ii) inputting the training data into each of the 1-st learning network to the n-th learning network, to thereby allow each of the 1-st learning network to the n-th learning network to generate (2_1)-st characteristic information for training to (2_n)-th characteristic information for training by applying the learning operation to the training data using the 1-st learned parameters to the n-th learned parameters, (iii) generating the 1-st error which is a weighted sum of a 1-st obfuscation loss to an n-th obfuscation loss wherein the 1-st obfuscation loss is calculated by referring to a 1-st task specific output for training created by using the (1_1)-st characteristic information for training and by referring to the training data GT and the n-th obfuscation loss is calculated by referring to an n-th task specific output for training created by using the (1_n)-th characteristic information for training and by referring to the training data GT, and (iv) learning the obfuscation network such that the 1st error is minimized and the 2-nd error is maximized, the processor performs processes of (i) (i-1) inputting the 1-st feature adapted data into each of the 1-st learning network to the n-th learning network, to thereby allow each of the 1-st learning network to the n-th learning network to generate (1_1)-st adaption characteristic information to (1_n)-th adaption characteristic information by applying the learning operation to the 1-st feature adapted data using the 1-st learned parameters to the n-th learned parameters, and (i-2) acquiring the 1-st adaption error by performing weighted summation of a (1_1)-st adaption loss to a (1_n)-th adaption loss wherein the (1_1)-st adaption loss is calculated by referring to a (1_1)-st adaption task specific output created by using the (1_1)-st adaption characteristic information and by referring to the training data GT, and the (1_n)-th adaption loss is calculated by referring to a (1_n)-th adaption task specific output created by using the (1_n)-th adaption characteristic information and by referring to the training data GT, or (ii) (ii-1) inputting the 2-nd feature adapted data into each of the 1-st learning network to the n-th learning network, to thereby allow each of the 1-st learning network to the n-th learning network to generate (2_1)-st adaption characteristic information to (2_n)-th adaption characteristic information by applying the learning operation to the 2-nd feature adapted data using the 1-st learned parameters to the n-th learned parameters, and (ii-2) acquiring the 2-nd adaption error by performing weighted summation of (ii-1) a (2_1)-st adaption loss to a (2_n)-th adaption loss wherein the (2_1)-st adaption loss is calculated by referring to a (2_1)-st adaption task specific output created by using the (2_1)-st adaption characteristic information and by referring to the test data GT and the (2_n)-th adaption loss is calculated by referring to a (2_n)-th adaption task specific output created by using the (2_n)-th adaption characteristic information and by referring to the test data GT.

As one example, the learning network includes a 1-st learning network to an n-th learning network respectively having one or more 1-st learned parameters to one or more n-th learned parameters wherein n is an integer greater than 0, on condition that the 1-st learning device has performed or is performing processes of (i) (i-1) inputting the 1-st obfuscated training data, which is the obfuscated training data, into the 1-st learning network, to thereby allow the 1-st learning network to generate (1_1)-st characteristic information for training by applying the learning operation to the 1-st obfuscated training data using the 1-st learned parameters, (ii-2) inputting the training data into the 1-st learning network, to thereby allow the 1-st learning network to generate (2_1)-st characteristic information for training by applying the learning operation to the training data using the 1-st learned parameters, and (ii-3) learning the obfuscation network such that a (1_1)-st error is minimized which is calculated by referring to the (1_1)-st characteristic information for training and the (2_1)-st characteristic information for training and such that a (2_1)-st error is maximized which is calculated by referring to the training data and the 1-st obfuscated training data to thereby allow the obfuscation network to be a 1-st learned obfuscation network, and (ii) while increasing an integer k from 2 to n, (ii-1) inputting the training data into a (k−1)-th learned obfuscation network, to thereby allow the (k−1)-th learned obfuscation network to generate k-th obfuscated training data, (ii-2) (1) inputting the k-th obfuscated training data into a k-th learning network, to thereby allow the k-th learning network to generate (1_k)-th characteristic information for training by applying the learning operation to the k-th obfuscated training data using k-th learned parameters, and (2) inputting the training data into the k-th learning network, to thereby allow the k-th learning network to generate (2_k)-th characteristic information for training by applying the learning operation to the training data using the k-th learned parameters, and (ii-3) learning the obfuscation network such that a (1_k)-th error is minimized which is calculated by referring to the (1_k)-th characteristic information for training and the (2_k)-th characteristic information for training and such that a (2_k)-th error is maximized which is calculated by referring to the training data and the k-th obfuscated training data, to thereby allow the (k−1)-th learned obfuscation network to be a k-th learned obfuscation network, the processor performs processes of (i) (i-1) inputting (1_1)-st feature adapted data which is the 1-st feature adapted data into the 1-st learning network, to thereby allow the 1-st learning network to generate (1_1)-st adaption characteristic information by applying the learning operation to the (1_1)-st feature adapted data using the 1-st learned parameters, (i-2) learning the adaption network such that a (1_1)-st adaption error is minimized which is calculated by referring to a difference between the (1_1)-st characteristic information for training and the (1_1)-st adaption characteristic information or a difference between the (2_1)-st characteristic information for training and the (1_1)-st adaption characteristic information, to thereby allow the adaption network to be a 1-st learned adaption network, inputting the training data into a (k−1)-th learned adaption network, to thereby allow the (k−1)-th learned adaption network to generate (1_k)-th feature adapted data, inputting the (1_k)-th feature adapted data into the k-th learning network, to thereby allow the k-th learning network to generate (1_k)-th adaption characteristic information by applying the learning operation to the (1_k)-th feature adapted data, and (i-3) learning the (k−1)-th learned adaption network such that a (1_k)-th adaption error is minimized which is calculated by referring to a difference between the (1_k)-th characteristic information for training and the (1_k)-th adaption characteristic information or a difference between the (2_k)-th characteristic information for training and the (1_k)-th adaption characteristic information, to thereby allow the (k−1)-th learned adaption network to be a k-th learned adaption network, or (ii) (ii-1) inputting the obfuscated test data into the 1-st learning network to the n-th learning network, to thereby allow each of the 1-st learning network to the n-th learning network to generate (1_1)-st characteristic information for testing to the (1_n)-th characteristic information for testing by applying the learning operation to the obfuscated test data, or inputting the test data into the 1-st learning network to the n-th learning network, to thereby allow each of the 1-st learning network to the n-th learning network to generate (2_1)-st characteristic information for testing to (2_n)-th characteristic information for testing by applying the learning operation to the test data, (ii-2) inputting (2_1)-st feature adapted data which is the 2-nd feature adapted data into the 1-st learning network, to thereby allow the 1-st learning network to generate (2_1)-st adaption characteristic information by applying the learning operation to the (2_1)-st feature adapted data using the 1-st learned parameters, (ii-3) learning the adaption network such that a (2_1)-st adaption error is minimized which is calculated by referring to a difference between the (1_1)-st characteristic information for testing and the (2_1)-st adaption characteristic information or a difference between the (2_1)-st characteristic information for testing and the (2_1)-st adaption characteristic information to thereby allow the adaption network to be a 1-st learned adaption network, inputting the test data into the (k−1)-th learned adaption network, to thereby allow the (k−1)-th learned adaption network to generate (2_k)-th feature adapted data, inputting the (2_k)-th feature adapted data into the k-th learning network, to thereby allow the k-th learning network to generate (2_k)-th adaption characteristic information by applying the learning operation to the (2_k)-th feature adapted data, and (ii-4) learning the (k−1)-th learned adaption network such that a (2_k)-th adaption error is minimized which is calculated by referring to a difference between the (1_k)-th characteristic information for testing and the (2_k)-th adaption characteristic information or a difference between the (2_k)-th characteristic information for testing and the (2_k)-th adaption characteristic information, to thereby allow the (k−1)-th learned adaption network to be a k-th learned adaption network.

As one example, the (1_k)-th error is calculated by further referring to a k-th obfuscation loss acquired by referring to (i) a k-th task specific output for training, on the k-th obfuscated training data created by using the (1_k)-th characteristic information for training and (ii) a training data GT corresponding to the training data, wherein (i) each of a difference between the (1_1)-st characteristic information for training and the (1_1)-st adaption characteristic information to a difference between the (1_n)-th characteristic information for training and the (1_n)-th adaption characteristic information is determined respectively by further referring to each of a (1_1)-st adaption loss which is calculated by referring to a (1_1)-st adaption task specific output created using the (1_1)-st adaption characteristic information and by further referring to the training data GT to a (1_n)-th adaption loss which is calculated by referring to a (1_n)-th adaption task specific output created using the (1_n)-th adaption characteristic information and by further referring to the training data GT, or wherein (ii) each of a difference between the (2_1)-st characteristic information for training and the (1_1)-st adaption characteristic information to a difference between the (2_n)-th characteristic information for training and the (1_n)-th adaption characteristic information is determined respectively by further referring to each of a (1_1)-st adaption loss which is calculated by referring to a (1_1)-st adaption task specific output created using the (1_1)-st adaption characteristic information and by further referring to the training data GT to a (1_n)-th adaption loss which is calculated by referring to a (1_n)-th adaption task specific output created using the (1_n)-th adaption characteristic information and by further referring to the training data GT, and wherein (i) each of a difference between the (1_1)-st characteristic information for testing and the (2_1)-st adaption characteristic information to a difference between the (1_n)-th characteristic information for testing and the (2_n)-th adaption characteristic information is determined respectively by further referring to each of a (2_1)-st adaption loss which is calculated by referring to a (2_1)-st adaption task specific output created using the (2_1)-st adaption characteristic information and by further referring to the test data GT to a (2_n)-th adaption loss which is calculated by referring to a (2_n)-th adaption task specific output created using the (2_n)-th adaption characteristic information and by further referring to the test data GT, or wherein (ii) each of a difference between the (2_1)-st characteristic information for testing and the (2_1)-st adaption characteristic information to a difference between the (2_n)-th characteristic information for testing and the (2_n)-th adaption characteristic information is determined respectively by further referring to each of the (2_1)-st adaption loss which is calculated by referring to the (2_1)-st adaption task specific output created using the (2_1)-st adaption characteristic information and by further referring to the test data GT to a (2_n)-th adaption loss which is calculated by referring to the (2_n)-th adaption task specific output created using the (2_n)-th adaption characteristic information and by further referring to the test data GT.

As one example, the learning network includes a 1-st learning network to an n-th learning network respectively having one or more 1-st learned parameters to one or more n-th learned parameters wherein n is an integer greater than 0, on condition that the 1-st learning device has performed or is performing processes of (i) (i-1) inputting the 1-st obfuscated training data, which is the obfuscated training data, into the 1-st learning network, to thereby allow the 1-st learning network to generate (1_1)-st characteristic information for training by applying the learning operation to the 1-st obfuscated training data using the 1-st learned parameters, (ii-2) inputting the training data into the 1-st learning network, to thereby allow the 1-st learning network to generate (2_1)-st characteristic information for training by applying the learning operation to the training data using the 1-st learned parameters, and (ii-3) learning the obfuscation network such that a (1_1)-st error is minimized which is calculated by referring to the (1_1)-st characteristic information for training and the (2_1)-st characteristic information for training and such that a (2_1)-st error is maximized which is calculated by referring to the training data and the 1-st obfuscated training data to thereby allow the obfuscation network to be a 1-st learned obfuscation network, and (ii) while increasing an integer k from 2 to n, (ii-1) inputting the training data into a (k−1)-th learned obfuscation network, to thereby allow the (k−1)-th learned obfuscation network to generate k-th obfuscated training data, (ii-2) (i) inputting the k-th obfuscated training data into a k-th learning network, to thereby allow the k-th learning network to generate (1_k)-th characteristic information for training by applying the learning operation to the k-th obfuscated training data using k-th learned parameters, and (2) inputting the training data into the k-th learning network, to thereby allow the k-th learning network to generate (2_k)-th characteristic information for training by applying the learning operation to the training data using the k-th learned parameters, and (ii-3) learning the obfuscation network such that a (1_k)-th error is minimized which is calculated by referring to the (1_k)-th characteristic information for training and the (2_k)-th characteristic information for training and such that a (2_k)-th error is maximized which is calculated by referring to the training data and the k-th obfuscated training data, to thereby allow the (k−1)-th learned obfuscation network to be a k-th learned obfuscation network, the processor performs processes of (i) (i-1) inputting (1_1)-st feature adapted data which is the 1-st feature adapted data into the 1-st learning network, to thereby allow the 1-st learning network to generate (1_1)-st adaption characteristic information by applying the learning operation to the (1_1)-st feature adapted data using the 1-st learned parameters, (i-2) learning the adaption network such that a (1_1)-st adaption loss is minimized which is calculated by referring to a (1_1)-st adaption task specific output created by using the (1_1)-st adaption characteristic information and by refer-ring to the training data GT, to thereby allow the adaption network to be a 1-st learned adaption network, inputting the training data into a (k−1)-th learned adaption network, to thereby allow the (k−1)-th learned adaption network to generate (1_k)-th feature adapted data, inputting the (1_k)-th feature adapted data into the k-th learning network, to thereby allow the k-th learning network to generate (1_k)-th adaption characteristic information by applying the learning operation to the (1_k)-th feature adapted data, and (i-3) learning a (k−1)-th learned adaption network such that a (1_k)-th adaption loss is minimized which is calculated by referring to a (1_k)-th adaption task specific output created by using the (1_k)-th adaption characteristic information and by referring to the training GT, to thereby allow the (k−1)-th learned adaption network to be a k-th learned adaption network, or (ii) (ii-1) inputting a (2_1)-st feature adapted data which is the 2-nd feature adapted data into the 1-st learning network, to thereby allow the 1-st learning network to generate (2_1)-st adaption characteristic information by applying the learning operation to the (2_1)-st feature adapted data using the 1-st learned parameters, (ii-2) learning the adaption network such that a (2_1)-st adaption loss is minimized which is calculated by referring to a (2_1)-st adaption task specific output created by using the (2_1)-st adaption characteristic information and by referring to the test data GT, to thereby allow the adaption network to be a 1-st learned adaption network, inputting the test data into a (k−1)-th learned adaption network, to thereby allow the (k−1)-th learned adaption network to generate (2_k)-th feature adapted data, inputting the (2_k)-th feature adapted data into the k-th learning network, to thereby allow the k-th learning network to generate (2_k)-th adaption characteristic information by applying the learning operation to the (2_k)-th feature adapted data, and (ii-3) learning a (k−1)-th learned adaption network such that a (2_k)-th adaption loss is minimized which is calculated by referring to a (2_k)-th adaption task specific output created by using the (2_k)-th adaption characteristic information and by referring to the test data GT to thereby allow the (k−1)-th learned adaption network to be a k-th learned adaption network.

In accordance with still yet another aspect of the present disclosure, there is provided a testing device for testing an adaption network corresponding to an obfuscation network used for concealing original data to protect personal information including: at least one memory that stores instructions; and at least one processor configured to execute the instructions to perform or support another device to perform processes of: (I) after a 1-st learning device has performed or while the 1-st learning device is performing processes of (i) instructing the obfuscation network to obfuscate training data inputted into the obfuscation network, to thereby generate obfuscated training data, (ii) (ii-1) inputting the obfuscated training data into a learning network having its own one or more learned parameters, to thereby allow the learning network to generate 1-st characteristic information for training by applying a learning operation to the obfuscated training data using the learned parameters, and (ii-2) inputting the training data into the learning network, to thereby allow the learning network to generate 2-nd characteristic information for training by applying the learning operation to the training data using the learned parameters, and (iii) learning the obfuscation network such that a 1-st error is minimized which is calculated by referring to the 1-st characteristic information for training and the 2-nd characteristic information for training, and such that a 2-nd error is maximized which is calculated by referring to the training data and the obfuscated training data, on condition that a 2-nd learning device has performed (i) one of (i-1) a process of inputting the training data into the adaption network, to thereby allow the adaption network to adapt the training data and thus to generate 1-st feature adapted training data, and (i-2) a process of inputting 1-st test data into the adaption network, to thereby allow the adaption network to adapt the test data and thus to generate 2-nd feature adapted training data; and (ii) one of (ii-1) a process of acquiring a 1-st adaption ground truth corresponding to the obfuscated training data generated by the obfuscation network, and learning the adaption network such that a 1-st adaption error is minimized which is calculated by referring to (1) a 1-st adaption reference corresponding to the 1-st feature adapted training data and (2) the 1-st adaption ground truth, and (ii-2) a process of learning the adaption network such that a 2-nd adaption error is minimized which is calculated by referring to a 2-nd adaption ground truth corresponding to obfuscated test data generated by inputting the test data into the learned obfuscation network and further referring to a 2-nd adaption reference corresponding to the 2-nd feature adapted training data, acquiring 2-nd test data to be used for concealing, and (II) inputting the 2-nd test data into the adaption network, to thereby allow the adaption network to generate a feature adapted test data by adapting the 2-nd test data, and acquiring the feature adapted test data as concealed data of the 2-nd test data.

In addition, recordable media that are readable by a computer for storing a computer program to execute the method of the present disclosure are further provided.

BRIEF DESCRIPTION OF THE DRAWINGS

The above and other objects and features of the present disclosure will become apparent from the following description of preferred embodiments given in conjunction with the accompanying drawings, in which.

DETAILED DESCRIPTION OF THE PREFERRED EMBODIMENTS

Figure 1:
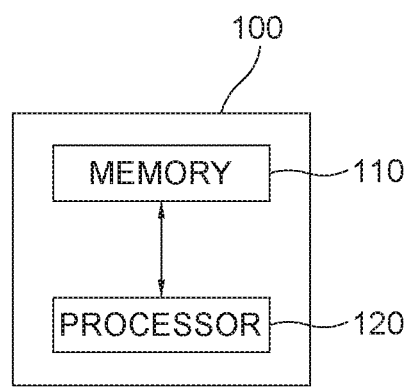
FIG. 1 is a drawing schematically illustrating a learning device for learning an adaption network corresponding to an obfuscation network capable of concealing original data in accordance with one example embodiment of the present disclosure.

In the following detailed description, reference is made to the accompanying drawings that show, by way of illustration, specific embodiments in which the present disclosure may be practiced. These embodiments are described in sufficient detail to enable those skilled in the art to practice the present disclosure. It is to be understood that the various embodiments of the present disclosure, although different, are not necessarily mutually exclusive. For example, a particular feature, structure, or characteristic described herein may be implemented as being changed from an embodiment to other embodiments without departing from the spirit and scope of the present disclosure. In addition, it is to be understood that the position or arrangement of individual elements within each embodiment may be modified without departing from the spirit and scope of the present disclosure. The following detailed description is, therefore, not to be taken in a limiting sense, and the scope of the present disclosure is described as including the appended claims, along with the full range of equivalents to which the claims are entitled. In the drawings, like numerals refer to the same or similar components throughout the several aspects. Besides, in the detailed description and claims of the present disclosure, a term "include" and its variations are not intended to exclude other technical features, additions, components or steps. As used in this specification and the appended claims, the singular forms "a," "an," and "the" include plural referents unless the content and context clearly dictates otherwise. The headings and abstract of the present disclosure provided herein are for convenience only and do not limit or interpret the scope or meaning of the embodiments.

The headings and abstract of the present disclosure provided herein are for convenience only and do not limit or interpret the scope or meaning of the embodiments.

To allow those skilled in the art to carry out the present disclosure easily, the example embodiments of the present disclosure will be explained in detail as shown below by referring to attached drawings.

FIG. 1 is a drawing schematically illustrating a 2-nd learning device for learning an adaption network corresponding to an obfuscation network capable of concealing, e.g., anonymizing, original data in accordance with one example embodiment of the present disclosure. A 1-st learning device will be described later.

By referring to FIG. 1, the 2-nd learning device 100 in accordance with one example embodiment of the present disclosure may include a memory 110 for storing instructions to learn the adaption network which is a machine learning model having same types of formats of inputs and outputs of those of the obfuscation network but having an architecture different from that of the obfuscation network capable of obfuscating at least one input data such that the learning network outputs a result, calculated by using the obfuscated data, same or similar to a result calculated by using the input data, and a processor 120 for performing processes to learn the obfuscation network according to the instructions in the memory 110.

Specifically, the 2-nd learning device 100 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

Also, the processors of such devices may include hardware configuration of MPU (Micro Processing Unit) or CPU (Central Processing Unit), cache memory, data bus, etc. Additionally, the computing device may further include OS and software configuration of applications that achieve specific purposes.

Such description of the computing device does not exclude an integrated device including any combination of a processor, a memory, a medium, or any other computing components for implementing the present disclosure.

Herein, the adaption network may be designed to use less computing resources than the obfuscation network. As an example, the adaption network may have fewer parameters to be used for calculation or shallower depth compared to the obfuscation network, or may be a learning model in which a part of layers of the obfuscation network is eliminated. Also, the adaption network may perform at least one function similar to that of the obfuscation network, using at least one different learning model from that of the obfuscation network.

That is, if the obfuscation network, which is learned to obfuscate the original data to output the concealed data, e.g., anonymized data, such that the learning network outputs a same or similar result from the input data when the concealed data is inputted into the learning network, is installed on a device with less computing resources, then this may cause overhead in the device, thus the adaption network is used which uses less computing resources but functions similarly to the obfuscation network, to prevent the overhead. Also, if the obfuscation network is open to public access, a third party may use the obfuscation network to learn a big model, then there may be a problem that the original data which is not concealed may be acquired from the obfuscated data which has been concealed by using the learned big model of the obfuscation network, thus, for security of the obfuscation network, the adaption network may be open to public access instead of the obfuscation network.

Meanwhile, the 2-nd learning device 100 may perform processes of (a) on condition that a 1-st learning device has performed or is performing processes of (i) if training data is inputted into the obfuscation network, instructing the obfuscation network to obfuscate the training data, to thereby generate obfuscated training data, (ii) (ii-1) inputting the obfuscated training data into a learning network having its own one or more learned parameters, to thereby allow the learning network to generate 1-st characteristic information for training by applying a learning operation to the obfuscated training data using the learned parameters, and (ii-2) inputting the training data into the learning network, to thereby allow the learning network to generate 2-nd characteristic information for training by applying the learning operation to the training data using the learned parameters, and (iii) learning the obfuscation network such that a 1-st error is minimized which is calculated by referring to the 1-st characteristic information for training and the 2-nd characteristic information for training, and such that a 2-nd error is maximized which is calculated by referring to the training data and the obfuscated training data, a 2-nd learning device performing one of a process of inputting the training data into the adaption network, to thereby allow the adaption network to adapt the training data and thus to generate 1-st feature adapted data, and a process of inputting test data into the adaption network, to thereby allow the adaption network to adapt the test data and thus to generate 2-nd feature adapted data. And, the 2-nd learning device 100 may perform one of (i) a process of acquiring a 1-st adaption ground truth corresponding to the obfuscated training data generated by the obfuscation network, and learning the adaption network such that a 1-st adaption error is minimized which is calculated by referring to (1) a 1-st adaption reference corresponding to the 1-st feature adapted data and (2) the 1-st adaption ground truth, and (ii) a process of learning the adaption network such that a 2-nd adaption error is minimized which is calculated by referring to a 2-nd adaption ground truth corresponding to obfuscated test data generated by inputting the test data into the learned obfuscation network and further referring to a 2-nd adaption reference corresponding to the 2-nd feature adapted data. Herein, the 1-st adaption reference and the 2-nd adaption reference will be described later.

Herein, the 1-st learning device may include a memory for storing instructions to learn the obfuscation network capable of obfuscating, e.g., anonymizing, training data such that the learning network outputs a result, calculated by using the obfuscated training data as an input, same or similar to a result calculated by using the training data as an input, and a processor for performing processes to learn the obfuscation network according to the instructions in the memory. Specifically, the 1-st learning device may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software. Also, the processors of such devices may include hardware configuration of MPU (Micro Processing Unit) or CPU (Central Processing Unit), cache memory, data bus, etc. Additionally, the computing device may further include OS and software configuration of applications that achieve specific purposes.

Also, the 1-st learning device and the 2-nd learning device 100 may be a same device or different devices.

A method for learning the adaption network corresponding to the obfuscation network capable of concealing, e.g., anonymizing, the original data to protect personal information by using the 2-nd learning device 100 in accordance with one example embodiment of the present disclosure is described by referring to FIGS. 2 to 5 as follows.

Figure 2:
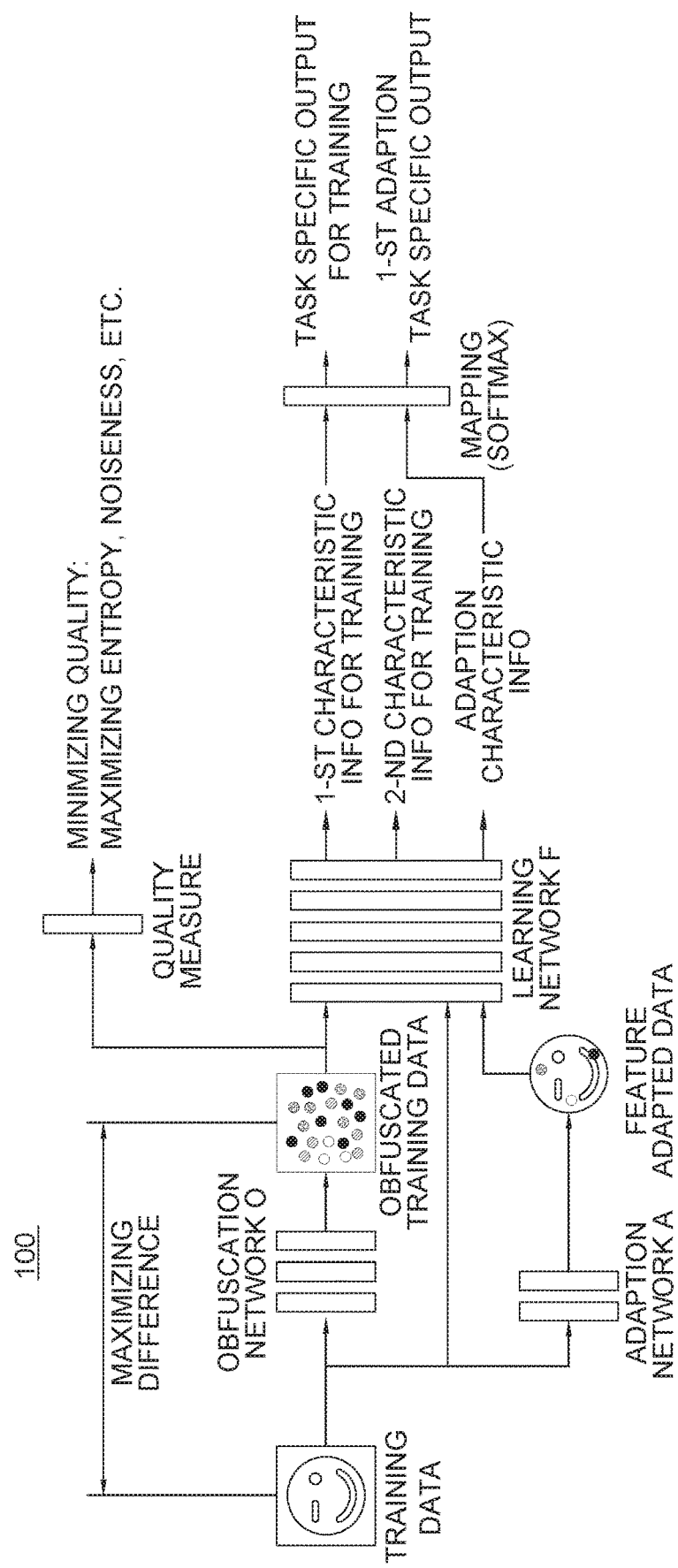
FIG. 2 is a drawing schematically illustrating a learning method for learning the adaption network corresponding to the obfuscation network capable of concealing the original data in accordance with one example embodiment of the present disclosure.

FIG. 2 is a drawing schematically illustrating a learning method for learning the adaption network corresponding to the obfuscation network capable of concealing the original data in accordance with one example embodiment of the present disclosure.

First, a method for learning the obfuscation network O used for concealing, e.g., anonymizing, the original data using the 1-st learning device is described.

If the training data is acquired, the 1-st learning device may input the training data into the obfuscation network O, and allow the obfuscation network O to obfuscate the training data and thus to generate the obfuscated training data.

Herein, the training data may be original training data which is the original data to be used for learning, or may be modified training data generated by modifying the original training data, and the modified training data may be generated by adding at least one random noise created through a random noise generating network (not illustrated) to the original training data. As one example, the random noise generating network may be instructed to generate the random noise having a normal distribution N(0, σ), and the generated noise may be added to the original training data, to thereby generate the modified training data. Also, the modified training data may be generated by blurring the original training data, or changing a resolution of the original training data, as well as using the random noise, but the scope of the present disclosure is not limited thereto, and various ways of modifying the original training data may be used.

And, the obfuscated training data may be recognized as data different from the training data by a human, but may be recognized as data similar or same as the training data by the learning network.

Meanwhile, as one example, the obfuscation network O may include at least one encoder having one or more convolutional layers for applying one or more convolution operations to images as the training data, and at least one decoder having one or more deconvolutional layers for applying one or more deconvolution operations to at least one feature map outputted from the encoder and thus for generating the obfuscated training data, but the scope of the present disclosure is not limited thereto, and may include any learning networks having various structures capable of obfuscating the inputted training data.

And, the 1-st learning device may perform or support another device to perform processes of (i) inputting the obfuscated training data into the learning network F having its own one or more learned parameters, and allowing the learning network F to (i-1) apply a network operation to the obfuscated training data using the learned parameters and thus to (i-2) generate 1-st characteristic information for training corresponding to the obfuscated training data, and (ii) inputting the training data into the learning network F, and allowing the learning network F to (ii-1) apply the network operation to the training data using the learned parameters and thus to (ii-2) generate 2-nd characteristic information for training corresponding to the training data.

Herein, the learning network F may include a machine learning network, but the scope of the present disclosure is not limited thereto, and may include any learning networks capable of generating the 1-st characteristic information for training by applying the network operation with their own learned parameters to the training data, and thus generating the 2-nd characteristic information for training by applying the network operation to the training data. And, the machine learning network may include at least one of a k-Nearest Neighbors, a Linear Regression, a Logistic Regression, a Support Vector Machine (SVM), a Decision Tree and Random Forest, a Neural Network, a Clustering, a Visualization and a Dimensionality Reduction, an Association Rule Learning, a Deep Belief Network, a Reinforcement Learning, and a Deep learning algorithm, but the machine learning network is not limited thereto and may include various learning algorithms. Also, a subject to be concealed, e.g., a subject to be anonymized, may be personal information included in the original data. Herein, the personal information may include any information related to a person, such as personal identification information, personal medical information, personal biometric information, personal behavioral information, etc.

And, the 1-st characteristic information for training and the 2-nd characteristic information for training may be features or logits respectively corresponding to the obfuscated training data and the training data. Also, the 1-st characteristic information for training and the 2-nd characteristic information for training may be feature values related to certain features included respectively in the obfuscated training data and the training data, or the logits including values related to at least one of vectors, matrices, and coordinates related to the certain features. For example, if the training data are facial image data, the result above may be classes for face recognition, facial features, e.g., laughing expressions, coordinates of facial landmark points, e.g., both end points on far sides of an eye.

Thereafter, the 1-st learning device may learn the obfuscation network O, such that the 1-st error is minimized which is calculated by referring to the 1-st characteristic information for training, and such that the 2-nd error is maximized which is calculated by referring to the training data and the obfuscated training data.

That is, the 1-st learning device may learn the obfuscation network O such that (i) at least one 1-st error is minimized which is calculated by referring to at least part of (i-1) at least one (1_1)-st error acquired by referring to the 1-st characteristic information for training and the 2-nd characteristic information for training, and (i-2) at least one (1_2)-nd error which is the obfuscation loss acquired by referring to at least one task specific output for training generated by using the 1-st characteristic information for training and by further referring to at least one training data GT (Ground Truth) corresponding to the task specific output for training, and such that (ii) at least one 2-nd error is maximized which is calculated by referring to the training data and the obfuscated training data. In detail, the 1-st learning device may learn the obfuscation network O, such that the obfuscation network O outputs the obfuscated training data much different from the training data by using the 2-nd error, and such that the obfuscation network O obfuscates the training data by using the 1-st error, in order for the learning network F to recognize the obfuscated training data as same or similar to the training data, to thereby output the obfuscated training data.

Herein, the 1-st learning device may acquire the 1-st error by referring to at least part of (i) a difference between the 1-st characteristic information for training and the 2-nd characteristic information for training and (ii) at least one difference between the task specific output for training and its corresponding training data GT. As one example, the 1-st learning device may acquire the 1-st error by referring to a norm or a cosine similarity between the 1-st characteristic information for training and the 2-nd characteristic information for training, but the scope of the present disclosure is not limited thereto, and any various algorithms capable of calculating a difference between the 1-st characteristic information for training and the 2-nd characteristic information for training may be used. Also, the 1-st learning device may acquire the 2-nd error by referring to at least one difference between the training data and the obfuscated training data.

Also, the 1-st learning device may measure at least one quality by referring to at least part of an entropy and a degree of noise of the obfuscated training data, and may acquire the 1-st error by further referring to the measured quality. That is, the 1-st learning device may learn the obfuscation network O, such that the quality of the obfuscated training data is minimized, for example, such that at least part of the entropy, noise, etc. of the obfuscated training data is maximized.

And, if the 1-st learning device learns the obfuscation network O such that the 1-st error is minimized and that the 2-nd error is maximized, then the 1-st learning device may fix and not update learned parameters of the learning network F, and may proceed with learning the obfuscation network O only.

Meanwhile, the task specific output for training may be an output of a task to be performed by the learning network F, and may have various results according to the task learned by the learning network F, such as a probability of a class for classification, coordinates resulting from regression for location detection, etc., and an activation function of an activation unit may be applied to the 1-st characteristic information for training outputted from the learning network F, to thereby generate the task specific output for training according to the task to be performed by the learning network F. Herein, the activation functions may include a sigmoid function, a linear function, a softmax function, an rlinear function, a square function, a sqrt function, an srlinear function, an abs function, a tan h function, a brlinear function, etc. but the scope of the present disclosure is not limited thereto.

As one example, when the learning network F performs the task for the classification, the 1-st learning device may map the 1-st characteristic information for training outputted from the learning network F onto each of classes, to thereby generate one or more probabilities of the obfuscated training data, for each of the classes. Herein, the probabilities for each of the classes may represent probabilities of the 1-st characteristic information for training, outputted for each of the classes from the learning network F, being correct. For example, if the training data are the facial image data, a probability of the face having a laughing expression may be outputted as 0.75, and a probability of the face not having the laughing expression may be outputted as 0.25, and the like. Herein, a softmax algorithm may be used for mapping the 1-st characteristic information for training outputted from the learning network F onto each of the classes, but the scope of the present disclosure is not limited thereto, and various algorithms may be used for mapping the 1-st characteristic information for training onto each of the classes.

Next, while the obfuscation network O is being learned by the 1-st learning device using the processes above, the 2-nd learning device 100 may input the training data into the adaption network A, to thereby allow the adaption network A to adapt the training data and thus to generate the 1-st feature adapted data. Herein, the 1-st learning device and the 2-nd learning device 100 may be a same device or different devices.

And, the 2-nd learning device 100 may perform a process of acquiring a 1-st adaption ground truth corresponding to the obfuscated training data generated by the obfuscation network O, and learning the adaption network A such that a 1-st adaption error is minimized which is calculated by referring to (1) a 1-st adaption reference corresponding to the 1-st feature adapted data and (2) the 1-st adaption ground truth.

Herein, the 2-nd learning device 100 may acquire the obfuscated training data as the 1-st adaption ground truth, may acquire the 1-st feature adapted data as the 1-st adaption reference, and may acquire the 1-st adaption error by referring to the difference between the obfuscated training data and the 1-st feature adapted data.

Meanwhile, the 2-nd learning device 100 may perform (i) a process of inputting the 1-st feature adapted data into the learning network F, to thereby allow the learning network F to output the 1-st adaption characteristic information, corresponding to the 1-st feature adapted data, as the 1-st adaption reference by applying the learning operation to the 1-st feature adapted data using the learned parameters, and (ii) a process of acquiring the 1-st adaption error by referring to one of (ii-1) a difference between the 1-st characteristic information for training and the 1-st adaption characteristic information and (ii-2) a difference between the 2-nd characteristic information for training and the 1-st adaption characteristic information.

Also, the 2-nd learning device 100 may acquire the 1-st adaption error by further referring to the 1-st adaption loss calculated by referring to (i) the 1-st adaption task specific output on the 1-st feature adapted data created by using the 1-st adaption characteristic information and (ii) the training data GT.

Herein, the 1-st adaption task specific output may be an output of a task to be performed by the learning network F, and may have various results according to the task learned by the learning network F, such as a probability of a class for classification, coordinates resulting from regression for location detection, etc., and the activation function of the activation unit may be applied to the 1-st adaption characteristic information outputted from the learning network F, to thereby generate the 1-st adaption task specific output according to the task to be performed by the learning network F.

In addition, the 2-nd learning device 100 may acquire the 1-st adaption error calculated by referring to (i) one of (i-1) a difference between the 1-st characteristic information for training and the 1-st adaption characteristic information and (i-2) a difference between the 2-nd characteristic information for training and the 1-st adaption characteristic information and (ii) the 1-st adaption loss calculated by referring to (ii-1) the 1-st adaption task specific output on the 1-st feature adapted data created by using the 1-st adaption characteristic information and (ii-2) the training data GT.

As another example, on condition that the obfuscation network O has been learned by the 1-st learning device using the processes above, the 2-nd learning device 100 may input the test data into the adaption network A, to thereby allow the adaption network A to adapt the test data and thus to generate the 2-nd feature adapted data.

And, the 2-nd learning device 100 may perform a process of inputting the test data into the learned obfuscation network O, to thereby allow the learned obfuscation network O to generate the obfuscated test data, a process of acquiring a 2-nd adaption ground truth corresponding to the obfuscated test data, and a process of learning the adaption network A such that a 2-nd adaption error is minimized which may be calculated by referring to (1) 2-nd adaption reference corresponding to the 2-nd feature adapted data and (2) the 2-nd adaption ground truth.

Herein, the 2-nd learning device 100 may acquire the obfuscated test data as the 2-nd adaption ground truth, may acquire the 2-nd feature adapted data as the 2-nd adaption reference, and may acquire the 2-nd adaption error by referring to the difference between the obfuscated test data and the 2-nd feature adapted data.

Meanwhile, the 2-nd learning device 100 may perform a process of inputting the 2-nd feature adapted data into the learning network F, to thereby allow the learning network F to output the 2-nd adaption characteristic information, corresponding to the 2-nd feature adapted data, as the 2-nd adaption reference by applying the learning operation to the 2-nd feature adapted data using the learned parameters. And, the 2-nd adaption error may be calculated by referring to the difference between the 1-st characteristic information for testing and the 2-nd adaption characteristic information, after the obfuscated test data is inputted into the learning network F and thus the 1-st characteristic information for testing is generated, or the 2-nd adaption error may be calculated by referring to the difference between the 2-nd characteristic information for testing and the 2-nd adaption characteristic information after the test data is inputted into the learning network F, and thus the 2-nd characteristic information for testing is generated.

Also, the 2-nd learning device 100 may acquire the 2-nd adaption error by further referring to the 2-nd adaption loss calculated by referring to (i) the 2-nd adaption task specific output on the 2-nd feature adapted data created by using the 2-nd adaption characteristic information and (ii) the test data GT.

Herein, the 2-nd adaption task specific output may be an output of a task to be performed by the learning network F, and may have various results according to the task learned by the learning network F, such as a probability of a class for classification, coordinates resulting from regression for location detection, etc., and an activation function of an activation unit may be applied to the 2-nd adaption characteristic information outputted from the learning network F, to thereby generate the 2-nd adaption task specific output according to the task to be performed by the learning network F.

In addition, the 2-nd learning device 100 may acquire the 2-nd adaption error by referring to (i) one of (i-1) a difference between the 1-st characteristic information for testing and the 2-nd adaption characteristic information and (i-2) a difference between the 2-nd characteristic information for testing and the 2-nd adaption characteristic information, and (ii) the 2-nd adaption loss calculated by referring to (ii-1) the 2-nd adaption task specific output on the 2-nd feature adapted data created by using the 2-nd adaption characteristic information and (ii-2) the test data GT corresponding to the test data.

Figure 3:
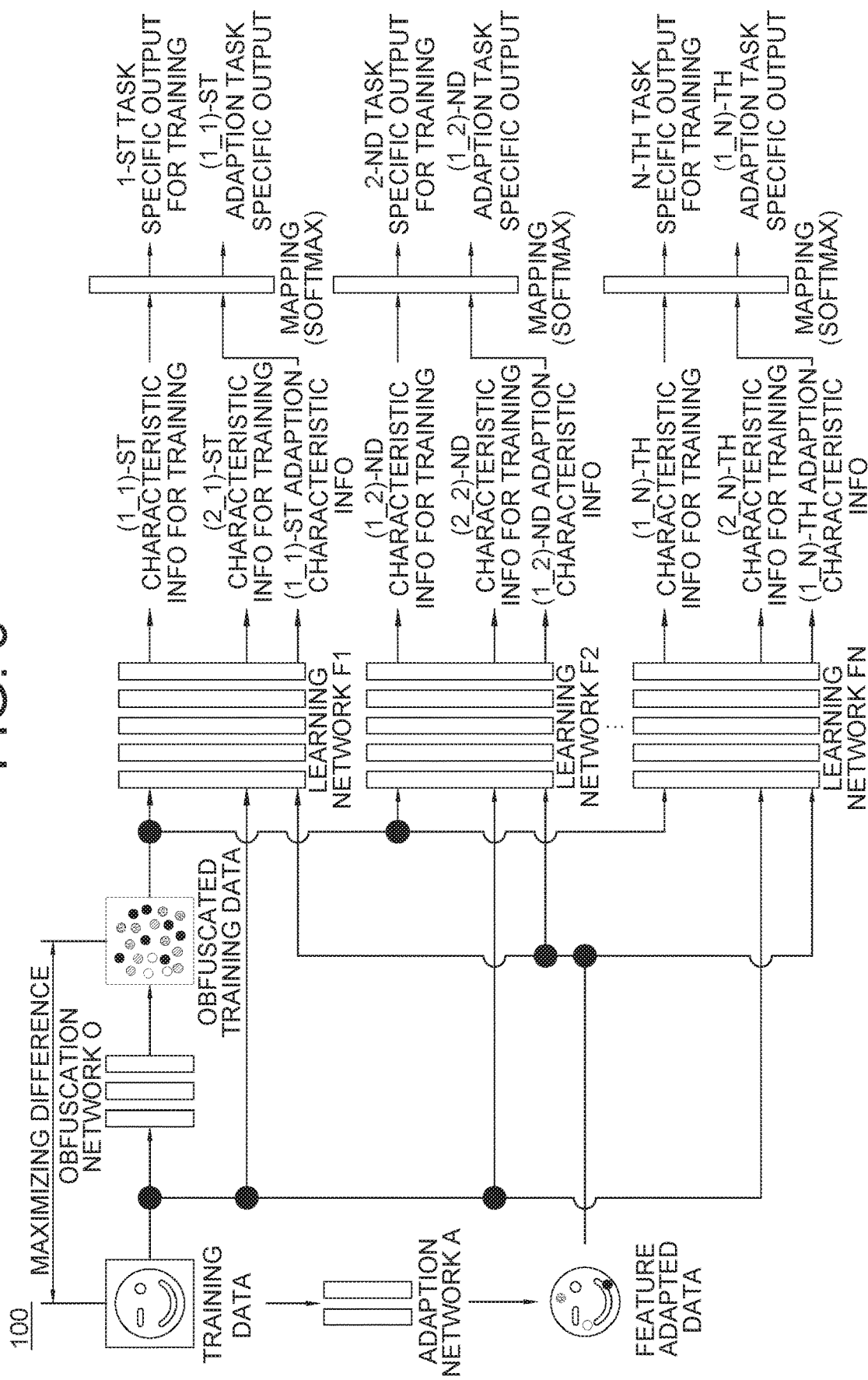
FIG. 3 is a drawing schematically illustrating another learning method for learning the adaption network corresponding to the obfuscation network capable of concealing the original data in accordance with one example embodiment of the present disclosure.

FIG. 3 is a drawing schematically illustrating another learning method for learning the adaption network corresponding to the obfuscation network capable of concealing the original data in accordance with one example embodiment of the present disclosure, that is, the learning network F in FIG. 2 is configured as multiple learning networks F1, F2, . . . , and Fn having their own learned parameters. Herein, each of the multiple learning networks F1, F2, . . . , and Fn may have completed learning to perform tasks at least part of which may be different from one another. In the description below, the part easily deducible from the explanation of FIG. 2 will be omitted.

First, a method for learning the obfuscation network O used for concealing, e.g., anonymizing, the original data using the 1-st learning device is described.

If the training data is acquired, the 1-st learning device may input the training data into the obfuscation network O, and allow the obfuscation network O to obfuscate the training data and thus to generate the obfuscated training data.

Herein, the training data may be the original training data which is the original data to be used for learning, or may be the modified training data generated by modifying the original training data, and the obfuscated training data may be recognized as data different from the training data by a human, but may be recognized as data similar or same as the training data by the learning network.

And, the 1-st learning device may input the obfuscated training data into each of the 1-st learning network F1 to the n-th learning network Fn, and allow each of the 1-st learning network F1 to the n-th learning network Fn to (i) apply its corresponding network operation to the obfuscated training data using respectively the 1-st learned parameters to the n-th learned parameters of the 1-st learning network F1 to the n-th learning network Fn, and thus to (ii) generate each piece of (1_1)-st characteristic information for training to (1_n)-th characteristic information for training corresponding to the obfuscated training data. Also, the 1-st learning device may input the training data into each of the 1-st learning network F1 to the n-th learning network Fn, and allow each of the 1-st learning network F1 to the n-th learning network Fn to (i) apply its corresponding network operation to the training data using respectively the 1-st learned parameters to the n-th learned parameters of the 1-st learning network F1 to the n-th learning network Fn, and thus to (ii) generate each piece of (2_1)-st characteristic information for training to (2_n)-th characteristic information for training corresponding to the training data.

Thereafter, the 1-st learning device may learn the obfuscation network O such that the 1-st error is acquired and minimized which is a weighted sum of a (1_1)-st error to a (1_n)-th error where the (1_1)-st error is calculated by referring to the (1_1)-st characteristic information for training and the (2_1)-st characteristic information for training and where the (1_n)-th error is calculated by referring to the (1_n)-th characteristic information for training and the (2_n)-th characteristic information for training, and such that the 2-nd error is maximized which is calculated by referring to the training data and the obfuscated training data.

As one example, the 1-st learning device may acquire the (1_1)-st error to the (1_n)-th error, where the (1_1)-st error may be calculated by referring to at least one of (i) a difference between the (1_1)-st characteristic information for training and the (2_1)-st characteristic information for training, and (ii) the 1-st obfuscation loss created by referring to (ii-1) the 1-st task specific output for training created by using the (1_1)-st characteristic information for training and (ii-2) the training data GT, and where the (1_n)-th error may be calculated by referring to at least one of (i) a difference between the (1_n)-th characteristic information for training and the (2_n)-th characteristic information for training, and (ii) the n-th obfuscation loss created by referring to (ii-1) the n-th task specific output for training created by using the (1_n)-th characteristic information for training and (ii-2) the training data GT.

That is, the (1_n)-th error may be one of (i) the difference between the (1_n)-th characteristic information for training and the (2_n)-th characteristic information for training, (ii) the n-th obfuscation loss calculated by referring to (ii-1) the n-th task specific output for training created by using the (1_n)-th characteristic information for training and (ii-2) the training data GT, and (iii) a summation of said (i) and said (ii), but the scope of the present disclosure is not limited thereto.

Also, the 1-st learning device may measure at least one quality by referring to at least part of an entropy and a degree of noise of the obfuscated training data, and may acquire the 1-st error by further referring to the measured quality. That is, the 1-st learning device may learn the obfuscation network O, such that the quality of the obfuscated training data is minimized, for example, such that at least part of the entropy, noise, etc. of the obfuscated training data is maximized.

And, if the 1-st learning device learns the obfuscation network O such that the 1-st error is minimized and that the 2-nd error is maximized, then the 1-st learning device may fix and not update learned parameters of the learning network F, and may proceed with learning the obfuscation network O only.

Next, while the obfuscation network O is being learned by the 1-st learning device using the processes above, the 2-nd learning device 100 may input the training data into the adaption network A, to thereby allow the adaption network A to adapt the training data and thus to generate the 1-st feature adapted data. Herein, the 1-st learning device and the 2-nd learning device 100 may be a same device or different devices.

And, the 2-nd learning device 100 may perform a process of acquiring a 1-st adaption ground truth corresponding to the obfuscated training data generated by the obfuscation network O, and learning the adaption network A such that a 1-st adaption error is minimized which is calculated by referring to (1) a 1-st adaption reference corresponding to the 1-st feature adapted data and (2) the 1-st adaption ground truth.

Herein, the 2-nd learning device 100 may acquire the obfuscated training data as the 1-st adaption ground truth, may acquire the 1-st feature adapted data as the 1-st adaption reference, and may acquire the 1-st adaption error by referring to the difference between the obfuscated training data and the 1-st feature adapted data.

Also, the 2-nd learning device 100 may input the 1-st feature adapted data into each of the 1-st learning network F1 to the n-th learning network Fn, and allow each of the 1-st learning network F1 to the n-th learning network Fn to (i) apply its corresponding learning operation to the 1-st feature adapted data using respectively the 1-st learned parameters to the n-th learned parameters of the 1-st learning network F1 to the n-th learning network Fn, and thus (ii) output each piece of the (1_1)-st adaption characteristic information to the (1_n)-th adaption characteristic information. And, the 2-nd learning device may acquire the 1-st adaption error by performing weighted summation of (i) each of (i-1) a difference between the (1_1)-st characteristic information for training and the (1_1)-st adaption characteristic information to (i-2) a difference between the (1_n)-th characteristic information for training and the (1_n)-th adaption characteristic information, or (ii) each of (ii-1) a difference between the (2_1)-st characteristic information for training and the (1_1)-st adaption characteristic information to (ii-2) a difference between the (2_n)-th characteristic information for training and the (1_n)-th adaption characteristic information.

Herein, (i) each of (i-1) the difference between the (1_1)-st characteristic information for training and the (1_1)-st adaption characteristic information to (i-2) the difference between the (1_n)-th characteristic information for training and the (1_n)-th adaption characteristic information may be respectively determined by further referring to (ii) each of (ii-1) a (1_1)-st adaption loss which is calculated by referring to (ii-1a) a (1_1)-st adaption task specific output created using the (1_1)-st adaption characteristic information and (ii-1b) the training data GT to a (ii-2) (1_n)-th adaption loss which is calculated by referring to (ii-2a) a (1_n)-th adaption task specific output created using the (1_n)-th adaption characteristic information and (ii-2b) the training data GT. Or, (i) each of (i-1) the difference between the (2_1)-st characteristic information for training and the (1_1)-st adaption characteristic information to (i-2) the difference between the (2_n)-th characteristic information for training and the (1_n)-th adaption characteristic information may be determined respectively by further referring to (ii) each of (ii-1) a (1_1)-st adaption loss which is calculated by referring to (ii-1a) a (1_1)-st adaption task specific output created using the (1_1)-st adaption characteristic information and (ii-1b) the training data GT to a (ii-2) (1_n)-th adaption loss which is calculated by referring to (ii-2a) a (1_n)-th adaption task specific output created using the (1_n)-th adaption characteristic information and (ii-2b) the training data GT.

In addition, the 2-nd learning device 100 may input the 1-st feature adapted data into each of the 1-st learning network F1 to the n-th learning network Fn, and allow each of the 1-st learning network F1 to the n-th learning network Fn to (i) apply its corresponding learning operation to the 1-st feature adapted data using respectively the 1-st learned parameters to the n-th learned parameters of the 1-st learning network F1 to the n-th learning network Fn, and thus (ii) output each piece of the (1_1)-st adaption characteristic information to the (1_n)-th adaption characteristic information. And, the 1-st adaption error may be calculated by performing weighted summation of (i) the (1_1)-st adaption loss which is calculated by referring to (i-1) the (1_1)-st adaption task specific output created using the (1_1)-st adaption characteristic information and (i-2) the training data GT to (ii) the (1_n)-th adaption loss which is calculated by referring to (ii-1) the (1_n)-th adaption task specific output created using the (1_n)-th adaption characteristic information and (ii-2) the training data GT.

As another example, on condition that the obfuscation network O has been learned by the 1-st learning device using the processes above, the 2-nd learning device 100 may input the test data into the adaption network A, to thereby allow the adaption network A to adapt the test data and thus to generate the 2-nd feature adapted data. Herein, the 1-st learning device and the 2-nd learning device 100 may be a same device or different devices.

And, the 2-nd learning device 100 may perform a process of inputting the test data into the learned obfuscation network O, to thereby allow the learned obfuscation network O to generate the obfuscated test data, a process of acquiring a 2-nd adaption ground truth corresponding to the obfuscated test data, and a process of learning the adaption network A such that a 2-nd adaption error is minimized which may be calculated by referring to (1) a 2-nd adaption reference corresponding to the 2-nd feature adapted data and (2) the 2-nd adaption ground truth.

Herein, the 2-nd learning device 100 may acquire the obfuscated test data as the 2-nd adaption ground truth, may acquire the 2-nd feature adapted data as the 2-nd adaption reference, and may acquire the 2-nd adaption error by referring to the difference between the obfuscated test data and the 2-nd feature adapted data.

In addition, the 2-nd learning device 100 may input the 2-nd feature adapted data into each of the 1-st learning network F1 to the n-th learning network Fn, and allow each of the 1-st learning network F1 to the n-th learning network Fn to (i) apply its corresponding learning operation to the 2-nd feature adapted data using respectively the 1-st learned parameters to the n-th learned parameters of the 1-st learning network F1 to the n-th learning network Fn, and thus (ii) output each piece of the (2_1)-st adaption characteristic information to the (2_n)-th adaption characteristic information. And, the 2-nd learning device 100 may acquire the 2-nd adaption error (i) by performing weighted summation of (i-1) a difference between the (1_1)-st characteristic information for testing and the (2_1)-st adaption characteristic information to (i-2) a difference between the (1_n)-th characteristic information for testing and the (2_n)-th adaption characteristic information, where the (1_1)-st characteristic information for testing to the (1_n)-th characteristic information for testing may be respectively created by inputting the obfuscated test data into the 1-st learning network F1 to the n-th learning network Fn, or (ii) by performing weighted summation of (ii-1) a difference between the (2_1)-st characteristic information for testing and the (2_1)-st adaption characteristic information to (ii-2) a difference between the (2_n)-th characteristic information for testing and the (2_n)-th adaption characteristic information, where the (2_1)-st characteristic information for testing to the (2_n)-th characteristic information for testing may be respectively created by inputting the test data into the 1-st learning network F1 to the n-th learning network Fn.

Herein, (i) each of the difference between the (1_1)-st characteristic information for testing and the (2_1)-st adaption characteristic information to the difference between the (1_n)-th characteristic information for testing and the (2_n)-th adaption characteristic information may be determined respectively by further referring to each of a (2_1)-st adaption loss which is calculated by referring to a (2_1)-st adaption task specific output created using the (2_1)-st adaption characteristic information and by further referring to the test data GT to a (2_n)-th adaption loss which is calculated by referring to a (2_n)-th adaption task specific output created using the (2_n)-th adaption characteristic information and by further referring to the test data GT, or (ii) each of the difference between the (2_1)-st characteristic information for testing and the (2_1)-st adaption characteristic information to the difference between the (2_n)-th characteristic information for testing and the (2_n)-th adaption characteristic information may be determined respectively by further referring to each of a (2_1)-st adaption loss which is calculated by referring to a (2_1)-st adaption task specific output created using the (2_1)-st adaption characteristic information and by further referring to the test data GT to a (2_n)-th adaption loss which is calculated by referring to a (2_n)-th adaption task specific output created using the (2_n)-th adaption characteristic information and by further referring to the test data GT.

In addition, the 2-nd learning device 100 may input the 2-nd feature adapted data into each of the 1-st learning network F1 to the n-th learning network Fn, and allow each of the 1-st learning network F1 to the n-th learning network Fn to (i) apply its corresponding learning operation to the 2-nd feature adapted data using respectively the 1-st learned parameters to the n-th learned parameters of the 1-st learning network F1 to the n-th learning network Fn, and thus (ii) output each piece of the (2_1)-st adaption characteristic information to the (2_n)-th adaption characteristic information. And, the 2-nd adaption error may be calculated by performing weighted summation of (i) the (2_1)-st adaption loss which is calculated by referring to (i-1) the (2_1)-st adaption task specific output created using the (2_1)-st adaption characteristic information and (i-2) the test data GT to (ii) the (2_n)-th adaption loss which is calculated by referring to (ii-1) the (2_n)-th adaption task specific output created using the (2_n)-th adaption characteristic information and (ii-2) the test data GT.

Meanwhile, the obfuscation network O may be learned as above such that the 1-st error is minimized which is a weighted sum of the (1_1)-st error to the (1_n)-th error where the (1_1)-st error is calculated by referring to the (1_1)-st characteristic information for training and the (2_1)-st characteristic information for training and where the (1_n)-th error is calculated by referring to the (1_n)-th characteristic information for training and the (2_n)-th characteristic information for training, and such that the 2-nd error is maximized which is calculated by referring to the training data and the obfuscated training data. However, as another example, the obfuscation network O may be learned sequentially using each of the (1_1)-st error to the (1_n)-th error.

That is, the 1-st learning device may input the training data into the obfuscation network O, and allow the obfuscation network O to obfuscate the training data and thus to generate 1-st obfuscated training data. And, the 1-st learning device may perform or support another device to perform processes of (i) inputting the 1-st obfuscated training data into the 1-st learning network F1, and allowing the 1-st learning network F1 to (i-1) apply a network operation to the 1-st obfuscated training data using the 1-st learned parameters of the 1-st learning network F1 and thus to (i-2) output (1_1)-st characteristic information for training corresponding to the 1-st obfuscated training data, and (ii) inputting the training data into the 1-st learning network F1, and (iii) allowing the 1-st learning network F1 to (iii-1) apply a network operation to the training data using the 1-st learned parameters and thus to (iii-2) output the (2_1)-st characteristic information for training corresponding to the training data. Thereafter, the 1-st learning device may learn the obfuscation network O, such that the (1_1)-st error is minimized which is calculated by referring to the (1_1)-st characteristic information for training and the (2_1)-st characteristic information for training, and such that the (2_1)-st error is maximized which is calculated by referring to the training data and the 1-st obfuscated training data, to thereby allow the obfuscation network O to be a 1-st learned obfuscation network O.

And, while increasing an integer k from 2 to n, the 1-st learning device may repeat the processes above up to the n-th learning network Fn, to thereby acquire an n-th learned obfuscation network O.

That is, the 1-st learning device may input the training data into the (k−1)-th learned obfuscation network O, and allow the (k−1)-th learned obfuscation network O to obfuscate the training data and thus to generate k-th obfuscated training data. And, the 1-st learning device may perform or support another device to perform processes of (i) inputting the k-th obfuscated training data into the k-th learning network Fk, and allowing the k-th learning network Fk to (i-1) apply a network operation to the k-th obfuscated training data using the k-th learned parameters of the k-th learning network Fk and thus to (i-2) output (1_k)-th characteristic information for training corresponding to the k-th obfuscated training data, and (ii) inputting the training data into the k-th learning network Fk, and allowing the k-th learning network Fk to (ii-1) apply a network operation to the training data using the k-th learned parameters and thus to (ii-2) output the (2_k)-th characteristic information for training corresponding to the training data. Thereafter, the 1-st learning device may learn the (k−1)-th learned obfuscation network O, such that the (1_k)-th error is minimized which is calculated by referring to the (1_k)-th characteristic information for training and the (2_k)-th characteristic information for training, and such that the (2_k)-th error is maximized which is calculated by referring to the training data and the k-th obfuscated training data, to thereby allow the (k−1)-th learned obfuscation network O to be a k-th learned obfuscation network O.

Herein, the (1_k)-th error may be calculated by further referring to a k-th obfuscation loss acquired by referring to (i) a k-th task specific output for training, on the k-th obfuscated training data created by using the (1_k)-th characteristic information for training and (ii) the training data GT corresponding to the training data.

Also, the (1_k)-th error may be one of (i) the difference between the (1_k)-th characteristic information for training and the (2_k)-th characteristic information for training, (ii) the k-th obfuscation loss, and (iii) a summation of said (i) and said (ii), but the scope of the present disclosure is not limited thereto.

Next, while the obfuscation network O is being learned by the 1-st learning device using the processes above, the 2-nd learning device 100 may input the training data into the adaption network A, to thereby allow the adaption network A to adapt the training data and thus to generate the 1-st feature adapted data. Herein, the 1-st learning device and the 2-nd learning device 100 may be a same device or different devices.

And, the 2-nd learning device 100 may perform a process of acquiring a 1-st adaption ground truth corresponding to the obfuscated training data generated by the obfuscation network O, and learning the adaption network A such that a 1-st adaption error is minimized which is calculated by referring to (1) a 1-st adaption reference corresponding to the 1-st feature adapted data and (2) the 1-st adaption ground truth.

Herein, the 2-nd learning device 100 may acquire the obfuscated training data as the 1-st adaption ground truth, may acquire the 1-st feature adapted data as the 1-st adaption reference, and may acquire the 1-st adaption error by referring to the difference between the obfuscated training data and the 1-st feature adapted data.

Also, the 2-nd learning device 100 may perform (i) a process of inputting the (1_1)-st feature adapted data which is the 1-st feature adapted data into the 1-st learning network F1, to thereby allow the 1-st learning network F1 to output the (1_1)-st adaption characteristic information by applying the learning operation to the (1_1)-st feature adapted data using the 1-st learned parameters, and (ii) a process of learning the adaption network A such that the (1_1)-st adaption error is minimized which is calculated by referring to one of a difference between the (1_1)-st characteristic information for training and the (1_1)-st adaption characteristic information and a difference between the (2_1)-st characteristic information for training and the (1_1)-st adaption characteristic information, to thereby allow the adaption network A to be a 1-st learned adaption network A. And, the 2-nd learning device 100 may input the training data into a (k−1)-th learned adaption network A, to thereby allow the (k−1)-th learned adaption network A to generate (1_k)-th feature adapted data, and may input the (1_k)-th feature adapted data into a k-th learning network Fk, to thereby allow the k-th learning network Fk to generate (1_k)-th adaption characteristic information by applying the learning operation to the (1_k)-th feature adapted data. Thereafter, the 2-nd learning device 100 may perform a process of learning the (k−1)-th learned adaption network A such that a (1_k)-th adaption error is minimized which is calculated by referring to one of a difference between the (1_k)-th characteristic information for training and the (1_k)-th adaption characteristic information and a difference between the (2_k)-th characteristic information for training and the (1_k)-th adaption characteristic information, to thereby allow the (k−1)-th learned adaption network A to be a k-th learned adaption network A.

Herein, (i) each of (i-1) the difference between the (1_1)-st characteristic information for training and the (1_1)-st adaption characteristic information to (i-2) the difference between the (1_n)-th characteristic information for training and the (1_n)-th adaption characteristic information may be determined respectively by further referring to (ii) each of (ii-1) a (1_1)-st adaption loss which is calculated by referring to (ii-1a) a (1_1)-st adaption task specific output created using the (1_1)-st adaption characteristic information and (ii-1b) the training data GT to a (ii-2) (1_n)-th adaption loss which is calculated by referring to (ii-2a) a (1_n)-th adaption task specific output created using the (1_n)-th adaption characteristic information and (ii-2b) the training data GT. Or, (i) each of (i-1) the difference between the (2_1)-st characteristic information for training and the (1_1)-st adaption characteristic information to (i-2) the difference between the (2_n)-th characteristic information for training and the (1_n)-th adaption characteristic information may be determined respectively by further referring to (ii) each of (ii-1) a (1_1)-st adaption loss which is calculated by referring to (ii-1a) a (1_1)-st adaption task specific output created using the (1_1)-st adaption characteristic information and (ii-1b) the training data GT to a (ii-2) (1_n)-th adaption loss which is calculated by referring to (ii-2a) a (1_n)-th adaption task specific output created using the (1_n)-th adaption characteristic information and (ii-2b) the training data GT.

In addition, the 2-nd learning device 100 may perform (i) a process of inputting the (1_1)-st feature adapted data which is the 1-st feature adapted data into the 1-st learning network F1, to thereby allow the 1-st learning network F1 to output the (1_1)-st adaption characteristic information by applying the learning operation to the (1_1)-st feature adapted data using the 1-st learned parameters, and (ii) a process of learning the adaption network A such that the (1_1)-st adaption loss is minimized which is calculated by referring to (ii-1) the (1_1)-st adaption task specific output created by referring to the (1_1)-st adaption characteristic information and (ii-2) the training data GT, to thereby allow the adaption network A to be the 1-st learned adaption network A. And, the 2-nd learning device 100 may input the training data into a (k−1)-th learned adaption network A, to thereby allow the (k−1)-th learned adaption network A to generate (1_k)-th feature adapted data, and may input the (1_k)-th feature adapted data into a k-th learning network Fk, to thereby allow the k-th learning network Fk to generate (1_k)-th adaption characteristic information by applying the learning operation to the (1_k)-th feature adapted data, and may learn the (k−1)-th learned adaption network A such that the (1_k)-th adaption loss is minimized which is calculated by using the (1_k)-th adaption task specific output created by referring to the (1_k)-th adaption characteristic information and to the training data GT, to thereby allow the (k−1)-th learned adaption network A to be the k-th learned adaption network A.

As another example, on condition that the obfuscation network O has been learned by the 1-st learning device using the processes above, the 2-nd learning device 100 may input the test data into the adaption network A, to thereby allow the adaption network A to adapt the test data and thus to generate the 2-nd feature adapted data. Herein, the 1-st learning device and the 2-nd learning device 100 may be a same device or different devices.

And, the 2-nd learning device 100 may perform a process of inputting the test data into the learned obfuscation network O, to thereby allow the learned obfuscation network O to generate the obfuscated test data, a process of acquiring a 2-nd adaption ground truth corresponding to the obfuscated test data, and a process of learning the adaption network A such that a 2-nd adaption error is minimized which may be calculated by referring to (1) a 2-nd adaption reference corresponding to the 2-nd feature adapted data and (2) the 2-nd adaption ground truth.

Herein, the 2-nd learning device 100 may acquire the obfuscated test data as the 2-nd adaption ground truth, may acquire the 2-nd feature adapted data as the 2-nd adaption reference, and may acquire the 2-nd adaption error by referring to the difference between the obfuscated test data and the 2-nd feature adapted data.

Also, the 2-nd learning device 100 may input the obfuscated test data into each of the 1-st learning network F1 to the n-th learning network Fn, and allow each of the 1-st learning network F1 to the n-th learning network Fn to (i) apply its corresponding learning operation to the obfuscated test data using respectively the 1-st learned parameters to the n-th learned parameters of the 1-st learning network F1 to the n-th learning network Fn, and thus (ii) output each piece of the (1_1)-st characteristic information for testing to the (1_n)-th characteristic information for testing, or may input the test data into the 1-st learning network F1 to the n-th learning network Fn, to thereby allow each of the 1-st learning network F1 to the n-th learning network Fn to output the (2_1)-st characteristic information for testing to the (2_n)-th characteristic information for testing by applying the learning operation to the test data. And, the 2-nd learning device 100 may perform (i) a process of inputting the (2_1)-st feature adapted data, which is the 2-nd feature adapted data, into the 1-st learning network F1, to thereby allow the 1-st learning network F1 to output the (2_1)-st adaption characteristic information by applying the learning operation to the (2_1)-st feature adapted data using the 1-st learned parameters, and (ii) a process of learning the adaption network A such that the (2_1)-st adaption error is minimized which is calculated by referring to one of a difference between the (1_1)-st characteristic information for testing and the (2_1)-st adaption characteristic information and a difference between the (2_1)-st characteristic information for testing and the (2_1)-st adaption characteristic information, to thereby allow the adaption network A to be the 1-st learned adaption network A. And, the 2-nd learning device may input the test data into the (k−1)-th learned adaption network A, to thereby allow the (k−1)-th learned adaption network A to generate (2_k)-th feature adapted data, and may input the (2_k)-th feature adapted data into the k-th learning network Fk, to thereby allow the k-th learning network Fk to generate (2_k)-th adaption characteristic information by applying the learning operation to the (2_k)-th feature adapted data. Thereafter, the 2-nd learning device 100 may perform a process of learning the (k−1)-th learned adaption network A such that the (2_k)-th adaption error is minimized which is calculated by referring to one of a difference between the (1_k)-th characteristic information for testing and the (2_k)-th adaption characteristic information and a difference between the (2_k)-th characteristic information for testing and the (2_k)-th adaption characteristic information, to thereby allow the (k−1)-th learned adaption network A to be the k-th learned adaption network A.

Herein, (i) each of the difference between the (1_1)-st characteristic information for testing and the (2_1)-st adaption characteristic information to the difference between the (1_n)-th characteristic information for testing and the (2_n)-th adaption characteristic information may be determined respectively by further referring to each of a (2_1)-st adaption loss which is calculated by referring to a (2_1)-st adaption task specific output created using the (2_1)-st adaption characteristic information and by further referring to the test data GT to a (2_n)-th adaption loss which is calculated by referring to a (2_n)-th adaption task specific output created using the (2_n)-th adaption characteristic information and by further referring to the test data GT, or (ii) each of the difference between the (2_1)-st characteristic information for testing and the (2_1)-st adaption characteristic information to the difference between the (2_n)-th characteristic information for testing and the (2_n)-th adaption characteristic information may be determined respec-tively by further referring to each of a (2_1)-st adaption loss which is calculated by referring to a (2_1)-st adaption task specific output created using the (2_1)-st adaption characteristic information and by further referring to the test data GT to a (2_n)-th adaption loss which is calculated by referring to a (2_n)-th adaption task specific output created using the (2_n)-th adaption characteristic information and by further referring to the test data GT.

In addition, the 2-nd learning device 100 may perform (i) a process of inputting the (2_1)-st feature adapted data, which is the 2-nd feature adapted data, into the 1-st learning network F1, to thereby allow the 1-st learning network F1 to output the (2_1)-st adaption characteristic information by applying the learning operation to the (2_1)-st feature adapted data using the 1-st learned parameters, and (ii) a process of learning the adaption network A such that the (2_1)-st adaption loss is minimized which is calculated by referring to (2_1)-st adaption task specific output created by using the (2_1)-st adaption characteristic information and to the test data GT, to thereby allow the adaption network A to be the 1-st learned adaption network A. And, the 2-nd learning device may input the test data into the (k−1)-th learned adaption network A, to thereby allow the (k−1)-th learned adaption network A to generate (2_k)-th feature adapted data, and may input the (2_k)-th feature adapted data into the k-th learning network Fk, to thereby allow the k-th learning network Fk to generate (2_k)-th adaption characteristic information by applying the learning operation to the (2_k)-th feature adapted data. Thereafter, the 2-nd learning device 100 may perform a process of learning the (k−1)-th learned adaption network A such that the (2_k)-th adaption loss is minimized which is calculated by referring to the (2_k)-th adaption task specific output created by using the (2_k)-th adaption characteristic information and to the test data GT, to thereby allow the (k−1)-th learned adaption network A to be the k-th learned adaption network A.

Figure 4:
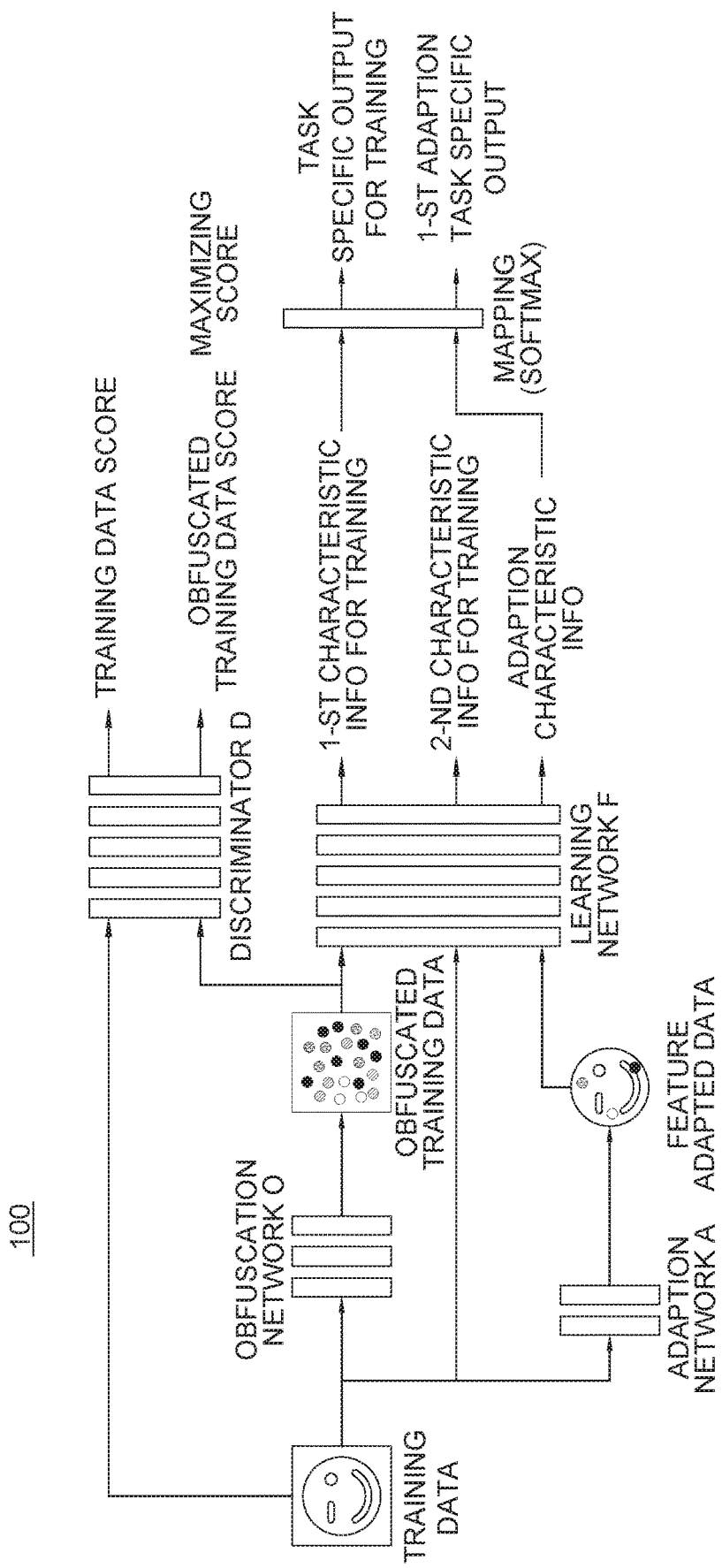
FIG. 4 is a drawing schematically illustrating a learning method for learning the adaption network corresponding to the obfuscation network capable of concealing the original data in accordance with another example embodiment of the present disclosure.

FIG. 4 is a drawing schematically illustrating a learning method for learning the adaption network corresponding to the obfuscation network capable of concealing, e.g., anonymizing, the original data in accordance with another example embodiment of the present disclosure. In the description below, the part easily deducible from the explanation of FIGS. 2 and 3 will be omitted.

First, a method for learning the obfuscation network O used for concealing the original data using the 1-st learning device is described.

If the training data is acquired, the 1-st learning device may input the training data into the obfuscation network O, and allow the obfuscation network O to obfuscate the training data and thus to generate the obfuscated training data.

And, the 1-st learning device may perform or support another device to perform processes of (i) inputting the obfuscated training data into the learning network F having its own one or more learned parameters, and allowing the learning network F to (i-1) apply a network operation to the obfuscated training data using the learned parameters and thus to (i-2) generate 1-st characteristic information for training corresponding to the obfuscated training data, and (ii) inputting the training data into the learning network F, and allowing the learning network F to (ii-1) apply the network operation to the training data using the learned parameters and thus to (ii-2) generate 2-nd characteristic information for training corresponding to the training data.

Thereafter, on condition that at least one obfuscated training data score has been acquired as the 2-nd error which corresponds to the obfuscated training data inputted into the discriminator D for determining whether the inputted data is real or fake, the 1-st learning device may (i) learn the obfuscation network O such that the 1-st error is minimized and such that the 2-nd error is maximized, and (ii) learn the discriminator D such that at least one modified training data score or modified obfuscated training data score is maximized which corresponds to the modified training data or the modified obfuscated training data inputted into the discriminator D and such that the obfuscated training data score is minimized. Herein, the modified training data or the modified obfuscated training data may be respectively generated by adding at least one random noise created through the random noise generating network (not illustrated) to the training data or the obfuscated training data. As one example, the random noise generating network may be instructed to generate the random noise having a normal distribution $N(0, \sigma)$, and the generated noise may be added to the training data or obfuscated training data, to thereby generate the modified training data. Also, the modified training data or the modified obfuscated training data may be respectively generated by blurring the training data or the obfuscated training data, or changing a resolution of the training data or the obfuscated training data, as well as using the random noise, but the scope of the present disclosure is not limited thereto, and various ways of modifying the training data or the obfuscated training data may be used.

That is, the 1-st learning device may learn the obfuscation network O, such that the learning network F obfuscates the training data by using the 1-st error, to thereby output the obfuscated training data in order for the obfuscated training data to be recognized as same or similar to the training data, and such that the learning network F outputs the obfuscated training data which is different from the training data but difficult to differentiate from the training data by using the 2-nd error.

Herein, a maximum of the modified training data score or the modified obfuscated training data score corresponding to the modified training data or the modified obfuscated training data inputted into the discriminator D may be 1 as a value for determining the modified training data or the modified obfuscated training data as real, and a minimum of the obfuscated training data score corresponding to the obfuscated training data inputted into the discriminator D may be 0 as a value for determining the obfuscated training data as fake. That is, the discriminator D may be learned to recognize the obfuscated training data as the modified training data or the modified obfuscated training data.

Next, while the obfuscation network O is being learned by the 1-st learning device using the processes above, the 2-nd learning device 100 may input the training data into the adaption network A, to thereby allow the adaption network A to adapt the training data and thus to generate the 1-st feature adapted data. Herein, the 1-st learning device and the 2-nd learning device 100 may be a same device or different devices.

And, the 2-nd learning device 100 may perform a process of acquiring a 1-st adaption ground truth corresponding to the obfuscated training data generated by the obfuscation network O, and learning the adaption network A such that a 1-st adaption error is minimized which is calculated by referring to (1) a 1-st adaption reference corresponding to the 1-st feature adapted data and (2) the 1-st adaption ground truth.

Herein, the 2-nd learning device 100 may acquire the obfuscated training data as the 1-st adaption ground truth, may acquire the 1-st feature adapted data as the 1-st adaption reference, and may acquire the 1-st adaption error by referring to the difference between the obfuscated training data and the 1-st feature adapted data.

Meanwhile, the 2-nd learning device 100 may perform (i) a process of inputting the 1-st feature adapted data into the learning network F, to thereby allow the learning network F to output the 1-st adaption characteristic information, corresponding to the 1-st feature adapted data, as the 1-st adaption reference by applying the learning operation to the 1-st feature adapted data using the learned parameters, and (ii) a process of acquiring the 1-st adaption error by referring to one of (ii-1) a difference between the 1-st characteristic information for training and the 1-st adaption characteristic information and (ii-2) a difference between the 2-nd characteristic information for training and the 1-st adaption characteristic information.

Also, the 2-nd learning device 100 may acquire the 1-st adaption error by further referring to the 1-st adaption loss calculated by using (i) the 1-st adaption task specific output on the 1-st feature adapted data created by using the 1-st adaption characteristic information and (ii) the training data GT.

Herein, the 1-st adaption task specific output may be an output of a task to be performed by the learning network F, and may have various results according to the task learned by the learning network F, such as a probability of a class for classification, coordinates resulting from regression for location detection, etc., and the activation function of the activation unit may be applied to the 1-st adaption characteristic information outputted from the learning network F, to thereby generate the 1-st adaption task specific output according to the task to be performed by the learning network F.

In addition, the 2-nd learning device 100 may acquire the 1-st adaption error calculated by referring to (i) one of (i-1) a difference between the 1-st characteristic information for training and the 1-st adaption characteristic information and (i-2) a difference between the 2-nd characteristic information for training and the 1-st adaption characteristic information and (ii) the 1-st adaption loss calculated by referring to (ii-1) the 1-st adaption task specific output on the 1-st feature adapted data created by using the 1-st adaption characteristic information and (ii-2) the training data GT.

As another example, on condition that the obfuscation network O has been learned by the 1-st learning device using the processes above, the 2-nd learning device 100 may input the test data into the adaption network A, to thereby allow the adaption network A to adapt the test data and thus to generate the 2-nd feature adapted data.

And, the 2-nd learning device 100 may perform a process of inputting the test data into the learned obfuscation network O, to thereby allow the learned obfuscation network O to generate the obfuscated test data, a process of acquiring a 2-nd adaption ground truth corresponding to the obfuscated test data, and a process of learning the adaption network A such that a 2-nd adaption error is minimized which may be calculated by referring to (1) a 2-nd adaption reference corresponding to the 2-nd feature adapted data and (2) the 2-nd adaption ground truth.

Herein, the 2-nd learning device 100 may acquire the obfuscated test data as the 2-nd adaption ground truth, may acquire the 2-nd feature adapted data as the 2-nd adaption reference, and may acquire the 2-nd adaption error by referring to the difference between the obfuscated test data and the 2-nd feature adapted data.

Meanwhile, the 2-nd learning device 100 may perform a process of inputting the 2-nd feature adapted data into the learning network F, to thereby allow the learning network F to output the 2-nd adaption characteristic information, corresponding to the 2-nd feature adapted data, as the 2-nd adaption reference by applying the learning operation to the 2-nd feature adapted data using the learned parameters. And, the 2-nd adaption error may be calculated by referring to the difference between the 1-st characteristic information for testing and the 2-nd adaption characteristic information, after the obfuscated test data is inputted into the learning network F and thus the 1-st characteristic information for testing is generated, or the 2-nd adaption error may be calculated by referring to the difference between the 2-nd characteristic information for testing and the 2-nd adaption characteristic information after the test data is inputted into the learning network F, and thus the 2-nd characteristic information for testing is generated.

Also, the 2-nd learning device 100 may acquire the 2-nd adaption error by further referring to the 2-nd adaption loss calculated by referring to (i) the 2-nd adaption task specific output on the 2-nd feature adapted data created by using the 2-nd adaption characteristic information and (ii) the test data GT.

Herein, the 2-nd adaption task specific output may be an output of a task to be performed by the learning network F, and may have various results according to the task learned by the learning network F, such as a probability of a class for classification, coordinates resulting from regression for location detection, etc., and an activation function of an activation unit may be applied to the 2-nd adaption characteristic information outputted from the learning network F, to thereby generate the 2-nd adaption task specific output according to the task to be performed by the learning network F.

In addition, the 2-nd learning device 100 may acquire the 2-nd adaption error by referring to (i) one of (i-1) a difference between the 1-st characteristic information for testing and the 2-nd adaption characteristic information and (i-2) a difference between the 2-nd characteristic information for testing and the 2-nd adaption characteristic information, and (ii) the 2-nd adaption loss calculated by referring to (ii-1) the 2-nd adaption task specific output on the 2-nd feature adapted data created by using the 2-nd adaption characteristic information and (ii-2) the test data GT corresponding to the test data.

Figure 5:
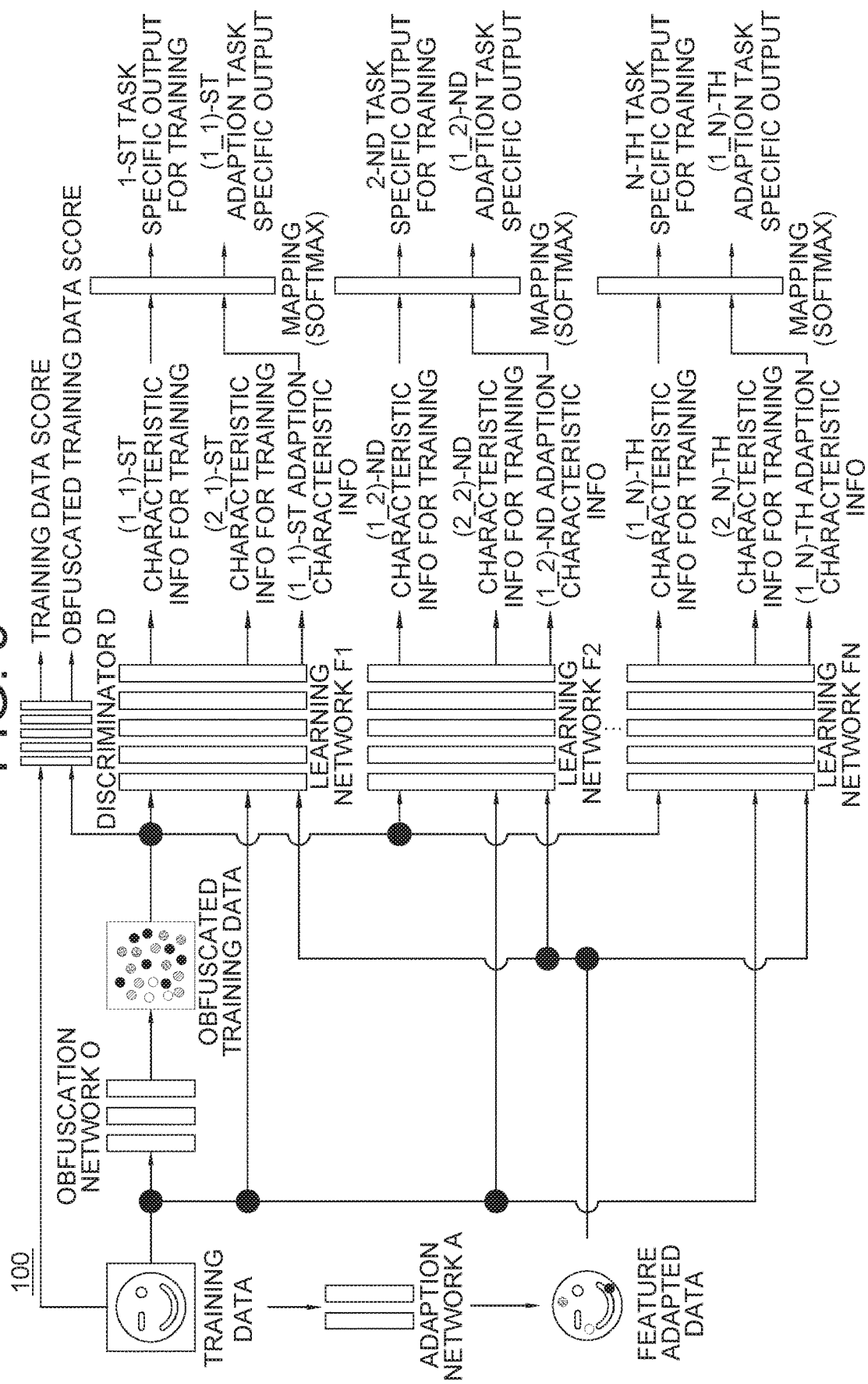
FIG. 5 is a drawing schematically illustrating another learning method for learning the adaption network corresponding to the obfuscation network capable of concealing the original data in accordance with another example embodiment of the present disclosure.

FIG. 5 is a drawing schematically illustrating another learning method for learning the adaption network corresponding to the obfuscation network capable of concealing, e.g., anonymizing, the original data in accordance with another example embodiment of the present disclosure, that is, the learning network F in FIG. 4 is configured as multiple learning networks F1, F2, . . . , and Fn having their own learned parameters. In the description below, the part easily deducible from the explanation of FIGS. 2 to 4 will be omitted.

First, a method for learning the obfuscation network O used for concealing, e.g., anonymizing, the original data using the 1-st learning device is described.

If the training data is acquired, the 1-st learning device may input the training data into the obfuscation network O, and allow the obfuscation network O to obfuscate the training data and thus to generate the obfuscated training data.

And, the 1-st learning device may input the obfuscated training data into each of the 1-st learning network F1 to the n-th learning network Fn, and allow each of the 1-st learning network F1 to the n-th learning network Fn to (i) apply its corresponding network operation to the obfuscated training data using respectively the 1-st learned parameters to the n-th learned parameters of the 1-st learning network F1 to the n-th learning network Fn, and thus to (ii) generate each piece of (1_1)-st characteristic information for training to (1_n)-th characteristic information for training corresponding to the obfuscated training data. Also, the 1-st learning device may input the training data into each of the 1-st learning network F1 to the n-th learning network Fn, and allow each of the 1-st learning network F1 to the n-th learning network Fn to (i) apply its corresponding network operation to the training data using respectively the 1-st learned parameters to the n-th learned parameters of the 1-st learning network F1 to the n-th learning network Fn, and thus to (ii) generate each piece of (2_1)-st characteristic information for training to (2_n)-th characteristic information for training corresponding to the training data.

Thereafter, the 1-st learning device may learn the obfuscation network O such that the 1-st error is acquired and minimized which is a weighted sum of the (1_1)-st error to the (1_n)-th error where the (1_1)-st error is calculated by referring to the (1_1)-st characteristic information for training and the (2_1)-st characteristic information for training and where the (1_n)-th error is calculated by referring to the (1_n)-th characteristic information for training and the (2_n)-th characteristic information for training, and such that the 2-nd error is maximized which is the obfuscated training data score corresponding to the obfuscated training data inputted into the discriminator D, and may learn the discriminator D such that the modified training data score or the modified obfuscated training data score is maximized which corresponds to the modified training data or the modified obfuscated training data inputted into the discriminator D, and such that the obfuscated training data score is minimized.

As one example, the 1-st learning device may acquire the (1_1)-st error to the (1_n)-th error, where the (1_1)-st error may be calculated by referring to at least one of (i) a difference between the (1_1)-st characteristic information for training and the (2_1)-st characteristic information for training, and (ii) the 1-st obfuscation loss created by referring to (ii-1) the 1-st task specific output for training created by using the (1_1)-st characteristic information for training and (ii-2) the training data GT, and where the (1_n)-th error may be calculated by referring to at least one of (i) a difference between the (1_n)-th characteristic information for training and the (2_n)-th characteristic information for training, and (ii) the n-th obfuscation loss created by referring to (ii-1) the n-th task specific output for training created by using the (1_n)-th characteristic information for training and (ii-2) the training data GT.

That is, the (1_n)-th error may be one of (i) the difference between the (1_n)-th characteristic information for training and the (2_n)-th characteristic information for training, (ii) the n-th obfuscation loss calculated by referring to (ii-1) the n-th task specific output for training created by using the (1_n)-th characteristic information for training and (ii-2) the training data GT, and (iii) a summation of said (i) and said (ii), but the scope of the present disclosure is not limited thereto.

Next, while the obfuscation network O is being learned by the 1-st learning device using the processes above, the 2-nd learning device 100 may input the training data into the adaption network A, to thereby allow the adaption network A to adapt the training data and thus to generate the 1-st feature adapted data. Herein, the 1-st learning device and the 2-nd learning device 100 may be a same device or different devices.

And, the 2-nd learning device 100 may perform a process of acquiring a 1-st adaption ground truth corresponding to the obfuscated training data generated by the obfuscation network O, and learning the adaption network A such that a 1-st adaption error is minimized which is calculated by referring to (1) a 1-st adaption reference corresponding to the 1-st feature adapted data and (2) the 1-st adaption ground truth.

Herein, the 2-nd learning device 100 may acquire the obfuscated training data as the 1-st adaption ground truth, may acquire the 1-st feature adapted data as the 1-st adaption reference, and may acquire the 1-st adaption error by referring to the difference between the obfuscated training data and the 1-st feature adapted data.

Also, the 2-nd learning device 100 may input the 1-st feature adapted data into each of the 1-st learning network F1 to the n-th learning network Fn, and allow each of the 1-st learning network F1 to the n-th learning network Fn to (i) apply its corresponding learning operation to the 1-st feature adapted data using respectively the 1-st learned parameters to the n-th learned parameters of the 1-st learning network F1 to the n-th learning network Fn, and thus (ii) output each piece of the (1_1)-st adaption characteristic information to the (1_n)-th adaption characteristic information. And, the 2-nd learning device may acquire the 1-st adaption error by performing weighted summation of (i) each of (i-1) a difference between the (1_1)-st characteristic information for training and the (1_1)-st adaption characteristic information to (i-2) a difference between the (1_n)-th characteristic information for training and the (1_n)-th adaption characteristic information, or (ii) each of (ii-1) a difference between the (2_1)-st characteristic information for training and the (1_1)-st adaption characteristic information to (ii-2) a difference between the (2_n)-th characteristic information for training and the (1_n)-th adaption characteristic information.

Herein, (i) each of (i-1) the difference between the (1_1)-st characteristic information for training and the (1_1)-st adaption characteristic information to (i-2) the difference between the (1_n)-th characteristic information for training and the (1_n)-th adaption characteristic information may be determined respectively by further referring to (ii) each of (ii-1) a (1_1)-st adaption loss which is calculated by referring to (ii-1a) a (1_1)-st adaption task specific output created using the (1_1)-st adaption characteristic information and (ii-1b) the training data GT to a (ii-2) (1_n)-th adaption loss which is calculated by referring to (ii-2a) a (1_n)-th adaption task specific output created using the (1_n)-th adaption characteristic information and (ii-2b) the training data GT. Or, (i) each of (i-1) the difference between the (2_1)-st characteristic information for training and the (1_1)-st adaption characteristic information to (i-2) the difference between the (2_n)-th characteristic information for training and the (1_n)-th adaption characteristic information may be determined respectively by further referring to (ii) each of (ii-1) a (1_1)-st adaption loss which is calculated by referring to (ii-1a) a (1_1)-st adaption task specific output created using the (1_1)-st adaption characteristic information and (ii-1b) the training data GT to a (ii-2) (1_n)-th adaption loss which is calculated by referring to (ii-2a) a (1_n)-th adaption task specific output created using the (1_n)-th adaption characteristic information and (ii-2b) the training data GT.

In addition, the 2-nd learning device 100 may input the 1-st feature adapted data into each of the 1-st learning network F1 to the n-th learning network Fn, and allow each of the 1-st learning network F1 to the n-th learning network Fn to (i) apply its corresponding learning operation to the 1-st feature adapted data using respectively the 1-st learned parameters to the n-th learned parameters of the 1-st learning network F1 to the n-th learning network Fn, and thus (ii) output each piece of the (1_1)-st adaption characteristic information to the (1_n)-th adaption characteristic information. And, the 1-st adaption error may be calculated by performing weighted summation of (i) the (1_1)-st adaption loss which is calculated by referring to (i-1) the (1_1)-st adaption task specific output created using the (1_1)-st adaption characteristic information and (i-2) the training data GT to (ii) the (1_n)-th adaption loss which is calculated by referring to (ii-1) the (1_n)-th adaption task specific output created using the (1_n)-th adaption characteristic information and (ii-2) the training data GT.

As another example, on condition that the obfuscation network O has been learned by the 1-st learning device using the processes above, the 2-nd learning device 100 may input the test data into the adaption network A, to thereby allow the adaption network A to adapt the test data and thus to generate the 2-nd feature adapted data. Herein, the 1-st learning device and the 2-nd learning device 100 may be a same device or different devices.

And, the 2-nd learning device 100 may perform a process of inputting the test data into the learned obfuscation network O, to thereby allow the learned obfuscation network O to generate the obfuscated test data, a process of acquiring a 2-nd adaption ground truth corresponding to the obfuscated test data, and a process of learning the adaption network A such that a 2-nd adaption error is minimized which may be calculated by referring to (1) a 2-nd adaption reference corresponding to the 2-nd feature adapted data and (2) the 2-nd adaption ground truth.

Herein, the 2-nd learning device 100 may acquire the obfuscated test data as the 2-nd adaption ground truth, may acquire the 2-nd feature adapted data as the 2-nd adaption reference, and may acquire the 2-nd adaption error by referring to the difference between the obfuscated test data and the 2-nd feature adapted data.

In addition, the 2-nd learning device 100 may input the 2-nd feature adapted data into each of the 1-st learning network F1 to the n-th learning network Fn, and allow each of the 1-st learning network F1 to the n-th learning network Fn to (i) apply its corresponding learning operation to the 2-nd feature adapted data using respectively the 1-st learned parameters to the n-th learned parameters of the 1-st learning network F1 to the n-th learning network Fn, and thus (ii) output each piece of the (2_1)-st adaption characteristic information to the (2_n)-th adaption characteristic information. And, the 2-nd learning device 100 may acquire the 2-nd adaption error (i) by performing weighted summation of (i-1) a difference between the (1_1)-st characteristic information for testing and the (2_1)-st adaption characteristic information to (i-2) a difference between the (1_n)-th characteristic information for testing and the (2_n)-th adaption characteristic information, where the (1_1)-st characteristic information for testing to the (1_n)-th characteristic information for testing may be respectively created by inputting the obfuscated test data into the 1-st learning network F1 to the n-th learning network Fn, or (ii) by performing weighted summation of (ii-1) a difference between the (2_1)-st characteristic information for testing and the (2_1)-st adaption characteristic information to (ii-2) a difference between the (2_n)-th characteristic information for testing and the (2_n)-th adaption characteristic information, where the (2_1)-st characteristic information for testing to the (2_n)-th characteristic information for testing may be respectively created by inputting the test data into the 1-st learning network F1 to the n-th learning network Fn.

Herein, (i) each of the difference between the (1_1)-st characteristic information for testing and the (2_1)-st adaption characteristic information to the difference between the (1_n)-th characteristic information for testing and the (2_n)-th adaption characteristic information may be determined respectively by further referring to each of a (2_1)-st adaption loss which is calculated by referring to a (2_1)-st adaption task specific output created using the (2_1)-st adaption characteristic information and by further referring to the test data GT to a (2_n)-th adaption loss which is calculated by referring to a (2_n)-th adaption task specific output created using the (2_n)-th adaption characteristic information and by further referring to the test data GT, or (ii) each of the difference between the (2_1)-st characteristic information for testing and the (2_1)-st adaption characteristic information to the difference between the (2_n)-th characteristic information for testing and the (2_n)-th adaption characteristic information may be determined respectively by further referring to each of a (2_1)-st adaption loss which is calculated by referring to a (2_1)-st adaption task specific output created using the (2_1)-st adaption characteristic information and by further referring to the test data GT to a (2_n)-th adaption loss which is calculated by referring to a (2_n)-th adaption task specific output created using the (2_n)-th adaption characteristic information and by further referring to the test data GT.

In addition, the 2-nd learning device 100 may input the 2-nd feature adapted data into each of the 1-st learning network F1 to the n-th learning network Fn, and allow each of the 1-st learning network F1 to the n-th learning network Fn to (i) apply its corresponding learning operation to the 2-nd feature adapted data using respectively the 1-st learned parameters to the n-th learned parameters of the 1-st learning network F1 to the n-th learning network Fn, and thus (ii) output each piece of the (2_1)-st adaption characteristic information to the (2_n)-th adaption characteristic information. And, the 2-nd adaption error may be calculated by performing weighted summation of (i) the (2_1)-st adaption loss which is calculated by referring to (i-1) the (2_1)-st adaption task specific output created using the (2_1)-st adaption characteristic information and (i-2) the test data GT to (ii) the (2_n)-th adaption loss which is calculated by referring to (ii-1) the (2_n)-th adaption task specific output created using the (2_n)-th adaption characteristic information and (ii-2) the test data GT.

Meanwhile, the obfuscation network O may be learned as above such that the 1-st error is minimized which is a weighted sum of the (1_1)-st error to the (1_n)-th error where the (1_1)-st error is calculated by referring to the (1_1)-st characteristic information for training and the (2_1)-st characteristic information for training and where the (1_n)-th error is calculated by referring to the (1_n)-th characteristic information for training and the (2_n)-th characteristic information for training, and such that the 2-nd error is maximized which is an obfuscated training data score corresponding to the obfuscated training data inputted into the discriminator. However, as another example, the obfuscation network O may be learned sequentially using each of the (1_1)-st error to the (1_n)-th error.

That is, the 1-st learning device may input the training data into the obfuscation network O, and allow the obfuscation network O to obfuscate the training data and thus to generate 1-st obfuscated training data. And, the 1-st learning device may perform or support another device to perform processes of (i) inputting the 1-st obfuscated training data into the 1-st learning network F1, and allowing the 1-st learning network F1 to (i-1) apply a network operation to the 1-st obfuscated training data using the 1-st learned parameters of the 1-st learning network F1 and thus to (i-2) output (1_1)-st characteristic information for training corresponding to the 1-st obfuscated training data, and (ii) inputting the training data into the 1-st learning network F1, and (iii) allowing the 1-st learning network F1 to (iii-1) apply a network operation to the training data using the 1-st learned parameters and thus to (iii-2) output the (2_1)-st characteristic information for training corresponding to the training data. Thereafter, the 1-st learning device may learn the obfuscation network O, such that (i) at least one (1_1)-st error is minimized which is calculated by referring to the (1_1)-st characteristic information and the (2_1)-st characteristic information, and such that at least one (2_1)-st error is maximized which is at least one 1-st obfuscated training data score corresponding to the 1-st obfuscated training data inputted into the discriminator D, to thereby allow the obfuscation network O to be the 1-st learned obfuscation network O. And the 1-st learning device may learn the discriminator D, such that at least one 1-st modified training data or at least one 1-st modified obfuscated training data score is maximized which corresponds to the modified training data or the modified obfuscated training data inputted into the discriminator D and such that at least one 1-st obfuscated training data score is minimized, to thereby allow the discriminator D to be a 1-st learned discriminator D.

And, while increasing an integer k from 2 to n, the 1-st learning device may repeat the processes above up to the n-th learning network Fn, to thereby acquire an n-th learned obfuscation network O.

That is, the 1-st learning device may input the training data into the (k−1)-th learned obfuscation network O, and allow the (k−1)-th learned obfuscation network O to obfuscate the training data and thus to generate k-th obfuscated training data. And, the 1-st learning device may perform or support another device to perform processes of (i) inputting the k-th obfuscated training data into the k-th learning network Fk, and allowing the k-th learning network Fk to (i-1) apply a network operation to the k-th obfuscated training data using the k-th learned parameters of the k-th learning network Fk and thus to (i-2) output (1_k)-th characteristic information for training corresponding to the k-th obfuscated training data, and (ii) inputting the training data into the k-th learning network Fk, and allowing the k-th learning network Fk to (ii-1) apply a network operation to the training data using the k-th learned parameters and thus to (ii-2) output the (2_k)-th characteristic information for training corresponding to the training data. Thereafter, the 1-st learning device may learn the (k−1)-th learned obfuscation network O, such that (i) at least one (1_k)-th error is minimized which is calculated by referring to the (1_k)-th characteristic information for training and the (2_k)-th characteristic information for training, and such that at least one (2_k)-th error is maximized which is at least one k-th obfuscated training data score corresponding to the k-th obfuscated training data inputted into the (k−1)-th learned discriminator D, to thereby allow the (k−1)-th learned obfuscation network O to be the k-th learned obfuscation network O. And the 1-st learning device may learn the (k−1)-th learned discriminator D, such that at least one k-th modified training data score or at least one k-th modified obfuscated training data score is maximized which corresponds to the modified training data or the modified obfuscated training data inputted into the (k−1)-th learned discriminator D and such that at least one k-th obfuscated training data score is minimized, to thereby allow the (k−1)-th learned discriminator D to be a k-th learned discriminator D.

Herein, the (1_k)-th error may be calculated by further referring to a k-th obfuscation loss acquired by referring to (i) a k-th task specific output for training, on the k-th obfuscated training data created by using the (1_k)-th characteristic information for training and (ii) the training data GT corresponding to the training data.

Also, the (1_k)-th error may be one of (i) the difference between the (1_k)-th characteristic information for training and the (2_k)-th characteristic information for training, (ii) the k-th obfuscation loss, and (iii) a summation of said (i) and said (ii), but the scope of the present disclosure is not limited thereto.

Next, while the obfuscation network O is being learned by the 1-st learning device using the processes above, the 2-nd learning device 100 may input the training data into the adaption network A, to thereby allow the adaption network A to adapt the training data and thus to generate the 1-st feature adapted data. Herein, the 1-st learning device and the 2-nd learning device 100 may be a same device or different devices.

And, the 2-nd learning device 100 may perform a process of acquiring a 1-st adaption ground truth corresponding to the obfuscated training data generated by the obfuscation network O, and learning the adaption network A such that a 1-st adaption error is minimized which is calculated by referring to (1) a 1-st adaption reference corresponding to the 1-st feature adapted data and (2) the 1-st adaption ground truth.

Herein, the 2-nd learning device 100 may acquire the obfuscated training data as the 1-st adaption ground truth, may acquire the 1-st feature adapted data as the 1-st adaption reference, and may acquire the 1-st adaption error by referring to the difference between the obfuscated training data and the 1-st feature adapted data.

Also, the 2-nd learning device 100 may perform (i) a process of inputting the (1_1)-st feature adapted data which is the 1-st feature adapted data into the 1-st learning network F1, to thereby allow the 1-st learning network F1 to output the (1_1)-st adaption characteristic information by applying the learning operation to the (1_1)-st feature adapted data using the 1-st learned parameters, and (ii) a process of learning the adaption network A such that the (1_1)-st adaption error is minimized which is calculated by referring to one of a difference between the (1_1)-st characteristic information for training and the (1_1)-st adaption characteristic information and a difference between the (2_1)-st characteristic information for training and the (1_1)-st adaption characteristic information, to thereby allow the adaption network A to be a 1-st learned adaption network A. And, the 2-nd learning device 100 may input the training data into a (k−1)-th learned adaption network A, to thereby allow the (k−1)-th learned adaption network A to generate (1_k)-th feature adapted data, and may input the (1_k)-th feature adapted data into a k-th learning network Fk, to thereby allow the k-th learning network Fk to generate (1_k)-th adaption characteristic information by applying the learning operation to the (1_k)-th feature adapted data. Thereafter, the 2-nd learning device 100 may perform a process of learning the (k−1)-th learned adaption network A such that a (1_k)-th adaption error is minimized which is calculated by referring to one of a difference between the (1_k)-th characteristic information for training and the (1_k)-th adaption characteristic information and a difference between the (2_k)-th characteristic information for training and the (1_k)-th adaption characteristic information, to thereby allow the (k−1)-th learned adaption network A to be a k-th learned adaption network A.

Herein, (i) each of (i-1) the difference between the (1_1)-st characteristic information for training and the (1_1)-st adaption characteristic information to (i-2) the difference between the (1_n)-th characteristic information for training and the (1_n)-th adaption characteristic information may be determined respectively by further referring to (ii) each of (ii-1) a (1_1)-st adaption loss which is calculated by referring to (ii-1a) a (1_1)-st adaption task specific output created using the (1_1)-st adaption characteristic information and (ii-1b) the training data GT to a (ii-2) (1_n)-th adaption loss which is calculated by referring to (ii-2a) a (1_n)-th adaption task specific output created using the (1_n)-th adaption characteristic information and (ii-2b) the training data GT. Or, (i) each of (i-1) the difference between the (2_1)-st characteristic information for training and the (1_1)-st adaption characteristic information to (i-2) the difference between the (2_n)-th characteristic information for training and the (1_n)-th adaption characteristic information may be determined respectively by further referring to (ii) each of (ii-1) a (1_1)-st adaption loss which is calculated by referring to (ii-1a) a (1_1)-st adaption task specific output created using the (1_1)-st adaption characteristic information and (ii-1b) the training data GT to a (ii-2) (1_n)-th adaption loss which is calculated by referring to (ii-2a) a (1_n)-th adaption task specific output created using the (1_n)-th adaption characteristic information and (ii-2b) the training data GT.

In addition, the 2-nd learning device 100 may perform (i) a process of inputting the (1_1)-st feature adapted data which is the 1-st feature adapted data into the 1-st learning network F1, to thereby allow the 1-st learning network F1 to output the (1_1)-st adaption characteristic information by applying the learning operation to the (1_1)-st feature adapted data using the 1-st learned parameters, and (ii) a process of learning the adaption network A such that the (1_1)-st adaption loss is minimized which is calculated by referring to (ii-1) the (1_1)-st adaption task specific output created by referring to the (1_1)-st adaption characteristic information and (ii-2) the training data GT, to thereby allow the adaption network A to be the 1-st learned adaption network A. And, the 2-nd learning device 100 may input the training data into a (k−1)-th learned adaption network A, to thereby allow the (k−1)-th learned adaption network A to generate (1_k)-th feature adapted data, and may input the (1_k)-th feature adapted data into a k-th learning network Fk, to thereby allow the k-th learning network Fk to generate (1_k)-th adaption characteristic information by applying the learning operation to the (1_k)-th feature adapted data, and may learn the (k−1)-th learned adaption network A such that the (1_k)-th adaption loss is minimized which is calculated by using the (1_k)-th adaption task specific output created by referring to the (1_k)-th adaption characteristic information and to the training data GT, to thereby allow the (k−1)-th learned adaption network A to be the k-th learned adaption network A.

As another example, on condition that the obfuscation network O has been learned by the 1-st learning device using the processes above, the 2-nd learning device 100 may input the test data into the adaption network A, to thereby allow the adaption network A to adapt the test data and thus to generate the 2-nd feature adapted data. Herein, the 1-st learning device and the 2-nd learning device 100 may be a same device or different devices.

And, the 2-nd learning device 100 may perform a process of inputting the test data into the learned obfuscation network O, to thereby allow the learned obfuscation network O to generate the obfuscated test data, a process of acquiring a 2-nd adaption ground truth corresponding to the obfuscated test data, and a process of learning the adaption network A such that a 2-nd adaption error is minimized which may be calculated by referring to (1) a 2-nd adaption reference corresponding to the 2-nd feature adapted data and (2) the 2-nd adaption ground truth.

Herein, the 2-nd learning device 100 may acquire the obfuscated test data as the 2-nd adaption ground truth, may acquire the 2-nd feature adapted data as the 2-nd adaption reference, and may acquire the 2-nd adaption error by referring to the difference between the obfuscated test data and the 2-nd feature adapted data.

Also, the 2-nd learning device 100 may input the obfuscated test data into each of the 1-st learning network F1 to the n-th learning network Fn, and allow each of the 1-st learning network F1 to the n-th learning network Fn to (i) apply its corresponding learning operation to the obfuscated test data using respectively the 1-st learned parameters to the n-th learned parameters of the 1-st learning network F1 to the n-th learning network Fn, and thus (ii) output each piece of the (1_1)-st characteristic information for testing to the (1_n)-th characteristic information for testing, or may input the test data into the 1-st learning network F1 to the n-th learning network Fn, to thereby allow each of the 1-st learning network F1 to the n-th learning network Fn to output the (2_1)-st characteristic information for testing to the (2_n)-th characteristic information for testing by applying the learning operation to the test data. And, the 2-nd learning device 100 may perform (i) a process of inputting the (2_1)-st feature adapted data, which is the 2-nd feature adapted data, into the 1-st learning network F1, to thereby allow the 1-st learning network F1 to output the (2_1)-st adaption characteristic information by applying the learning operation to the (2_1)-st feature adapted data using the 1-st learned parameters, and (ii) a process of learning the adaption network A such that the (2_1)-st adaption error is minimized which is calculated by referring to one of a difference between the (1_1)-st characteristic information for testing and the (2_1)-st adaption characteristic information and a difference between the (2_1)-st characteristic information for testing and the (2_1)-st adaption characteristic information, to thereby allow the adaption network A to be the 1-st learned adaption network A. And, the 2-nd learning device may input the test data into the (k−1)-th learned adaption network A, to thereby allow the (k−1)-th learned adaption network A to generate (2_k)-th feature adapted data, and may input the (2_k)-th feature adapted data into the k-th learning network Fk, to thereby allow the k-th learning network Fk to generate (2_k)-th adaption characteristic information by applying the learning operation to the (2_k)-th feature adapted data. Thereafter, the 2-nd learning device 100 may perform a process of learning the (k−1)-th learned adaption network A such that the (2_k)-th adaption error is minimized which is calculated by referring to one of a difference between the (1_k)-th characteristic information for testing and the (2_k)-th adaption characteristic information and a difference between the (2_k)-th characteristic information for testing and the (2_k)-th adaption characteristic information, to thereby allow the (k−1)-th learned adaption network A to be the k-th learned adaption network A.

Herein, (i) each of the difference between the (1_1)-st characteristic information for testing and the (2_1)-st adaption characteristic information to the difference between the (1_n)-th characteristic information for testing and the (2_n)-th adaption characteristic information may be determined respectively by further referring to each of a (2_1)-st adaption loss which is calculated by referring to a (2_1)-st adaption task specific output created using the (2_1)-st adaption characteristic information and by further referring to the test data GT to a (2_n)-th adaption loss which is calculated by referring to a (2_n)-th adaption task specific output created using the (2_n)-th adaption characteristic information and by further referring to the test data GT, or (ii) each of the difference between the (2_1)-st characteristic information for testing and the (2_1)-st adaption characteristic information to the difference between the (2_n)-th characteristic information for testing and the (2_n)-th adaption characteristic information may be determined respectively by further referring to each of a (2_1)-st adaption loss which is calculated by referring to a (2_1)-st adaption task specific output created using the (2_1)-st adaption characteristic information and by further referring to the test data GT to a (2_n)-th adaption loss which is calculated by referring to a (2_n)-th adaption task specific output created using the (2_n)-th adaption characteristic information and by further referring to the test data GT.

In addition, the 2-nd learning device 100 may perform (i) a process of inputting the (2_1)-st feature adapted data, which is the 2-nd feature adapted data, into the 1-st learning network F1, to thereby allow the 1-st learning network F1 to output the (2_1)-st adaption characteristic information by applying the learning operation to the (2_1)-st feature adapted data using the 1-st learned parameters, and (ii) a process of learning the adaption network A such that the (2_1)-st adaption loss is minimized which is calculated by referring to (2_1)-st adaption task specific output created by using the (2_1)-st adaption characteristic information and to the test data GT, to thereby allow the adaption network A to be the 1-st learned adaption network A. And, the 2-nd learning device may input the test data into the (k−1)-th learned adaption network A, to thereby allow the (k−1)-th learned adaption network A to generate (2_k)-th feature adapted data, and may input the (2_k)-th feature adapted data into the k-th learning network Fk, to thereby allow the k-th learning network Fk to generate (2_k)-th adaption characteristic information by applying the learning operation to the (2_k)-th feature adapted data. Thereafter, the 2-nd learning device 100 may perform a process of learning the (k−1)-th learned adaption network A such that the (2_k)-th adaption loss is minimized which is calculated by referring to the (2_k)-th adaption task specific output created by using the (2_k)-th adaption characteristic information and to the test data GT, to thereby allow the (k−1)-th learned adaption network A to be the k-th learned adaption network A.

Figure 6:
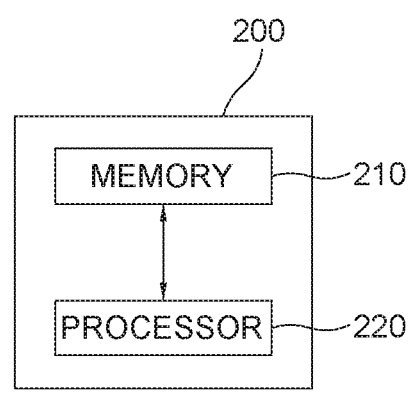
FIG. 6 is a drawing schematically illustrating a testing device for testing a learned adaption network in accordance with one example embodiment of the present disclosure.

FIG. 6 is a drawing schematically illustrating a testing device for testing a learned adaption network A in accordance with one example embodiment of the present disclosure.

By referring to FIG. 6, the testing device 200 in accordance with one example embodiment of the present disclosure may include a memory 210 for storing instructions to test the adaption network which is the machine learning model having the same types of the formats of the inputs and outputs of those of the obfuscation network but having the architecture different from that of the obfuscation network capable of obfuscating at least one input data such that the learning network outputs a result, calculated by using the obfuscated data, same or similar to a result calculated by using the input data, and a processor 220 for performing processes to learn the obfuscation network according to the instructions in the memory 210.

Specifically, the testing device 200 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

Also, the processors of such devices may include hardware configuration of MPU (Micro Processing Unit) or CPU (Central Processing Unit), cache memory, data bus, etc. Additionally, the computing device may further include OS and software configuration of applications that achieve specific purposes.

Such description of the computing device does not exclude an integrated device including any combination of a processor, a memory, a medium, or any other computing components for implementing the present disclosure.

Meanwhile, the testing device 200 may test the learned adaption network by using the method as below.

First, the adaption network may have been learned beforehand by processes similar to those in description of FIGS. 2 to 5.

That is, the 1-st learning device may have performed or may be performing processes of (i) if the training data is inputted into the obfuscation network, instructing the obfuscation network to obfuscate the training data, to thereby generate the obfuscated training data, (ii) (ii-1) inputting the obfuscated training data into the learning network having its own one or more learned parameters, to thereby allow the learning network to generate the 1-st characteristic information for training by applying the learning operation to the obfuscated training data using the learned parameters, and (ii-2) inputting the training data into the learning network, to thereby allow the learning network to generate the 2-nd characteristic information for training by applying the learning operation to the training data using the learned parameters, and (iii) learning the obfuscation network such that the 1-st error is minimized which is calculated by referring to the 1-st characteristic information for training and the 2-nd characteristic information for training, and such that the 2-nd error is maximized which is calculated by referring to the training data and the obfuscated training data.

Thereafter, the 2-nd learning device may perform one of (i) a process of inputting the training data into the adaption network, to thereby allow the adaption network to adapt the training data and thus to generate the 1-st feature adapted training data, and (ii) a process of inputting the 1-st test data into the adaption network, to thereby allow the adaption network to adapt the 1-st test data and thus to generate 2-nd feature adapted training data, and may perform one of (iii) a process of acquiring a 1-st adaption ground truth corresponding to the obfuscated training data generated by the obfuscation network, and learning the adaption network such that a 1-st adaption error is minimized which is calculated by referring to (1) a 1-st adaption reference corresponding to the 1-st feature adapted training data and (2) the 1-st adaption ground truth, and (iv) a process of learning the adaption network such that a 2-nd adaption error is minimized which is calculated by referring to a 2-nd adaption ground truth corresponding to the obfuscated test data generated by inputting the test data into the learned obfuscation network and further referring to a 2-nd adaption reference corresponding to the 2-nd feature adapted training data.

Next, if 2-nd test data is acquired, the testing device may perform processes of inputting the 2-nd test data into the learned adaption network, to thereby allow the learned adaption network to generate a feature adapted test data by adapting the 2-nd test data, and acquiring the feature adapted test data as concealed data of the 2-nd test data.

Herein, the 2-nd test data may be same with or different from the 1-st test data. That is, the 1-st test data may be used for testing the learned obfuscation network, and the 2-nd test data may be used for testing the learned adaption network.

Meanwhile, the adaption network learned according to example embodiments of the present disclosure can be implemented in a form of executable program command through a variety of computer means recordable in computer readable media. In accordance with one example embodiment of the present disclosure, the buyer may execute the program instructions recorded in the computer readable media by using the computer devices, to thereby generate adapted data, similar to the concealed data, from the original data owned by the buyer or acquired from other sources, and use the adapted data for his/her own learning network.

Meanwhile, in accordance with one example embodiment of the present disclosure, if the learned adaption network is implemented as the program instructions that can be executed by a variety of computer components, the learned adaption network may consume less computing resources and thus the computational overhead may be prevented, unlike computational overhead that may be caused by the obfuscation network, whose accuracy is set as high, on the computing devices of the buyer.

The present disclosure has an effect of performing concealment in a simple and accurate way, since a process of finding personal identification information in data is eliminated.

The present disclosure has another effect of protecting privacy and security of the original data by generating irreversibly obfuscated and concealed data from the original data.

The present disclosure has still another effect of generating data recognized as similar or same by a computer but recognized as different by a human.

The present disclosure has still yet another effect of stimulating a big data trade market.

The present disclosure has still yet another effect of preventing the overhead at run-time by providing the learning model which consumes less computing resources compared to a model learned to conceal the original data.

The embodiments of the present disclosure as explained above can be implemented in a form of executable program command through a variety of computer means recordable in computer readable media. The computer readable media may include solely or in combination, program commands, data files, and data structures. The program commands recorded to the media may be components specially designed for the present disclosure or may be usable to those skilled in the art of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands may include not only a machine language code made by a compiler but also a high level code that can be used by an interpreter etc., which may be executed by a computer. The aforementioned hardware device can work as more than a software module to perform the action of the present disclosure and vice versa.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for learning an adaption network corresponding to an obfuscation network used for concealing original data to protect personal information, comprising steps of: (a) on condition that a 1-st learning device has performed or is performing processes of (i) when training data is inputted into the obfuscation network, instructing the obfuscation network to obfuscate the training data, to thereby generate obfuscated training data, (ii) (ii-1) inputting the obfuscated training data into a learning network having its own one or more learned parameters, to thereby allow the learning network to generate 1-st characteristic information for training by applying a learning operation to the obfuscated training data using the learned parameters, and (ii-2) inputting the training data into the learning network, to thereby allow the learning network to generate 2-nd characteristic information for training by applying the learning operation to the training data using the learned parameters, and (iii) learning the obfuscation network such that a 1-st error is minimized which is calculated by referring to the 1-st characteristic information for training and the 2-nd characteristic information for training, and such that a 2-nd error is maximized which is calculated by referring to the training data and the obfuscated training data, a 2-nd learning device performing one of a process of inputting the training data into the adaption network, to thereby allow the adaption network to adapt the training data and thus to generate 1-st feature adapted data, and a process of inputting test data into the adaption network, to thereby allow the adaption network to adapt the test data and thus to generate 2-nd feature adapted data; and (b) the 2-nd learning device performing one of (i) a process of acquiring a 1-st adaption ground truth (GT) corresponding to the obfuscated training data generated by the obfuscation network, and learning the adaption network such that a 1-st adaption error is minimized which is calculated by referring to (1) a 1-st adaption reference corresponding to the 1-st feature adapted data and (2) the 1-st adaption ground truth, and (ii) a process of learning the adaption network such that a 2-nd adaption error is minimized which is calculated by referring to a 2-nd adaption ground truth corresponding to obfuscated test data generated by inputting the test data into the learned obfuscation network and further referring to a 2-nd adaption reference corresponding to the 2-nd feature adapted data.

2. The method of claim 1, wherein the 2-nd learning device performs one of (i) a process of (i-1) inputting the 1-st feature adapted data into the learning network, to thereby allow the learning network to output 1-st adaption characteristic information corresponding to the 1-st feature adapted data as the 1-st adaption reference by applying the learning operation to the 1-st feature adapted data using the learned parameters, and (i-2) acquiring the 1-st adaption error by referring to one of a difference between the 1-st characteristic information for training and the 1-st adaption characteristic information and a difference between the 2-nd characteristic information for training and the 1-st adaption characteristic information, and (ii) a process of (ii-1) inputting the 2-nd feature adapted data into the learning network, to thereby allow the learning network to output 2-nd adaption characteristic information corresponding to the 2-nd feature adapted data as the 2-nd adaption reference by applying the learning operation to the 2-nd feature adapted data using the learned parameters, and (ii-2) acquiring the 2-nd adaption error by referring to one of (ii-2a) a difference between 1-st characteristic information for testing, generated by inputting the obfuscated test data into the learning network, and the 2-nd adaption characteristic information and (ii-2b) a difference between 2-nd characteristic information for testing, generated by inputting the test data into the learning network, and the 2-nd adaption characteristic information.

3. The method of claim 2, wherein the 1-st error is calculated by using an obfuscation loss acquired by referring to (i) a task specific output for training, on the obfuscated training data created by using the 1-st characteristic information for training and (ii) a training data GT corresponding to the training data,
wherein the 1-st adaption error is calculated by using a 1-st adaption loss acquired by referring to (i) a 1-st adaption task specific output on the 1-st feature adapted data created by using the 1-st adaption characteristic information, and (ii) the training data GT, and
wherein the 2-nd adaption error is calculated by using a 2-nd adaption loss acquired by referring to (i) a 2-nd adaption task specific output on the 2-nd feature adapted data created by using the 2-nd adaption characteristic information, and (ii) a test data GT corresponding to the test data.

4. The method of claim 2, wherein the 1-st error is calculated by referring to (i) a difference between the 1-st characteristic information for training and the 2-nd characteristic information for training, and (ii) an obfuscation loss acquired by referring to (ii-1) a task specific output for training, on the obfuscated training data created by using the 1-st characteristic information for training and (ii-2) a training data GT corresponding to the training data,
wherein the 1-st adaption error is calculated by referring to (i) a difference between the 1-st characteristic information for training and the 1-st adaption characteristic information or a difference between the 2-nd characteristic information for training and the 1-st adaption characteristic information, and (ii) a 1-st adaption loss acquired by referring to (ii-1) a 1-st adaption task specific output on the 1-st feature adapted data created by using the 1-st adaption characteristic information and (ii-2) the training data GT, and
wherein the 2-nd adaption error is calculated by referring to (i) a difference between the 1-st characteristic information for testing and the 2-nd adaption characteristic information or a difference between the 2-nd characteristic information for testing and the 2-nd adaption characteristic information, and (ii) a 2-nd adaption loss acquired by referring to (ii-1) a 2-nd adaption task specific output on the 2-nd feature adapted data created by using the 2-nd adaption characteristic information and (ii-2) a test data GT corresponding to test data.

5. The method of claim 2, wherein the learning network includes a 1-st learning network to an n-th learning network respectively having one or more 1-st learned parameters to one or more n-th learned parameters wherein n is an integer greater than 0,
- on condition that the 1-st learning device has performed or is performing processes of (i) inputting the obfuscated training data into each of the 1-st learning network to the n-th learning network, to thereby allow each of the 1-st learning network to the n-th learning network to generate (1_1)-st characteristic information for training to (1_n)-th characteristic information for training by applying the learning operation to the obfuscated training data using the 1-st learned parameters to the n-th learned parameters, (ii) inputting the training data into each of the 1-st learning network to the n-th learning network, to thereby allow each of the 1-st learning network to the n-th learning network to generate (2_1)-st characteristic information for training to (2_n)-th characteristic information for training by applying the learning operation to the training data using the 1-st learned parameters to the n-th learned parameters, (iii) generating the 1-st error which is a weighted sum of a (1_1)-st error to a (1_n)-th error wherein the (1_1)-st error is calculated by referring to the (1_1)-st characteristic information for training and the (2_1)-st characteristic information for training and wherein the (1_n)-th error is calculated by referring to the (1_n)-th characteristic information for training and the (2_n)-th characteristic information for training, and (iv) learning the obfuscation network such that the 1st error is minimized and the 2-nd error is maximized,
- the 2-nd learning device performs processes of (i) (i-1) inputting the 1-st feature adapted data into each of the 1-st learning network to the n-th learning network, to thereby allow each of the 1-st learning network to the n-th learning network to generate (1_1)-st adaption characteristic information to (1_n)-th adaption characteristic information by applying the learning operation to the 1-st feature adapted data using the 1-st learned parameters to the n-th learned parameters, and (i-2) acquiring the 1-st adaption error by performing weighted summation of a difference between the (1_1)-st characteristic information for training and the (1_1)-st adaption characteristic information to a difference between the (1_n)-th characteristic information for training and the (1_n)-th adaption characteristic information, or by performing weighted summation of a difference between the (2_1)-st characteristic information for training and the (1_1)-st adaption characteristic information to a difference between the (2_n)-th characteristic information for training and the (1_n)-th adaption characteristic information, or (ii) (ii-1) inputting the 2-nd feature adapted data into each of the 1-st learning network to the n-th learning network, to thereby allow each of the 1-st learning network to the n-th learning network to generate (2_1)-st adaption characteristic information to (2_n)-th adaption characteristic information by applying the learning operation to the 2-nd feature adapted data using the 1-st learned parameters to the n-th learned parameters, and (ii-2) acquiring the 2-nd adaption error by performing weighted summation of (ii-1) a difference between (1_1)-st characteristic information for testing and the (2_1)-st adaption characteristic information to a difference between (1_n)-th characteristic information for testing and the (2_n)-th adaption characteristic information wherein the (1_1)-st characteristic information for testing to the (1_n)-th characteristic information for testing are respectively created by inputting the obfuscated test data into the 1-st learning network to the n-th learning network, or by performing weighted summation of (ii-2) a difference between the (2_1)-st characteristic information for testing and the (2_1)-st adaption characteristic information to a difference between the (2_n)-th characteristic information for testing and the (2_n)-th adaption characteristic information wherein the (2_1)-st characteristic information for testing to the (2_n)-th characteristic information for testing are respectively created by inputting the test data into the 1-st learning network to the n-th learning network.

6. The method of claim 5, wherein the (1_1)-st error to the (1_n)-th error are calculated respectively by further referring to (i) a 1-st obfuscation loss acquired by referring to (i-1) a 1-st task specific output for training created by using the (1_1)-st characteristic information for training and (i-2) the training data GT to (ii) an n-th obfuscation loss acquired by referring to (ii-1) an n-th task specific output for training created by using the (1_n)-th characteristic information for training and (ii-2) the training data GT,
- wherein (i) each of a difference between the (1_1)-st characteristic information for training and the (1_1)-st adaption characteristic information to a difference between the (1_n)-th characteristic information for training and the (1_n)-th adaption characteristic information is determined respectively by further referring to each of a (1_1)-st adaption loss which is calculated by referring to a (1_1)-st adaption task specific output created using the (1_1)-st adaption characteristic information and by further referring to the training data GT to a (1_n)-th adaption loss which is calculated by referring to a (1_n)-th adaption task specific output created using the (1_n)-th adaption characteristic information and by further referring to the training data GT, or wherein (ii) each of a difference between the (2_1)-st characteristic information for training and the (1_1)-st adaption characteristic information to a difference between the (2_n)-th characteristic information for training and the (1_n)-th adaption characteristic information is determined respectively by further referring to each of the (1_1)-st adaption loss which is calculated by referring to the (1_1)-st adaption task specific output created using the (1_1)-st adaption characteristic information and by further referring to the training data GT to the (1_n)-th adaption loss which is calculated by referring to the (1_n)-th adaption task specific output created using the (1_n)-th adaption characteristic information and by further referring to the training data GT, and
- wherein (i) each of a difference between the (1_1)-st characteristic information for testing and the (2_1)-st adaption characteristic information to a difference between the (1_n)-th characteristic information for testing and the (2_n)-th adaption characteristic information is determined respectively by further referring to each of a (2_1)-st adaption loss which is calculated by referring to a (2_1)-st adaption task specific output created using the (2_1)-st adaption characteristic information and by further referring to the test data GT to a (2_n)-th adaption loss which is calculated by referring to a (2_n)-th adaption task specific output created using the (2_n)-th adaption characteristic information and by further referring to the test data GT, or wherein (ii) each of a difference between the (2_1)-st characteristic information for testing and the (2_1)-st adaption characteristic information to a difference between the (2_n)-th characteristic information for testing and the (2_n)-th adaption characteristic information is determined respectively by further referring to each of the (2_1)-st adaption loss which is calculated by referring to the (2_1)-st adaption task specific output created using the (2_1)-st adaption characteristic information and by further referring to the test data GT to a (2_n)-th adaption loss which is calculated by referring to the (2_n)-th adaption task specific output created using the (2_n)-th adaption characteristic information and by further referring to the test data GT.

7. The method of claim 2, wherein the learning network includes a 1-st learning network to an n-th learning network respectively having one or more 1-st learned parameters to one or more n-th learned parameters wherein n is an integer greater than 0, on condition that the 1-st learning device has performed or is performing processes of (i) inputting the obfuscated training data into each of the 1-st learning network to the n-th learning network, to thereby allow each of the 1-st learning network to the n-th learning network to generate (1_1)-st characteristic information for training to (1_n)-th characteristic information for training by applying the learning operation to the obfuscated training data using the 1-st learned parameters to the n-th learned parameters, (ii) inputting the training data into each of the 1-st learning network to the n-th learning network, to thereby allow each of the 1-st learning network to the n-th learning network to generate (2_1)-st characteristic information for training to (2_n)-th characteristic information for training by applying the learning operation to the training data using the 1-st learned parameters to the n-th learned parameters, (iii) generating the 1-st error which is a weighted sum of a 1-st obfuscation loss to an n-th obfuscation loss wherein the 1-st obfuscation loss is calculated by referring to a 1-st task specific output for training created by using the (1_1)-st characteristic information for training and by referring to the training data GT and the n-th obfuscation loss is calculated by referring to an n-th task specific output for training created by using the (1_n)-th characteristic information for training and by referring to the training data GT, and (iv) learning the obfuscation network such that the 1st error is minimized and the 2-nd error is maximized, the 2-nd learning device performs processes of (i) (i-1) inputting the 1-st feature adapted data into each of the 1-st learning network to the n-th learning network, to thereby allow each of the 1-st learning network to the n-th learning network to generate (1_1)-st adaption characteristic information to (1_n)-th adaption characteristic information by applying the learning operation to the 1-st feature adapted data using the 1-st learned parameters to the n-th learned parameters, and (i-2) acquiring the 1-st adaption error by performing weighted summation of a (1_1)-st adaption loss to a (1_n)-th adaption loss wherein the (1_1)-st adaption loss is calculated by referring to a (1_1)-st adaption task specific output created by using the (1_1)-st adaption characteristic information and by referring to the training data GT, and the (1_n)-th adaption loss is calculated by referring to a (1_n)-th adaption task specific output created by using the (1_n)-th adaption characteristic information and by referring to the training data GT, or (ii) (ii-1) inputting the 2-nd feature adapted data into each of the 1-st learning network to the n-th learning network, to thereby allow each of the 1-st learning network to the n-th learning network to generate (2_1)-st adaption characteristic information to (2_n)-th adaption characteristic information by applying the learning operation to the 2-nd feature adapted data using the 1-st learned parameters to the n-th learned parameters, and (ii-2) acquiring the 2-nd adaption error by performing weighted summation of (ii-1) a (2_1)-st adaption loss to a (2_n)-th adaption loss wherein the (2_1)-st adaption loss is calculated by referring to a (2_1)-st adaption task specific output created by using the (2_1)-st adaption characteristic information and by referring to the test data GT and the (2_n)-th adaption loss is calculated by referring to a (2_n)-th adaption task specific output created by using the (2_n)-th adaption characteristic information and by referring to the test data GT.

8. The method of claim 2, wherein the learning network includes a 1-st learning network to an n-th learning network respectively having one or more 1-st learned parameters to one or more n-th learned parameters wherein n is an integer greater than 0, on condition that the 1-st learning device has performed or is performing processes of (i) (i-1) inputting the 1-st obfuscated training data, which is the obfuscated training data, into the 1-st learning network, to thereby allow the 1-st learning network to generate (1_1)-st characteristic information for training by applying the learning operation to the 1-st obfuscated training data using the 1-st learned parameters, (ii-2) inputting the training data into the 1-st learning network, to thereby allow the 1-st learning network to generate (2_1)-st characteristic information for training by applying the learning operation to the training data using the 1-st learned parameters, and (ii-3) learning the obfuscation network such that a (1_1)-st error is minimized which is calculated by referring to the (1_1)-st characteristic information for training and the (2_1)-st characteristic information for training and such that a (2_1)-st error is maximized which is calculated by referring to the training data and the 1-st obfuscated training data to thereby allow the obfuscation network to be a 1-st learned obfuscation network, and (ii) while increasing an integer k from 2 to n, (ii-1) inputting the training data into a (k−1)-th learned obfuscation network, to thereby allow the (k−1)-th learned obfuscation network to generate k-th obfuscated training data, (ii-2) (1) inputting the k-th obfuscated training data into a k-th learning network, to thereby allow the k-th learning network to generate (1_k)-th characteristic information for training by applying the learning operation to the k-th obfuscated training data using k-th learned parameters, and (2) inputting the training data into the k-th learning network, to thereby allow the k-th learning network to generate (2_k)-th characteristic information for training by applying the learning operation to the training data using the k-th learned parameters, and (ii-3) learning the obfuscation network such that a (1_k)-th error is minimized which is calculated by referring to the (1_k)-th characteristic information for training and the (2_k)-th characteristic information for training and such that a (2_k)-th error is maximized which is calculated by referring to the training data and the k-th obfuscated training data, to thereby allow the (k−1)-th learned obfuscation network to be a k-th learned obfuscation network, the 2-nd learning device performs processes of (i) (i-1) inputting (1_1)-st feature adapted data which is the 1-st feature adapted data into the 1-st learning network, to thereby allow the 1-st learning network to generate (1_1)-st adaption characteristic information by applying the learning operation to the (1_1)-st feature adapted data using the 1-st learned parameters, (i-2) learning the adaption network such that a (1_1)-st adaption error is minimized which is calculated by referring to a difference between the (1_1)-st characteristic information for training and the (1_1)-st adaption characteristic information or a difference between the (2_1)-st characteristic information for training and the (1_1)-st adaption characteristic information, to thereby allow the adaption network to be a 1-st learned adaption network, inputting the training data into a (k−1)-th learned adaption network, to thereby allow the (k−1)-th learned adaption network to generate (1_k)-th feature adapted data, inputting the (1_k)-th feature adapted data into the k-th learning network, to thereby allow the k-th learning network to generate (1_k)-th adaption characteristic information by applying the learning operation to the (1_k)-th feature adapted data, and (i-3) learning the (k−1)-th learned adaption network such that a (1_k)-th adaption error is minimized which is calculated by referring to a difference between the (1_k)-th characteristic information for training and the (1_k)-th adaption characteristic information or a difference between the (2_k)-th characteristic information for training and the (1_k)-th adaption characteristic information, to thereby allow the (k−1)-th learned adaption network to be a k-th learned adaption network, or (ii) (ii-1) inputting the obfuscated test data into the 1-st learning network to the n-th learning network, to thereby allow each of the 1-st learning network to the n-th learning network to generate (1_1)-st characteristic information for testing to the (1_n)-th characteristic information for testing by applying the learning operation to the obfuscated test data, or inputting the test data into the 1-st learning network to the n-th learning network, to thereby allow each of the 1-st learning network to the n-th learning network to generate (2_1)-st characteristic information for testing to (2_n)-th characteristic information for testing by applying the learning operation to the test data, (ii-2) inputting (2_1)-st feature adapted data which is the 2-nd feature adapted data into the 1-st learning network, to thereby allow the 1-st learning network to generate (2_1)-st adaption characteristic information by applying the learning operation to the (2_1)-st feature adapted data using the 1-st learned parameters, (ii-3) learning the adaption network such that a (2_1)-st adaption error is minimized which is calculated by referring to a difference between the (1_1)-st characteristic information for testing and the (2_1)-st adaption characteristic information or a difference between the (2_1)-st characteristic information for testing and the (2_1)-st adaption characteristic information to thereby allow the adaption network to be a 1-st learned adaption network, inputting the test data into the (k−1)-th learned adaption network, to thereby allow the (k−1)-th learned adaption network to generate (2_k)-th feature adapted data, inputting the (2_k)-th feature adapted data into the k-th learning network, to thereby allow the k-th learning network to generate (2_k)-th adaption characteristic information by applying the learning operation to the (2_k)-th feature adapted data, and (ii-4) learning the (k−1)-th learned adaption network such that a (2_k)-th adaption error is minimized which is calculated by referring to a difference between the (1_k)-th characteristic information for testing and the (2_k)-th adaption characteristic information or a difference between the (2_k)-th characteristic information for testing and the (2_k)-th adaption characteristic information, to thereby allow the (k−1)-th learned adaption network to be a k-th learned adaption network.

9. The method of claim 8, wherein the (1_k)-th error is calculated by further referring to a k-th obfuscation loss acquired by referring to (i) a k-th task specific output for training, on the k-th obfuscated training data created by using the (1_k)-th characteristic information for training and (ii) a training data GT corresponding to the training data,
wherein (i) each of a difference between the (1_1)-st characteristic information for training and the (1_1)-st adaption characteristic information to a difference between the (1_n)-th characteristic information for training and the (1_n)-th adaption characteristic information is determined respectively by further referring to each of a (1_1)-st adaption loss which is calculated by referring to a (1_1)-st adaption task specific output created using the (1_1)-st adaption characteristic information and by further referring to the training data GT to a (1_n)-th adaption loss which is calculated by referring to a (1_n)-th adaption task specific output created using the (1_n)-th adaption characteristic information and by further referring to the training data GT, or wherein (ii) each of a difference between the (2_1)-st characteristic information for training and the (1_1)-st adaption characteristic information to a difference between the (2_n)-th characteristic information for training and the (1_n)-th adaption characteristic information is determined respectively by further referring to each of a (1_1)-st adaption loss which is calculated by referring to a (1_1)-st adaption task specific output created using the (1_1)-st adaption characteristic information and by further referring to the training data GT to a (1_n)-th adaption loss which is calculated by referring to a (1_n)-th adaption task specific output created using the (1_n)-th adaption characteristic information and by further referring to the training data GT, and
wherein (i) each of a difference between the (1_1)-st characteristic information for testing and the (2_1)-st adaption characteristic information to a difference between the (1_n)-th characteristic information for testing and the (2_n)-th adaption characteristic information is determined respectively by further referring to each of a (2_1)-st adaption loss which is calculated by referring to a (2_1)-st adaption task specific output created using the (2_1)-st adaption characteristic information and by further referring to the test data GT to a (2_n)-th adaption loss which is calculated by referring to a (2_n)-th adaption task specific output created using the (2_n)-th adaption characteristic information and by further referring to the test data GT, or wherein (ii) each of a difference between the (2_1)-st characteristic information for testing and the (2_1)-st adaption characteristic information to a difference between the (2_n)-th characteristic information for testing and the (2_n)-th adaption characteristic information is determined respectively by further referring to each of the (2_1)-st adaption loss which is calculated by referring to the (2_1)-st adaption task specific output created using the (2_1)-st adaption characteristic information and by further referring to the test data GT to a (2_n)-th adaption loss which is calculated by referring to the (2_n)-th adaption task specific output created using the (2_n)-th adaption characteristic information and by further referring to the test data GT.

10. The method of claim 2, wherein the learning network includes a 1-st learning network to an n-th learning network respectively having one or more 1-st learned parameters to one or more n-th learned parameters wherein n is an integer greater than 0, on condition that the 1-st learning device has performed or is performing processes of (i) (i-1) inputting the 1-st obfuscated training data, which is the obfuscated training data, into the 1-st learning network, to thereby allow the 1-st learning network to generate (1_1)-st characteristic information for training by applying the learning operation to the 1-st obfuscated training data using the 1-st learned parameters, (ii-2) inputting the training data into the 1-st learning network, to thereby allow the 1-st learning network to generate (2_1)-st characteristic information for training by applying the learning operation to the training data using the 1-st learned parameters, and (ii-3) learning the obfuscation network such that a (1_1)-st error is minimized which is calculated by referring to the (1_1)-st characteristic information for training and the (2_1)-st characteristic information for training and such that a (2_1)-st error is maximized which is calculated by referring to the training data and the 1-st obfuscated training data to thereby allow the obfuscation network to be a 1-st learned obfuscation network, and (ii) while increasing an integer k from 2 to n, (ii-1) inputting the training data into a (k−1)-th learned obfuscation network, to thereby allow the (k−1)-th learned obfuscation network to generate k-th obfuscated training data, (ii-2) (i) inputting the k-th obfuscated training data into a k-th learning network, to thereby allow the k-th learning network to generate (1_k)-th characteristic information for training by applying the learning operation to the k-th obfuscated training data using k-th learned parameters, and (2) inputting the training data into the k-th learning network, to thereby allow the k-th learning network to generate (2_k)-th characteristic information for training by applying the learning operation to the training data using the k-th learned parameters, and (ii-3) learning the obfuscation network such that a (1_k)-th error is minimized which is calculated by referring to the (1_k)-th characteristic information for training and the (2_k)-th characteristic information for training and such that a (2_k)-th error is maximized which is calculated by referring to the training data and the k-th obfuscated training data, to thereby allow the (k−1)-th learned obfuscation network to be a k-th learned obfuscation network, the 2-nd learning device performs processes of (i) (i-1) inputting (1_1)-st feature adapted data which is the 1-st feature adapted data into the 1-st learning network, to thereby allow the 1-st learning network to generate (1_1)-st adaption characteristic information by applying the learning operation to the (1_1)-st feature adapted data using the 1-st learned parameters, (i-2) learning the adaption network such that a (1_1)-st adaption loss is minimized which is calculated by referring to a (1_1)-st adaption task specific output created by using the (1_1)-st adaption characteristic information and by referring to the training data GT, to thereby allow the adaption network to be a 1-st learned adaption network, inputting the training data into a (k−1)-th learned adaption network, to thereby allow the (k−1)-th learned adaption network to generate (1_k)-th feature adapted data, inputting the (1_k)-th feature adapted data into the k-th learning network, to thereby allow the k-th learning network to generate (1_k)-th adaption characteristic information by applying the learning operation to the (1_k)-th feature adapted data, and (i-3) learning a (k−1)-th learned adaption network such that a (1_k)-th adaption loss is minimized which is calculated by referring to a (1_k)-th adaption task specific output created by using the (1_k)-th adaption characteristic information and by referring to the training GT, to thereby allow the (k−1)-th learned adaption network to be a k-th learned adaption network, or (ii) (ii-1) inputting a (2_1)-st feature adapted data which is the 2-nd feature adapted data into the 1-st learning network, to thereby allow the 1-st learning network to generate (2_1)-st adaption characteristic information by applying the learning operation to the (2_1)-st feature adapted data using the 1-st learned parameters, (ii-2) learning the adaption network such that a (2_1)-st adaption loss is minimized which is calculated by referring to a (2_1)-st adaption task specific output created by using the (2_1)-st adaption characteristic information and by referring to the test data GT, to thereby allow the adaption network to be a 1-st learned adaption network, inputting the test data into a (k−1)-th learned adaption network, to thereby allow the (k−1)-th learned adaption network to generate (2_k)-th feature adapted data, inputting the (2_k)-th feature adapted data into the k-th learning network, to thereby allow the k-th learning network to generate (2_k)-th adaption characteristic information by applying the learning operation to the (2_k)-th feature adapted data, and (ii-3) learning a (k−1)-th learned adaption network such that a (2_k)-th adaption loss is minimized which is calculated by referring to a (2_k)-th adaption task specific output created by using the (2_k)-th adaption characteristic information and by referring to the test data GT to thereby allow the (k−1)-th learned adaption network to be a k-th learned adaption network.

11. A method for testing an adaption network corresponding to an obfuscation network used for concealing original data to protect personal information, comprising steps of:

(a) after a 1-st learning device has performed or while the 1-st learning device is performing processes of (i) instructing the obfuscation network to obfuscate training data inputted into the obfuscation network, to thereby generate obfuscated training data, (ii) (ii-1) inputting the obfuscated training data into a learning network having its own one or more learned parameters, to thereby allow the learning network to generate 1-st characteristic information for training by applying a learning operation to the obfuscated training data using the learned parameters, and (ii-2) inputting the training data into the learning network, to thereby allow the learning network to generate 2-nd characteristic information for training by applying the learning operation to the training data using the learned parameters, and (iii) learning the obfuscation network such that a 1-st error is minimized which is calculated by referring to the 1-st characteristic information for training and the 2-nd characteristic information for training, and such that a 2-nd error is maximized which is calculated by referring to the training data and the obfuscated training data, on condition that a 2-nd learning device has performed (i) one of (i-1) a process of inputting the training data into the adaption network, to thereby allow the adaption network to adapt the training data and thus to generate 1-st feature adapted training data, and (i-2) a process of inputting 1-st test data into the adaption network, to thereby allow the adaption network to adapt the test data and thus to generate 2-nd feature adapted training data, and (ii) one of (ii-1) a process of acquiring a 1-st adaption ground truth corresponding to the obfuscated training data generated by the obfuscation network, and learning the adaption network such that a 1-st adaption error is minimized which is calculated by referring to (1) a 1-st adaption reference corresponding to the 1-st feature adapted training data and (2) the 1-st adaption ground truth, and (ii-2) a process of learning the adaption network such that a 2-nd adaption error is minimized which is calculated by referring to a 2-nd adaption ground truth corresponding to obfuscated test data generated by inputting the test data into the learned obfuscation network and further referring to a 2-nd adaption reference corresponding to the 2-nd feature adapted training data, a testing device acquiring 2-nd test data to be used for concealing; and (b) the testing device inputting the 2-nd test data into the adaption network, to thereby allow the adaption network to generate a feature adapted test data by adapting the 2-nd test data, and acquiring the feature adapted test data as concealed data of the 2-nd test data.

12. A 2-nd learning device for learning an adaption network corresponding to an obfuscation network used for concealing original data to protect personal information, comprising: at least one memory that stores instructions; and at least one processor configured to execute the instructions to perform or support another device to perform processes of: (I) on condition that a 1-st learning device has performed or is performing processes of (i) when training data is inputted into the obfuscation network, instructing the obfuscation network to obfuscate the training data, to thereby generate obfuscated training data, (ii) (ii-1) inputting the obfuscated training data into a learning network having its own one or more learned parameters, to thereby allow the learning network to generate 1-st characteristic information for training by applying a learning operation to the obfuscated training data using the learned parameters, and (ii-2) inputting the training data into the learning network, to thereby allow the learning network to generate 2-nd characteristic information for training by applying the learning operation to the training data using the learned parameters, and (iii) learning the obfuscation network such that a 1-st error is minimized which is calculated by referring to the 1-st characteristic information for training and the 2-nd characteristic information for training, and such that a 2-nd error is maximized which is calculated by referring to the training data and the obfuscated training data, performing one of a process of inputting the training data into the adaption network, to thereby allow the adaption network to adapt the training data and thus to generate 1-st feature adapted data, and a process of inputting test data into the adaption network, to thereby allow the adaption network to adapt the test data and thus to generate 2-nd feature adapted data, and (II) performing one of (i) a process of acquiring a 1-st adaption ground truth (GT) corresponding to the obfuscated training data generated by the obfuscation network, and learning the adaption network such that a 1-st adaption error is minimized which is calculated by referring to (1) a 1-st adaption reference corresponding to the 1-st feature adapted data and (2) the 1-st adaption ground truth, and (ii) a process of learning the adaption network such that a 2-nd adaption error is minimized which is calculated by referring to a 2-nd adaption ground truth corresponding to obfuscated test data generated by inputting the test data into the learned obfuscation network and further referring to a 2-nd adaption reference corresponding to the 2-nd feature adapted data.

13. The 2-nd learning device of claim 12, wherein the processor performs one of (i) a process of (i-1) inputting the 1-st feature adapted data into the learning network, to thereby allow the learning network to output 1-st adaption characteristic information corresponding to the 1-st feature adapted data as the 1-st adaption reference by applying the learning operation to the 1-st feature adapted data using the learned parameters, and (i-2) acquiring the 1-st adaption error by referring to one of a difference between the 1-st characteristic information for training and the 1-st adaption characteristic information and a difference between the 2-nd characteristic information for training and the 1-st adaption characteristic information, and (ii) a process of (ii-1) inputting the 2-nd feature adapted data into the learning network, to thereby allow the learning network to output 2-nd adaption characteristic information corresponding to the 2-nd feature adapted data as the 2-nd adaption reference by applying the learning operation to the 2-nd feature adapted data using the learned parameters, and (ii-2) acquiring the 2-nd adaption error by referring to one of (ii-2a) a difference between 1-st characteristic information for testing, generated by inputting the obfuscated test data into the learning network, and the 2-nd adaption characteristic information and (ii-2b) a difference between 2-nd characteristic information for testing, generated by inputting the test data into the learning network, and the 2-nd adaption characteristic information.

14. The 2-nd learning device of claim 13, wherein the 1-st error is calculated by using an obfuscation loss acquired by referring to (i) a task specific output for training, on the obfuscated training data created by using the 1-st characteristic information for training and (ii) a training data GT corresponding to the training data, wherein the 1-st adaption error is calculated by using a 1-st adaption loss acquired by referring to (i) a 1-st adaption task specific output on the 1-st feature adapted data created by using the 1-st adaption characteristic information, and (ii) the training data GT, and wherein the 2-nd adaption error is calculated by using a 2-nd adaption loss acquired by referring to (i) a 2-nd adaption task specific output on the 2-nd feature adapted data created by using the 2-nd adaption characteristic information, and (ii) a test data GT corresponding to the test data.

15. The 2-nd learning device of claim 13, wherein the 1-st error is calculated by referring to (i) a difference between the 1-st characteristic information for training and the 2-nd characteristic information for training, and (ii) an obfuscation loss acquired by referring to (ii-1) a task specific output for training, on the obfuscated training data created by using the 1-st characteristic information for training and (ii-2) a training data GT corresponding to the training data, wherein the 1-st adaption error is calculated by referring to (i) a difference between the 1-st characteristic information for training and the 1-st adaption characteristic information or a difference between the 2-nd characteristic information for training and the 1-st adaption characteristic information, and (ii) a 1-st adaption loss acquired by referring to (ii-1) a 1-st adaption task specific output on the 1-st feature adapted data created by using the 1-st adaption characteristic information and (ii-2) the training data GT, and wherein the 2-nd adaption error is calculated by referring to (i) a difference between the 1-st characteristic information for testing and the 2-nd adaption characteristic information or a difference between the 2-nd characteristic information for testing and the 2-nd adaption characteristic information, and (ii) a 2-nd adaption loss acquired by referring to (ii-1) a 2-nd adaption task specific output on the 2-nd feature adapted data created by using the 2-nd adaption characteristic information and (ii-2) a test data GT corresponding to test data.

16. The 2-nd learning device of claim 13, wherein the learning network includes a 1-st learning network to an n-th learning network respectively having one or more 1-st learned parameters to one or more n-th learned parameters wherein n is an integer greater than 0, on condition that the 1-st learning device has performed or is performing processes of (i) inputting the obfuscated training data into each of the 1-st learning network to the n-th learning network, to thereby allow each of the 1-st learning network to the n-th learning network to generate (1_1)-st characteristic information for training to (1_n)-th characteristic information for training by applying the learning operation to the obfuscated training data using the 1-st learned parameters to the n-th learned parameters, (ii) inputting the training data into each of the 1-st learning network to the n-th learning network, to thereby allow each of the 1-st learning network to the n-th learning network to generate (2_1)-st characteristic information for training to (2_n)-th characteristic information for training by applying the learning operation to the training data using the 1-st learned parameters to the n-th learned parameters, (iii) generating the 1-st error which is a weighted sum of a (1_1)-st error to a (1_n)-th error wherein the (1_1)-st error is calculated by referring to the (1_1)-st characteristic information for training and the (2_1)-st characteristic information for training and wherein the (1_n)-th error is calculated by referring to the (1_n)-th characteristic information for training and the (2_n)-th characteristic information for training, and (iv) learning the obfuscation network such that the 1st error is minimized and the 2-nd error is maximized, the processor performs processes of (i) (i-1) inputting the 1-st feature adapted data into each of the 1-st learning network to the n-th learning network, to thereby allow each of the 1-st learning network to the n-th learning network to generate (1_1)-st adaption characteristic information to (1_n)-th adaption characteristic information by applying the learning operation to the 1-st feature adapted data using the 1-st learned parameters to the n-th learned parameters, and (i-2) acquiring the 1-st adaption error by performing weighted summation of a difference between the (1_1)-st characteristic information for training and the (1_1)-st adaption characteristic information to a difference between the (1_n)-th characteristic information for training and the (1_n)-th adaption characteristic information, or by performing weighted summation of a difference between the (2_1)-st characteristic information for training and the (1_1)-st adaption characteristic information to a difference between the (2_n)-th characteristic information for training and the (1_n)-th adaption characteristic information, or (ii) (ii-1) inputting the 2-nd feature adapted data into each of the 1-st learning network to the n-th learning network, to thereby allow each of the 1-st learning network to the n-th learning network to generate (2_1)-st adaption characteristic information to (2_n)-th adaption characteristic information by applying the learning operation to the 2-nd feature adapted data using the 1-st learned parameters to the n-th learned parameters, and (ii-2) acquiring the 2-nd adaption error by performing weighted summation of (ii-1) a difference between (1_1)-st characteristic information for testing and the (2_1)-st adaption characteristic information to a difference between (1_n)-th characteristic information for testing and the (2_n)-th adaption characteristic information wherein the (1_1)-st characteristic information for testing to the (1_n)-th characteristic information for testing are respectively created by inputting the obfuscated test data into the 1-st learning network to the n-th learning network, or by performing weighted summation of (ii-2) a difference between the (2_1)-st characteristic information for testing and the (2_1)-st adaption characteristic information to a difference between the (2_n)-th characteristic information for testing and the (2_n)-th adaption characteristic information wherein the (2_1)-st characteristic information for testing to the (2_n)-th characteristic information for testing are respectively created by inputting the test data into the 1-st learning network to the n-th learning network.

17. The 2-nd learning device of claim 16, wherein the (1_1)-st error to the (1_n)-th error are calculated respectively by further referring to (i) a 1-st obfuscation loss acquired by referring to (i-1) a 1-st task specific output for training created by using the (1_1)-st characteristic information for training and (i-2) the training data GT to (ii) an n-th obfuscation loss acquired by referring to (ii-1) an n-th task specific output for training created by using the (1_n)-th characteristic information for training and (ii-2) the training data GT, wherein (i) each of a difference between the (1_1)-st characteristic information for training and the (1_1)-st adaption characteristic information to a difference between the (1_n)-th characteristic information for training and the (1_n)-th adaption characteristic information is determined respectively by further referring to each of a (1_1)-st adaption loss which is calculated by referring to a (1_1)-st adaption task specific output created using the (1_1)-st adaption characteristic information and by further referring to the training data GT to a (1_n)-th adaption loss which is calculated by referring to a (1_n)-th adaption task specific output created using the (1_n)-th adaption characteristic information and by further referring to the training data GT, or wherein (ii) each of a difference between the (2_1)-st characteristic information for training and the (1_1)-st adaption characteristic information to a difference between the (2_n)-th characteristic information for training and the (1_n)-th adaption characteristic information is determined respectively by further referring to each of the (1_1)-st adaption loss which is calculated by referring to the (1_1)-st adaption task specific output created using the (1_1)-st adaption characteristic information and by further referring to the training data GT to the (1_n)-th adaption loss which is calculated by referring to the (1_n)-th adaption task specific output created using the (1_n)-th adaption characteristic information and by further referring to the training data GT, and wherein (i) each of a difference between the (1_1)-st characteristic information for testing and the (2_1)-st adaption characteristic information to a difference between the (1_n)-th characteristic information for testing and the (2_n)-th adaption characteristic information is determined respectively by further referring to each of a (2_1)-st adaption loss which is calculated by referring to a (2_1)-st adaption task specific output created using the (2_1)-st adaption characteristic information and by further referring to the test data GT to a (2_n)-th adaption loss which is calculated by referring to a (2_n)-th adaption task specific output created using the (2_n)-th adaption characteristic information and by further referring to the test data GT, or wherein (ii) each of a difference between the (2_1)-st characteristic information for testing and the (2_1)-st adaption characteristic information to a difference between the (2_n)-th characteristic information for testing and the (2_n)-th adaption characteristic information is determined respectively by further referring to each of the (2_1)-st adaption loss which is calculated by referring to the (2_1)-st adaption task specific output created using the (2_1)-st adaption characteristic information and by further referring to the test data GT to a (2_n)-th adaption loss which is calculated by referring to the (2_n)-th adaption task specific output created using the (2_n)-th adaption characteristic information and by further referring to the test data GT.

18. The 2-nd learning device of claim 13, wherein the learning network includes a 1-st learning network to an n-th learning network respectively having one or more 1-st learned parameters to one or more n-th learned parameters wherein n is an integer greater than 0,
   on condition that the 1-st learning device has performed or is performing processes of (i) inputting the obfuscated training data into each of the 1-st learning network to the n-th learning network, to thereby allow each of the 1-st learning network to the n-th learning network to generate (1_1)-st characteristic information for training to (1_n)-th characteristic information for training by applying the learning operation to the obfuscated training data using the 1-st learned parameters to the n-th learned parameters, (ii) inputting the training data into each of the 1-st learning network to the n-th learning network, to thereby allow each of the 1-st learning network to the n-th learning network to generate (2_1)-st characteristic information for training to (2_n)-th characteristic information for training by applying the learning operation to the training data using the 1-st learned parameters to the n-th learned parameters, (iii) generating the 1-st error which is a weighted sum of a 1-st obfuscation loss to an n-th obfuscation loss wherein the 1-st obfuscation loss is calculated by referring to a 1-st task specific output for training created by using the (1_1)-st characteristic information for training and by referring to the training data GT and the n-th obfuscation loss is calculated by referring to an n-th task specific output for training created by using the (1_n)-th characteristic information for training and by referring to the training data GT, and (iv) learning the obfuscation network such that the 1st error is minimized and the 2-nd error is maximized,
   the processor performs processes of (i) (i-1) inputting the 1-st feature adapted data into each of the 1-st learning network to the n-th learning network, to thereby allow each of the 1-st learning network to the n-th learning network to generate (1_1)-st adaption characteristic information to (1_n)-th adaption characteristic information by applying the learning operation to the 1-st feature adapted data using the 1-st learned parameters to the n-th learned parameters, and (i-2) acquiring the 1-st adaption error by performing weighted summation of a (1_1)-st adaption loss to a (1_n)-th adaption loss wherein the (1_1)-st adaption loss is calculated by referring to a (1_1)-st adaption task specific output created by using the (1_1)-st adaption characteristic information and by referring to the training data GT, and the (1_n)-th adaption loss is calculated by referring to a (1_n)-th adaption task specific output created by using the (1_n)-th adaption characteristic information and by referring to the training data GT, or (ii) (ii-1) inputting the 2-nd feature adapted data into each of the 1-st learning network to the n-th learning network, to thereby allow each of the 1-st learning network to the n-th learning network to generate (2_1)-st adaption characteristic information to (2_n)-th adaption characteristic information by applying the learning operation to the 2-nd feature adapted data using the 1-st learned parameters to the n-th learned parameters, and (ii-2) acquiring the 2-nd adaption error by performing weighted summation of (ii-1) a (2_1)-st adaption loss to a (2_n)-th adaption loss wherein the (2_1)-st adaption loss is calculated by referring to a (2_1)-st adaption task specific output created by using the (2_1)-st adaption characteristic information and by referring to the test data GT and the (2_n)-th adaption loss is calculated by referring to a (2_n)-th adaption task specific output created by using the (2_n)-th adaption characteristic information and by referring to the test data GT.

19. The 2-nd learning device of claim 13, wherein the learning network includes a 1-st learning network to an n-th learning network respectively having one or more 1-st learned parameters to one or more n-th learned parameters wherein n is an integer greater than 0,
   on condition that the 1-st learning device has performed or is performing processes of (i) (i-1) inputting the 1-st obfuscated training data, which is the obfuscated training data, into the 1-st learning network, to thereby allow the 1-st learning network to generate (1_1)-st characteristic information for training by applying the learning operation to the 1-st obfuscated training data using the 1-st learned parameters, (ii-2) inputting the training data into the 1-st learning network, to thereby allow the 1-st learning network to generate (2_1)-st characteristic information for training by applying the learning operation to the training data using the 1-st learned parameters, and (ii-3) learning the obfuscation network such that a (1_1)-st error is minimized which is calculated by referring to the (1_1)-st characteristic information for training and the (2_1)-st characteristic information for training and such that a (2_1)-st error is maximized which is calculated by referring to the training data and the 1-st obfuscated training data to thereby allow the obfuscation network to be a 1-st learned obfuscation network, and (ii) while increasing an integer k from 2 to n, (ii-1) inputting the training data into a (k−1)-th learned obfuscation network, to thereby allow the (k−1)-th learned obfuscation network to generate k-th obfuscated training data, (ii-2) (1) inputting the k-th obfuscated training data into a k-th learning network, to thereby allow the k-th learning network to generate (1_k)-th characteristic information for training by applying the learning operation to the k-th obfuscated training data using k-th learned parameters, and (2) inputting the training data into the k-th learning network, to thereby allow the k-th learning network to generate (2_k)-th characteristic information for training by applying the learning operation to the training data using the k-th learned parameters, and (ii-3) learning the obfuscation network such that a $(1\_k)$-th error is minimized which is calculated by referring to the $(1\_k)$-th characteristic information for training and the $(2\_k)$-th characteristic information for training and such that a $(2\_k)$-th error is maximized which is calculated by referring to the training data and the k-th obfuscated training data, to thereby allow the $(k-1)$-th learned obfuscation network to be a k-th learned obfuscation network, the processor performs processes of (i) (i-1) inputting $(1\_1)$-st feature adapted data which is the 1-st feature adapted data into the 1-st learning network, to thereby allow the 1-st learning network to generate $(1\_1)$-st adaption characteristic information by applying the learning operation to the $(1\_1)$-st feature adapted data using the 1-st learned parameters, (i-2) learning the adaption network such that a $(1\_1)$-st adaption error is minimized which is calculated by referring to a difference between the $(1\_1)$-st characteristic information for training and the $(1\_1)$-st adaption characteristic information or a difference between the $(2\_1)$-st characteristic information for training and the $(1\_1)$-st adaption characteristic information, to thereby allow the adaption network to be a 1-st learned adaption network, inputting the training data into a $(k-1)$-th learned adaption network, to thereby allow the $(k-1)$-th learned adaption network to generate $(1\_k)$-th feature adapted data, inputting the $(1\_k)$-th feature adapted data into the k-th learning network, to thereby allow the k-th learning network to generate $(1\_k)$-th adaption characteristic information by applying the learning operation to the $(1\_k)$-th feature adapted data, and (i-3) learning the $(k-1)$-th learned adaption network such that a $(1\_k)$-th adaption error is minimized which is calculated by referring to a difference between the $(1\_k)$-th characteristic information for training and the $(1\_k)$-th adaption characteristic information or a difference between the $(2\_k)$-th characteristic information for training and the $(1\_k)$-th adaption characteristic information, to thereby allow the $(k-1)$-th learned adaption network to be a k-th learned adaption network, or (ii) (ii-1) inputting the obfuscated test data into the 1-st learning network to the n-th learning network, to thereby allow each of the 1-st learning network to the n-th learning network to generate $(1\_1)$-st characteristic information for testing to the $(1\_n)$-th characteristic information for testing by applying the learning operation to the obfuscated test data, or inputting the test data into the 1-st learning network to the n-th learning network, to thereby allow each of the 1-st learning network to the n-th learning network to generate $(2\_1)$-st characteristic information for testing to $(2\_n)$-th characteristic information for testing by applying the learning operation to the test data, (ii-2) inputting $(2\_1)$-st feature adapted data which is the 2-nd feature adapted data into the 1-st learning network, to thereby allow the 1-st learning network to generate $(2\_1)$-st adaption characteristic information by applying the learning operation to the $(2\_1)$-st feature adapted data using the 1-st learned parameters, (ii-3) learning the adaption network such that a $(2\_1)$-st adaption error is minimized which is calculated by referring to a difference between the $(1\_1)$-st characteristic information for testing and the $(1\_1)$-st adaption characteristic information or a difference between the $(2\_1)$-st characteristic information for testing and the $(2\_1)$-st adaption characteristic information to thereby allow the adaption network to be a 1-st learned adaption network, inputting the test data into the $(k-1)$-th learned adaption network, to thereby allow the $(k-1)$-th learned adaption network to generate $(2\_k)$-th feature adapted data, inputting the $(2\_k)$-th feature adapted data into the k-th learning network, to thereby allow the k-th learning network to generate $(2\_k)$-th adaption characteristic information by applying the learning operation to the $(2\_k)$-th feature adapted data, and (ii-4) learning the $(k-1)$-th learned adaption network such that a $(2\_k)$-th adaption error is minimized which is calculated by referring to a difference between the $(1\_k)$-th characteristic information for testing and the $(2\_k)$-th adaption characteristic information or a difference between the $(2\_k)$-th characteristic information for testing and the $(2\_k)$-th adaption characteristic information, to thereby allow the $(k-1)$-th learned adaption network to be a k-th learned adaption network.

20. The 2-nd learning device of claim 19, wherein the $(1\_k)$-th error is calculated by further referring to a k-th obfuscation loss acquired by referring to (i) a k-th task specific output for training, on the k-th obfuscated training data created by using the $(1\_k)$-th characteristic information for training and (ii) a training data GT corresponding to the training data, wherein (i) each of a difference between the $(1\_1)$-st characteristic information for training and the $(1\_1)$-st adaption characteristic information to a difference between the $(1\_n)$-th characteristic information for training and the $(1\_n)$-th adaption characteristic information is determined respectively by further referring to each of a $(1\_1)$-st adaption loss which is calculated by referring to a $(1\_1)$-st adaption task specific output created using the $(1\_1)$-st adaption characteristic information and by further referring to the training data GT to a $(1\_n)$-th adaption loss which is calculated by referring to a $(1\_n)$-th adaption task specific output created using the $(1\_n)$-th adaption characteristic information and by further referring to the training data GT, or wherein (ii) each of a difference between the $(2\_1)$-st characteristic information for training and the $(1\_1)$-st adaption characteristic information to a difference between the $(2\_n)$-th characteristic information for training and the $(1\_n)$-th adaption characteristic information is determined respectively by further referring to each of a $(1\_1)$-st adaption loss which is calculated by referring to a $(1\_1)$-st adaption task specific output created using the $(1\_1)$-st adaption characteristic information and by further referring to the training data GT to a $(1\_n)$-th adaption loss which is calculated by referring to a $(1\_n)$-th adaption task specific output created using the $(1\_n)$-th adaption characteristic information and by further referring to the training data GT, and wherein (i) each of a difference between the $(1\_1)$-st characteristic information for testing and the $(2\_1)$-st adaption characteristic information to a difference between the $(1\_n)$-th characteristic information for testing and the $(2\_n)$-th adaption characteristic information is determined respectively by further referring to each of a $(2\_1)$-st adaption loss which is calculated by referring to a $(2\_1)$-st adaption task specific output created using the $(2\_1)$-st adaption characteristic information and by further referring to the test data GT to a $(2\_n)$-th adaption loss which is calculated by referring to a $(2\_n)$-th adaption task specific output created using the (2_n)-th adaption characteristic information and by further referring to the test data GT, or wherein (ii) each of a difference between the (2_1)-st characteristic information for testing and the (2_1)-st adaption characteristic information to a difference between the (2_n)-th characteristic information for testing and the (2_n)-th adaption characteristic information is determined respectively by further referring to each of the (2_1)-st adaption loss which is calculated by referring to the (2_1)-st adaption task specific output created using the (2_1)-st adaption characteristic information and by further referring to the test data GT to a (2_n)-th adaption loss which is calculated by referring to the (2_n)-th adaption task specific output created using the (2_n)-th adaption characteristic information and by further referring to the test data GT.

21. The 2-nd learning device of claim 13, wherein the learning network includes a 1-st learning network to an n-th learning network respectively having one or more 1-st learned parameters to one or more n-th learned parameters wherein n is an integer greater than 0, on condition that the 1-st learning device has performed or is performing processes of (i) (i-1) inputting the 1-st obfuscated training data, which is the obfuscated training data, into the 1-st learning network, to thereby allow the 1-st learning network to generate (1_1)-st characteristic information for training by applying the learning operation to the 1-st obfuscated training data using the 1-st learned parameters, (ii-2) inputting the training data into the 1-st learning network, to thereby allow the 1-st learning network to generate (2_1)-st characteristic information for training by applying the learning operation to the training data using the 1-st learned parameters, and (ii-3) learning the obfuscation network such that a (1_1)-st error is minimized which is calculated by referring to the (1_1)-st characteristic information for training and the (2_1)-st characteristic information for training and such that a (2_1)-st error is maximized which is calculated by referring to the training data and the 1-st obfuscated training data to thereby allow the obfuscation network to be a 1-st learned obfuscation network, and (ii) while increasing an integer k from 2 to n, (ii-1) inputting the training data into a (k−1)-th learned obfuscation network, to thereby allow the (k−1)-th learned obfuscation network to generate k-th obfuscated training data, (ii-2) (i) inputting the k-th obfuscated training data into a k-th learning network, to thereby allow the k-th learning network to generate (1_k)-th characteristic information for training by applying the learning operation to the k-th obfuscated training data using k-th learned parameters, and (2) inputting the training data into the k-th learning network, to thereby allow the k-th learning network to generate (2_k)-th characteristic information for training by applying the learning operation to the training data using the k-th learned parameters, and (ii-3) learning the obfuscation network such that a (1_k)-th error is minimized which is calculated by referring to the (1_k)-th characteristic information for training and the (2_k)-th characteristic information for training and such that a (2_k)-th error is maximized which is calculated by referring to the training data and the k-th obfuscated training data, to thereby allow the (k−1)-th learned obfuscation network to be a k-th learned obfuscation network, the processor performs processes of (i) (i-1) inputting (1_1)-st feature adapted data which is the 1-st feature adapted data into the 1-st learning network, to thereby allow the 1-st learning network to generate (1_1)-st adaption characteristic information by applying the learning operation to the (1_1)-st feature adapted data using the 1-st learned parameters, (i-2) learning the adaption network such that a (1_1)-st adaption loss is minimized which is calculated by referring to a (1_1)-st adaption task specific output created by using the (1_1)-st adaption characteristic information and by referring to the training data GT, to thereby allow the adaption network to be a 1-st learned adaption network, inputting the training data into a (k−1)-th learned adaption network, to thereby allow the (k−1)-th learned adaption network to generate (1_k)-th feature adapted data, inputting the (1_k)-th feature adapted data into the k-th learning network, to thereby allow the k-th learning network to generate (1_k)-th adaption characteristic information by applying the learning operation to the (1_k)-th feature adapted data, and (i-3) learning a (k−1)-th learned adaption network such that a (1_k)-th adaption loss is minimized which is calculated by referring to a (1_k)-th adaption task specific output created by using the (1_k)-th adaption characteristic information and by referring to the training GT, to thereby allow the (k−1)-th learned adaption network to be a k-th learned adaption network, or (ii) (ii-1) inputting a (2_1)-st feature adapted data which is the 2-nd feature adapted data into the 1-st learning network, to thereby allow the 1-st learning network to generate (2_1)-st adaption characteristic information by applying the learning operation to the (2_1)-st feature adapted data using the 1-st learned parameters, (ii-2) learning the adaption network such that a (2_1)-st adaption loss is minimized which is calculated by referring to a (2_1)-st adaption task specific output created by using the (2_1)-st adaption characteristic information and by referring to the test data GT, to thereby allow the adaption network to be a 1-st learned adaption network, inputting the test data into a (k−1)-th learned adaption network, to thereby allow the (k−1)-th learned adaption network to generate (2_k)-th feature adapted data, inputting the (2_k)-th feature adapted data into the k-th learning network, to thereby allow the k-th learning network to generate (2_k)-th adaption characteristic information by applying the learning operation to the (2_k)-th feature adapted data, and (ii-3) learning a (k−1)-th learned adaption network such that a (2_k)-th adaption loss is minimized which is calculated by referring to a (2_k)-th adaption task specific output created by using the (2_k)-th adaption characteristic information and by referring to the test data GT to thereby allow the (k−1)-th learned adaption network to be a k-th learned adaption network.

22. A testing device for testing an adaption network corresponding to an obfuscation network used for concealing original data to protect personal information, comprising:

at least one memory that stores instructions; and
at least one processor configured to execute the instructions to perform or support another device to perform processes of: (I) after a 1-st learning device has performed or while the 1-st learning device is performing processes of (i) instructing the obfuscation network to obfuscate training data inputted into the obfuscation network, to thereby generate obfuscated training data, (ii) (ii-1) inputting the obfuscated training data into a learning network having its own one or more learned parameters, to thereby allow the learning network to generate 1-st characteristic information for training by applying a learning operation to the obfuscated training data using the learned parameters, and (ii-2) inputting the training data into the learning network, to thereby allow the learning network to generate 2-nd characteristic information for training by applying the learning operation to the training data using the learned parameters, and (iii) learning the obfuscation network such that a 1-st error is minimized which is calculated by referring to the 1-st characteristic information for training and the 2-nd characteristic information for training, and such that a 2-nd error is maximized which is calculated by referring to the training data and the obfuscated training data, on condition that a 2-nd learning device has performed (i) one of (i-1) a process of inputting the training data into the adaption network, to thereby allow the adaption network to adapt the training data and thus to generate 1-st feature adapted training data, and (i-2) a process of inputting 1-st test data into the adaption network, to thereby allow the adaption network to adapt the test data and thus to generate 2-nd feature adapted training data; and (ii) one of (ii-1) a process of acquiring a 1-st adaption ground truth corresponding to the obfuscated training data generated by the obfuscation network, and learning the adaption network such that a 1-st adaption error is minimized which is calculated by referring to (1) a 1-st adaption reference corresponding to the 1-st feature adapted training data and (2) the 1-st adaption ground truth, and (ii-2) a process of learning the adaption network such that a 2-nd adaption error is minimized which is calculated by referring to a 2-nd adaption ground truth corresponding to obfuscated test data generated by inputting the test data into the learned obfuscation network and further referring to a 2-nd adaption reference corresponding to the 2-nd feature adapted training data, acquiring 2-nd test data to be used for concealing, and (II) inputting the 2-nd test data into the adaption network, to thereby allow the adaption network to generate a feature adapted test data by adapting the 2-nd test data, and acquiring the feature adapted test data as concealed data of the 2-nd test data.

* * * * *